(12) United States Patent
Murata

(10) Patent No.: US 7,542,781 B2
(45) Date of Patent: Jun. 2, 2009

(54) HANDHELD ELECTRONIC APPARATUS

(75) Inventor: Yoshiyuki Murata, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 847 days.

(21) Appl. No.: 10/877,212

(22) Filed: Jun. 25, 2004

(65) Prior Publication Data

US 2004/0266477 A1 Dec. 30, 2004

(30) Foreign Application Priority Data

Jun. 30, 2003 (JP) .............................. 2003-186179
Jul. 23, 2003 (JP) .............................. 2003-278282

(51) Int. Cl.
H04M 1/00 (2006.01)

(52) U.S. Cl. ................ 455/556.1; 455/550.1; 455/90.1; 455/552.1

(58) Field of Classification Search ................ 455/566, 455/556.1, 575.1, 575.4, 550.1, 552.1, 556.2, 455/575.3, 90.3, 90.2, 90.1; 348/370; 361/681
See application file for complete search history.

(56) References Cited

U.S. PATENT DOCUMENTS

| | | | | |
|---|---|---|---|---|
| 6,009,336 | A * | 12/1999 | Harris et al. ................. | 455/566 |
| 6,212,335 | B1 | 4/2001 | Inazuka | |
| 7,084,919 | B2 | 8/2006 | Shibata et al. | |
| 2002/0018142 | A1 * | 2/2002 | Oda ........................... | 348/370 |
| 2002/0198652 | A1 | 12/2002 | Hirayama et al. | |
| 2003/0036365 | A1 | 2/2003 | Kuroda | |
| 2003/0211874 | A1 * | 11/2003 | Mizuta et al. ............. | 455/575.4 |
| 2004/0228075 | A1 | 11/2004 | Moriguchi et al. | |
| 2004/0259592 | A1 * | 12/2004 | Taneya et al. ............. | 455/556.1 |
| 2005/0083642 | A1 * | 4/2005 | Senpuku et al. ............. | 361/681 |
| 2006/0187334 | A1 | 8/2006 | Shibata et al. | |

(Continued)

FOREIGN PATENT DOCUMENTS

CN 1402499 A 3/2003

(Continued)

OTHER PUBLICATIONS

Chinese Office Action (and English translation thereof) dated May 9, 2008, issued in a counterpart Chinese Application.

Primary Examiner—John J Lee
(74) Attorney, Agent, or Firm—Frishauf, Holtz, Goodman & Chick, P.C.

(57) ABSTRACT

The present invention relates to a handheld electronic apparatus, which allows the user to photograph an object while watching an image of the object H on it display unit. A first case 1 having the display unit 5 and a second case 2 having a key input section 7 are connected in an openable and closable manner by means of a connecting shaft 120, which has a built-in image pick-up unit 121. When the first case 1 and the second case 2 are kept in an open state, the display unit 5 on the first case and the key input section 7 face in the same direction, and the image pick-up unit 121 faces in the opposite direction to a display screen of the display unit and the key input section. The user can photograph the object H, while reviewing the image of the object H displayed on the display unit 5.

15 Claims, 29 Drawing Sheets

U.S. PATENT DOCUMENTS

2007/0149260 A1 * 6/2007 Satoh et al. .............. 455/575.1

FOREIGN PATENT DOCUMENTS

| | | |
|---|---|---|
| JP | 2000-122117 A | 4/2000 |
| JP | 2001-169166 A | 6/2001 |
| JP | 2002-057771 A | 2/2002 |
| JP | 2002-135380 A | 5/2002 |
| JP | 2002-141984 A | 5/2002 |
| JP | 2002-281116 A | 9/2002 |
| JP | 2002-344605 A | 11/2002 |
| JP | 2002-374434 A | 12/2002 |
| JP | 2003-008737 A | 1/2003 |
| JP | 2003-152848 A | 5/2003 |
| JP | 2004-260277 A | 9/2004 |
| JP | 2004-266693 A | 9/2004 |
| JP | 2004-266694 A | 9/2004 |

* cited by examiner

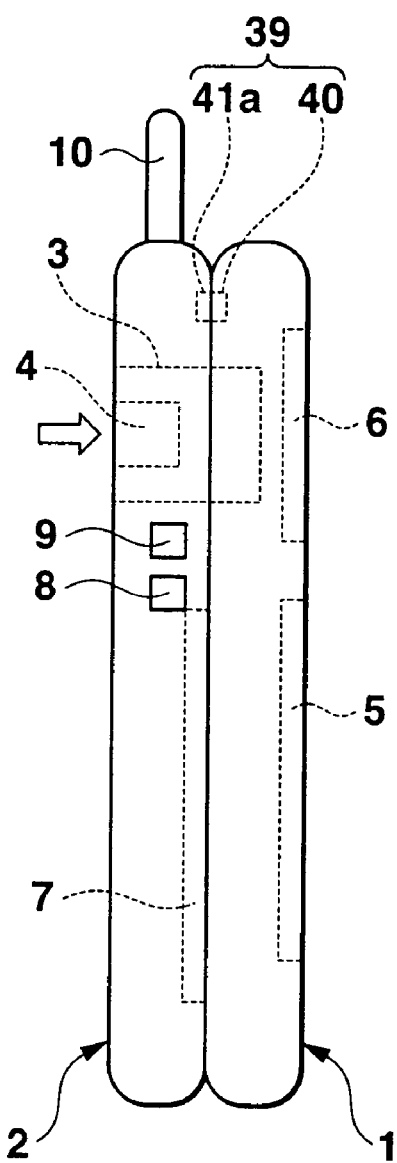
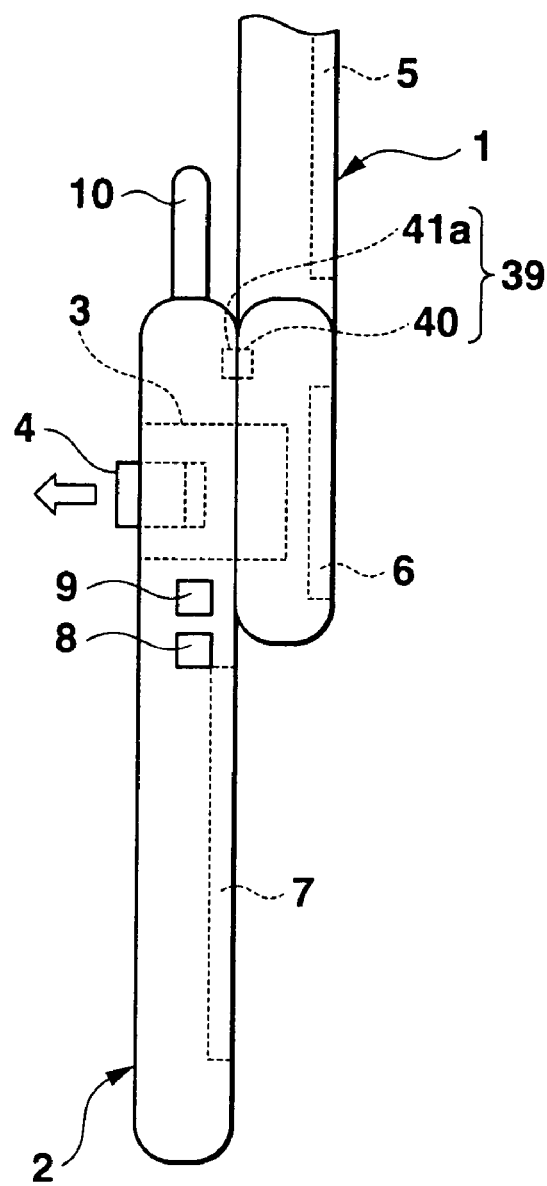
FIG.2A
FIG.2B

FIG.20
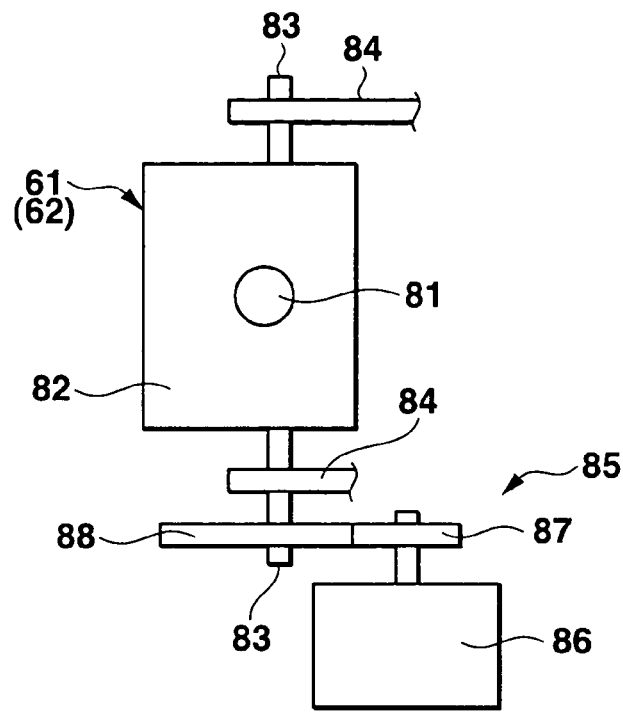
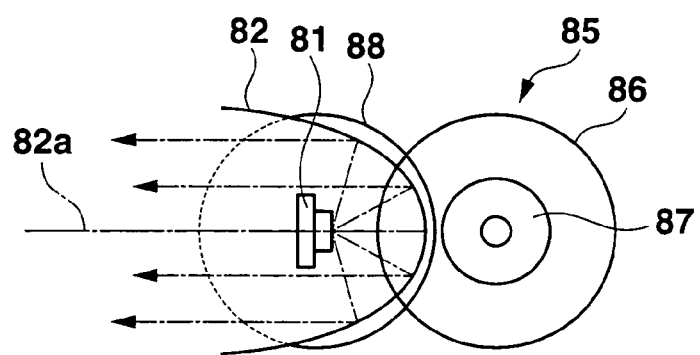
FIG.21A
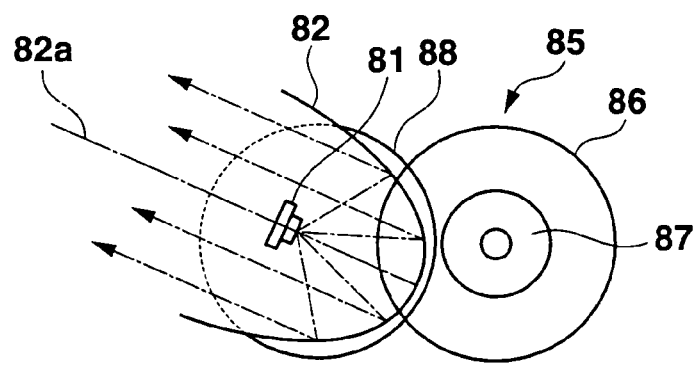
FIG.21B

FIG.26
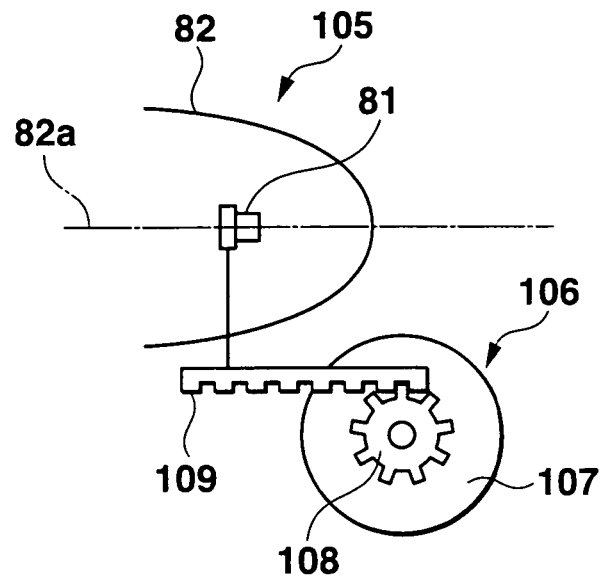
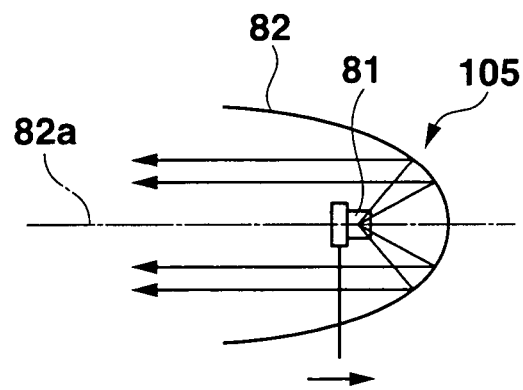
FIG.27A
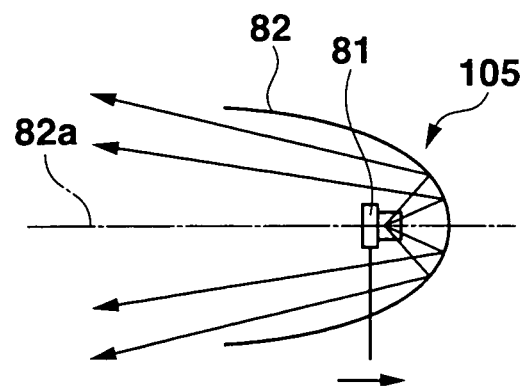
FIG.27B

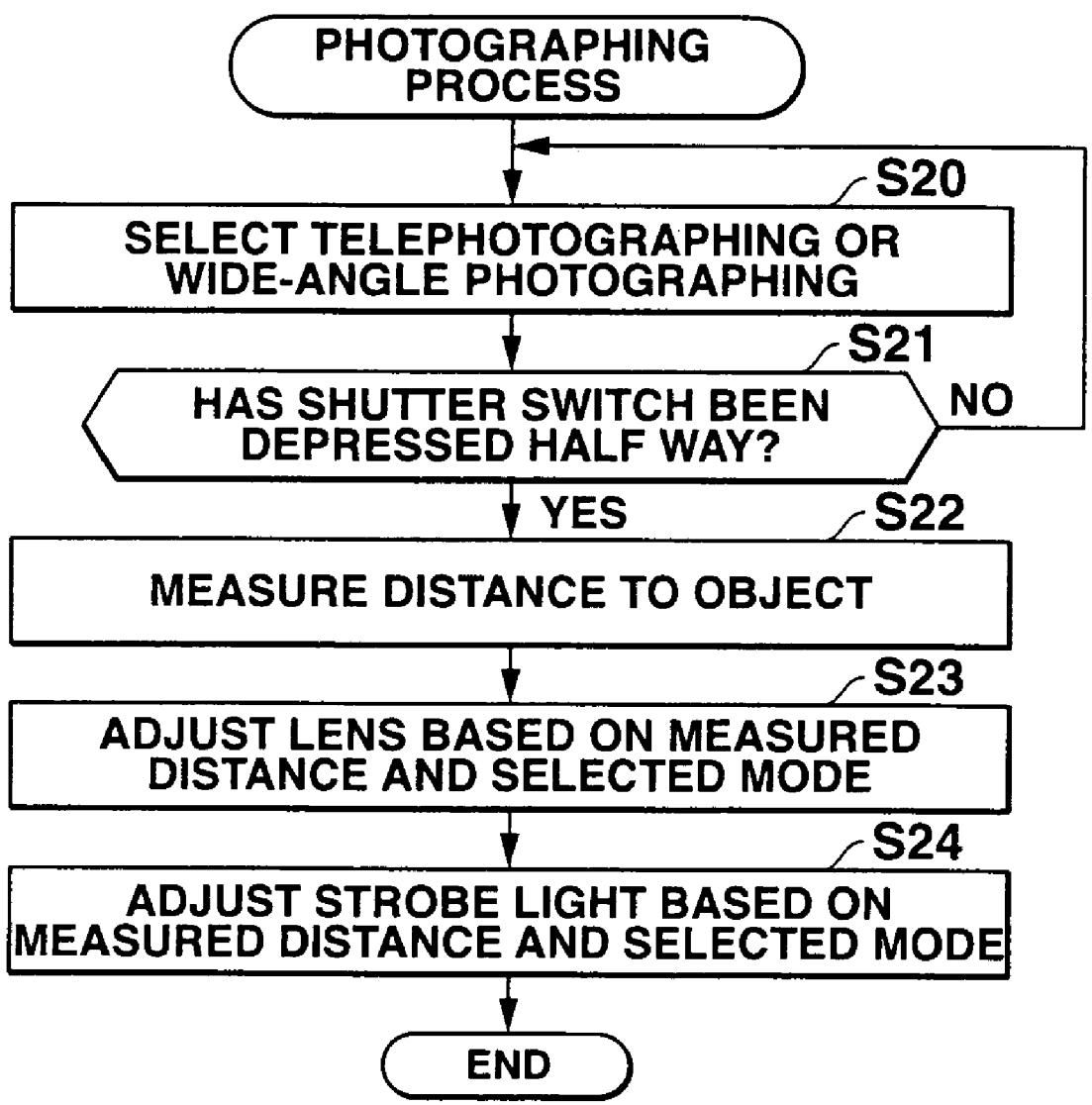

HANDHELD ELECTRONIC APPARATUS

BACKGROUND OF THE INVENTION

1. Field of the Invention

The present invention relates to a handheld electronic apparatus such as a cellular phone and a handheld terminal.

2. Description of the Related Art

A recent cellular phone has an image pick-up function for photographing an object to obtain image data of the object in addition to a telephone function.

A user of such cellular phone can photograph an object with its image pick-up unit. But a photographing range of the object is restricted and therefore it is hard to obtain a photograph of the object of the user's desired size. To solve the above mentioned inconvenience, a cellular phone has been proposed, which is equipped with an image pick-up unit having a zoom mechanism.

With use of the zoom mechanism of the image pick-up unit, a photographing range can be adjusted to obtain a photograph of a zoomed up object. But the cellular phone with such image pick-up unit provided on the same surface as a display unit mounted thereon invites another inconvenience that it is impossible for the user to photograph an object while viewing an image of the object on the display unit.

Further, a cellular phone has been proposed, which consists of a first case having a display unit and a second case having a key input unit connected to the first case by means of a hinge unit, and an image pick-up unit mounted within the hinge unit. In the cellular phone consisting of the first case and the second case, the display unit and the key input section are mounted respectively on the first case and the second case so as to face each other when the first case is folded back on the second case, and the hinge unit is provide at an intersecting portion at which a surface of the second case on which the key input section is provided intersects with a surface of the first case on which the display unit is provided. When the user photographs an object with this cellular phone, the image pick-up unit is directed to the object. In this case, it is preferable that the display unit is turned in the direction opposite to the object for the user to view an image of the object on the display unit. Therefore, the display unit is rotatably mounted on the first case by an angle of 90 degrees.

The cellular phone having the above structure can be used as a telephone with the first case turned about the hinge portion relatively to the second case. Further, when the cellular phone is used for taking a picture, the display unit is further turned relatively to the first case. Therefore, when the user uses the cellular phone for taking a picture of an object, he or she has to not only make troublesome preparation to turn the display unit relatively to the first case before photographing operation but also photograph the object with the display unit projecting from the first case. When photographing with the cellular phone, the user has to firmly hold the second case and the first case with the display unit projecting from the same, and therefore the user is not allowed to hold them in a natural manner. The display unit, which is rotatably mounted on the first case, has to be electrically connected to the first case, resulting in complex in structure.

SUMMARY OF THE INVENTION

According to one aspect of the invention, there is provided a handheld electronic apparatus, which is easy-to-hold and user-friendly, and which allows a user to photograph an object while viewing an image of the object on a display unit.

According to another aspect of the invention, there is provided a handheld electronic apparatus, which is equipped with an image pick-up unit having a zoom mechanism and reserves spaces enough for installing a display unit and a key input section with no limitations on their installation.

According to other aspect of the invention, there is provided a handheld electronic apparatus, which comprises a first case, a second case, a display unit provided on the first case for displaying an image, a key input section provided on the second case, a connecting unit for connecting the first case and the second case to each other in an openable and closable manner, and an image pick-up unit having a zoom mechanism, provided within the connecting unit, wherein when the first case and the second case are opened, the display unit and the key input section face in the same direction, and the image pick-up unit is disposed to face in the opposite direction from the display unit and the key input section.

According to still another aspect of the invention, there is provided a handheld electronic apparatus comprises a first case, a second case, a display unit provided on the first case, a key input section provided on the second case, a rotation shaft for rotatably connecting the first case and the second case to each other, and an image pick-up unit having a zoom mechanism, mounted within the rotation shaft, the zoom mechanism of the image pick-up unit being allowed to move along an axis of the rotation shaft.

BRIEF DESCRIPTION OF THE DRAWINGS

FIG. 2A is a plan view illustrating the handheld electronic apparatus (in a closed state) according to the first embodiment.

FIG. 2B is a plan view illustrating the handheld electronic apparatus of FIG. 1 (in an open state) with an image pick-up unit set in a telephotographing state.

FIG. 20 is a view illustrating a mechanism of a first and second strobe light unit in the third embodiment.

FIG. 21A is a view illustrating the first and second strobe light unit with a reflector which is turned so as to keep its optical axis in parallel with an optical axis of the image pick-up unit.

FIG. 21B is a view illustrating the first and second strobe light unit with the reflector which is turned so as to keep its optical axis intersected with the optical axis of the image pick-up unit.

FIG. 26 is a view illustrating a mechanism of a strobe light unit in the forth embodiment.

FIG. 27A is a view illustrating a light emitting element with a reflector kept at a focus point in the forth embodiment.

FIG. 27B is a view illustrating the light emitting element with a reflector kept out of the focus point in the forth embodiment.

FIG. 28 is a flow chart of a photographing process in a handheld electronic apparatus according to a fifth embodiment of the invention.

DETAILED DESCRIPTION OF PREFERRED EMBODIMENTS

First Embodiment

With reference to FIG. 1 through FIG. 13, a first embodiment of the present invention will be described, in which an electronic apparatus of a portable type according to the present invention is used in a cellular phone.

Figure 1:
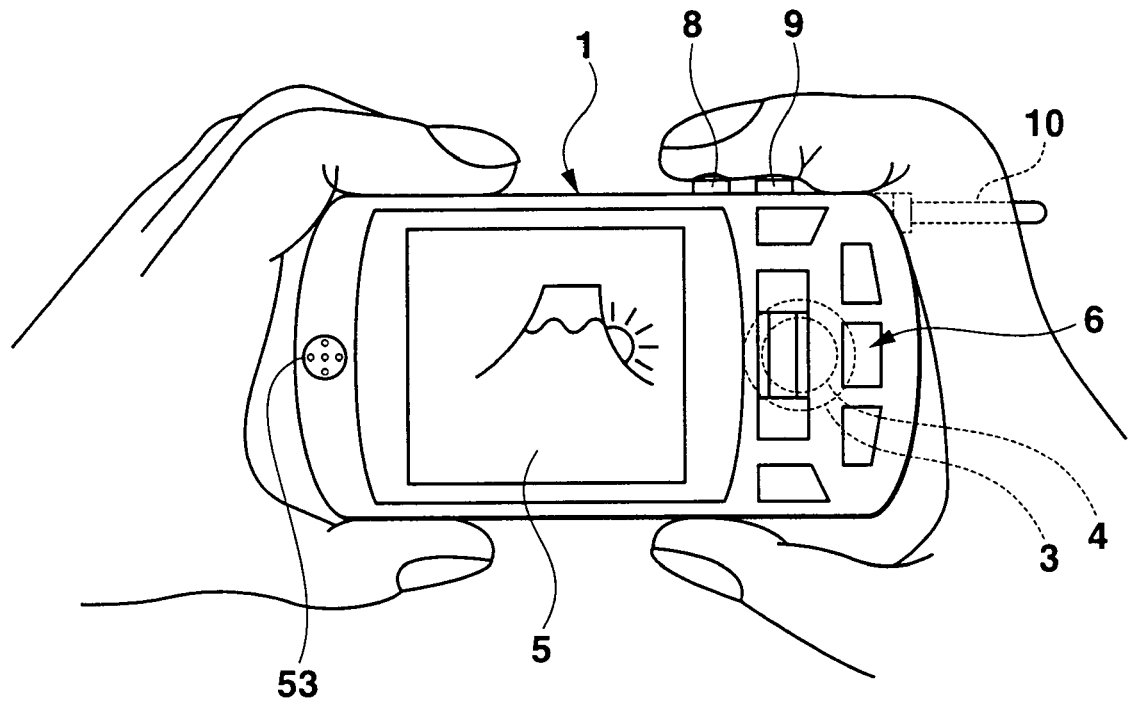
FIG. 1 is a front view illustrating a handheld electronic apparatus (in a closed state) according to the first embodiment of the present invention.
Figure 3:
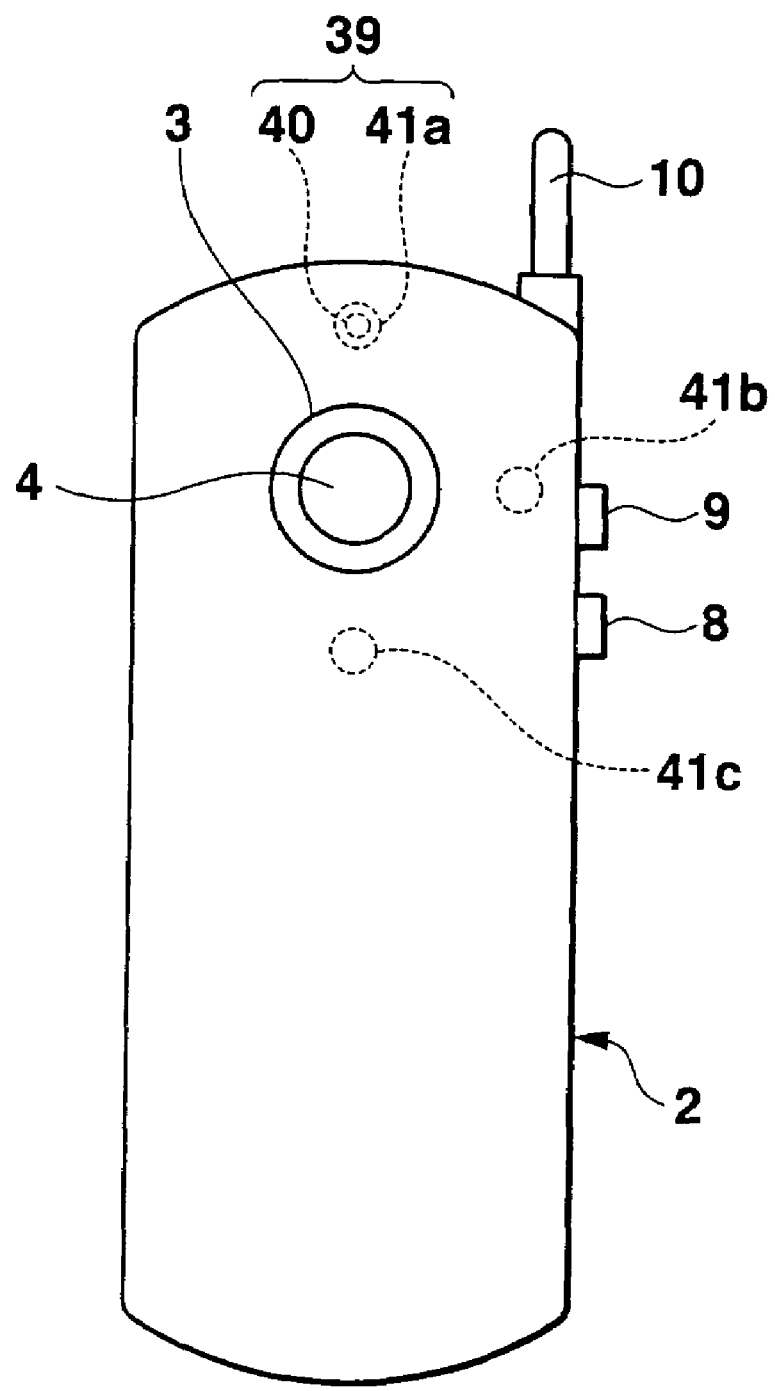
FIG. 3 is a rear view illustrating the handheld electronic apparatus according to the first embodiment.
Figure 4:
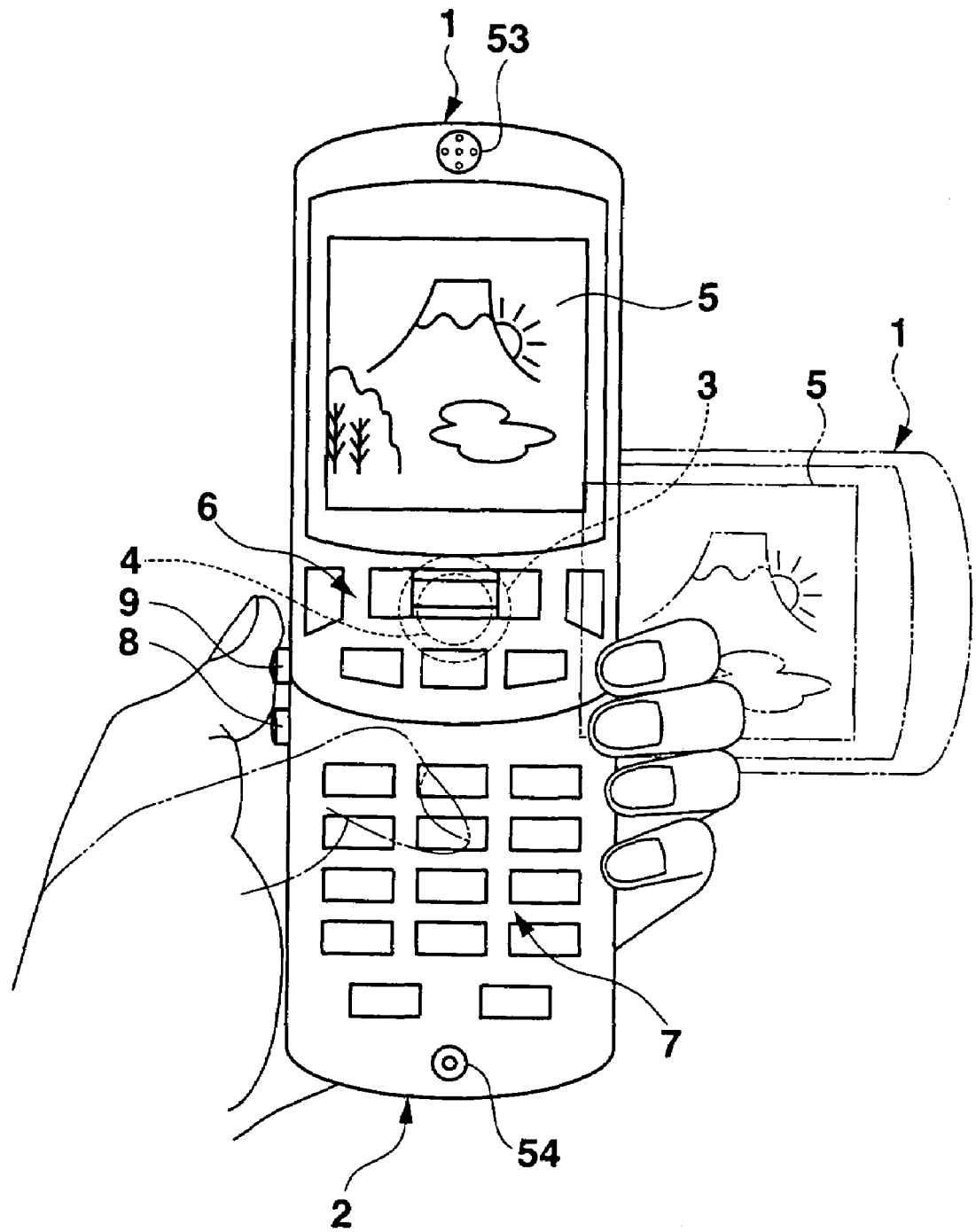
FIG. 4 is a front view illustrating the handheld electronic apparatus (in an open state) according to the first embodiment.
Figure 5:
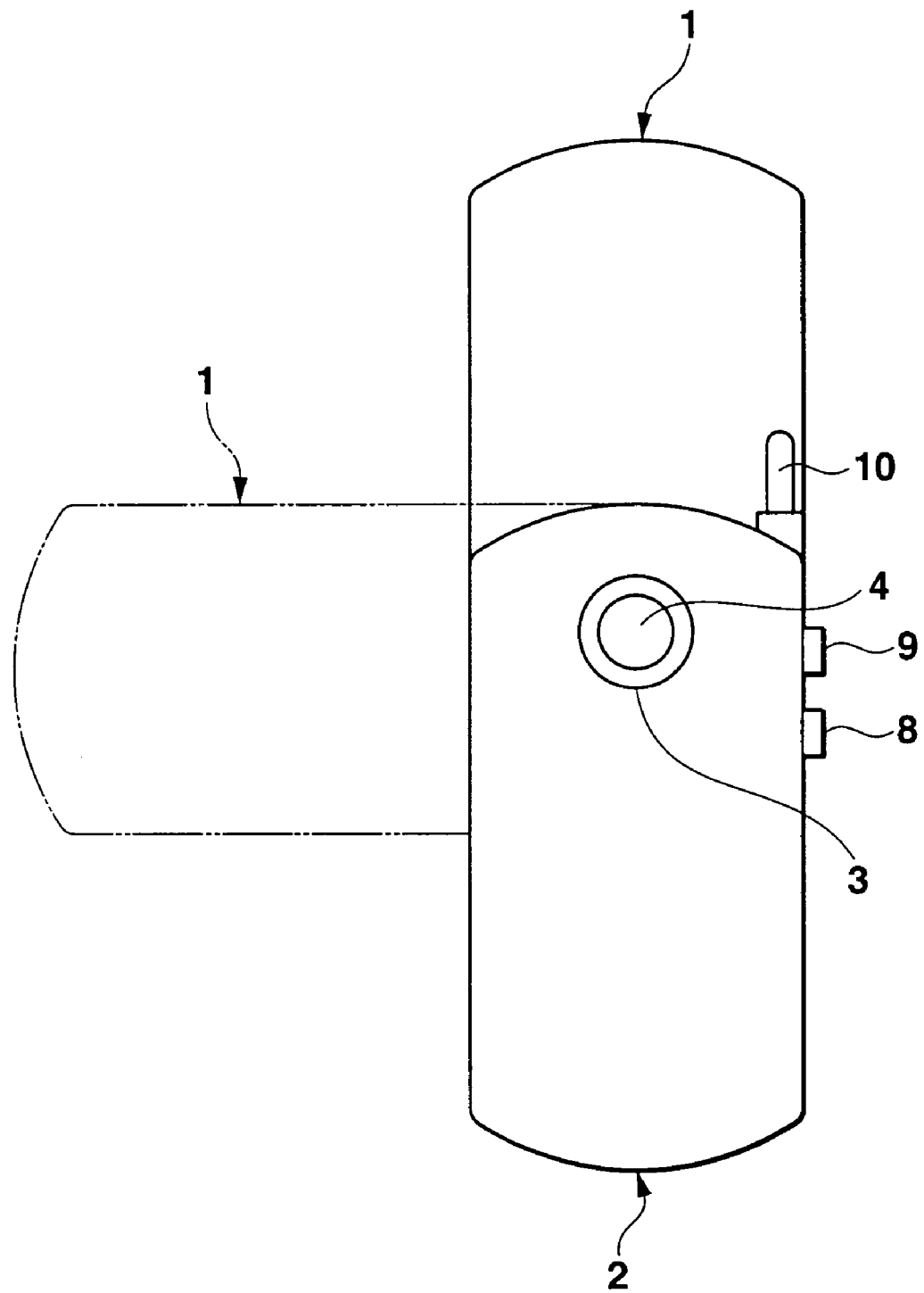
FIG. 5 is a rear view illustrating a handheld electronic apparatus shown in FIG. 4.

FIG. 1 is a front view illustrating the cellular phone of the present invention, which is in a closed state. FIG. 2A is a top plan view illustrating the cellular phone in the closed state, and FIG. 2B is a top plan view illustrating the cellular phone in an open state. FIG. 3 is a rear view illustrating the cellular phone. FIG. 4 is a front view illustrating the cellular phone in use. FIG. 5 is a rear view illustrating the cellular phone in use.

The cellular phone of the present invention has a telephone function and an image pick-up function, and comprises a first case 1 and a second case 2, both of which are arranged to face each other, as shown in FIG. 1 through FIG. 5. The first case 1 and the second case 2 are rotatably connected to each other by means of a rotation shaft 3 of a generally cylindrical shape. The image pick-up unit 4 with a zoom function is provided in the rotation shaft 3.

The case 1 is made in a generally rectangular shape, and is provided with a display unit 5, a manipulating section 6, and a speaker unit 53 on its front surface or external surface, which surface is exposed outwardly with the second case 2 piled on top of the first case 1. The display unit 5 consists of a display element of a flat screen type provided on the first case 1, such as a liquid crystal display element and an electroluminescence display element (EL display element), and has a flat display screen to electro-optically display data such as phone data for the telephone function and image data photographed by the image pick-up unit 4. The manipulating section 6 is disposed at the right side of the display unit 5 so as to surround a space for the rotation shaft 3, as seen in FIG. 1. The manipulating section 6 includes various buttons such as a jog dial, a communication button for a phone call, a shift button, and the like. The speaker unit 53 is provided on the first case 1 at its farthest position from the rotation shaft 3 or at the extreme left position as seen in FIG. 1, and serves to output voices of a calling party.

The second case 2 is of the substantially same shape as the first case 1, as shown in FIG. 4 and FIG. 5, and has a key input section 7 and a microphone unit 54 on its surface which faces the first case 1 with the case 1 brought or rotated around the rotation shaft 3 so as to face the case 2. Further, the second case 2 is provided with a manipulating switch 8 and a shutter switch 9 on its top as seen in FIG. 1, or as shown in FIG. 2A and FIG. 2B. The case 2 is equipped with an antenna 10 in the vicinity of the rotation shaft 3 or in its left side as seen in FIG. 3. The antenna 10 is extendable in the direction of its axis. The key input section 7 includes various keys to be manipulated for the telephone functions, such as ten keys, a memory key, a manner key, and the like, which are disposed on the surface which faces the first case 1 with the case 1 brought or turned about the rotation shaft 3 so as to face the second case 2, as shown in FIG. 4. The microphone 54 is installed at a position farthest from the rotation shaft 3 or at its extreme end position as shown in FIG. 4, and serves to convert voices of a user into an electronic signal to be taken therein.

The manipulating switch 8 is provided on the side surface of the case 2 and in the vicinity of the rotation shaft 3, as shown in FIG. 2A and FIG. 2B. When depressed half way (first state), the manipulating switch 8 generates a switching signal for causing the both cases 1 and 2 to turn to a close position or to face each other, and when depressed hull way (second state), the manipulating switch 8 generates a switching signal to activate the zoom function of the image pick-up unit 4. The shutter switch 9 is provided on the side surface of the case 2 next to the manipulating switch 8 and in the vicinity of the rotation shaft 3, as shown in FIG. 2A and FIG. 2B. When depressed, the shutter switch 9 generates a switch signal for causing the image pick-up unit 4 to obtain a pick-up image.

The rotation shaft 3 is formed substantially in a cylindrical shape, and is provided in the first case 1 and the second case 2 at their one end portion so as to penetrate through the both cases 1 and 2 with the both cases 1 and 2 precisely facing each other and with one end of the rotation shaft 3 exposed on a rear surface of the second case 2 (or at a left side of the second case 2 as seen in FIG. 2A). In other words, the rotation shaft 3 is firmly fixed to the first case 1 at its right end portion and is rotatably fixed to the second case 2 at its left end portion, and thereby the second case 2 is rotatably attached to the first case 1 and vice versa, and the both cases are allowed to turn or rotate in one plane about the rotation shaft 3.

As described above, the first case 1 and the second case 2 are allowed to rotate or turn about the rotation shaft 3, as shown in FIG. 1 through FIG. 5, and therefore both cases 1 and 2 are kept to precisely face each other, as shown in FIG. 1, FIG. 2A and FIG. 3, and the both cases 1 and 2 may be kept at a predetermined angle to each other, for example, at an angle of 90 or 180 degrees as shown in full line or in broken line in FIG. 4 and FIG. 5. It should be noted that the both cases 1 and 2 are electrically connected to each other through a connecting member (not shown) running through the rotation shaft 3.

The image pick-up unit 4 is mounted in the rotation shaft 3 and has the zoom function or a telephotographing function. The image pick-up unit 4 has its photographing direction directing outwardly from the inside of the second case 2, and is allowed to move along the axis of the rotation shaft 3 provided in the second case 2. In other words, as shown in FIG. 6 through FIG. 8, the image pick-up unit 4 is equipped with a cylindrical camera-cone 11, which is coaxially fixed within the rotation shaft 3, a first lens frame 12 and a second lens frame 13, which are provided within the cylindrical camera-core 11 and are movably along the axis of the camera-core, a first lens 14 and a second lens 15, which are fixed on the first lens frame 12 and the second lens frame 13, respectively, an image pick-up element 17 consisting of a crystal filter 16a, a protection glass 16b and CCD, which are disposed within the camera core 11, and a zoom mechanism 18 which serves to move the first lens frame 12 and the second lens frame 13 along an optical axis, i.e., the axis of the rotation shaft 3.

The image pick-up element 17 is disposed on the axis of the camera cone 11, i.e., on the axis of the rotation shaft 3, and serves to convert a pick-up image of an object H projected thereon through the first lens 14 and the second lens 15 into an electric signal. The camera core 11 is formed with a guide slot 11a in its periphery surface, which slot penetrates from the outer surface to the inner surface of the camera core 11 and runs along the axis of the rotation shaft 3, as shown in FIG. 6 through FIG. 8. The first lens frame 12 and the second lens frame 13 have a first projection 12a and a second projection 13a respectively, which are inserted into the guide slot 11a to project from the peripheral surface of the camera core 11, and which are allowed to move along the guide slot 11a, wherein the first lens frame 12 and the second lens frame 13 are allowed to move along the axis of the rotation shaft 3 together with the first lens 14 and the second lens 15, without rotating within the camera cone 11.

Figure 6:
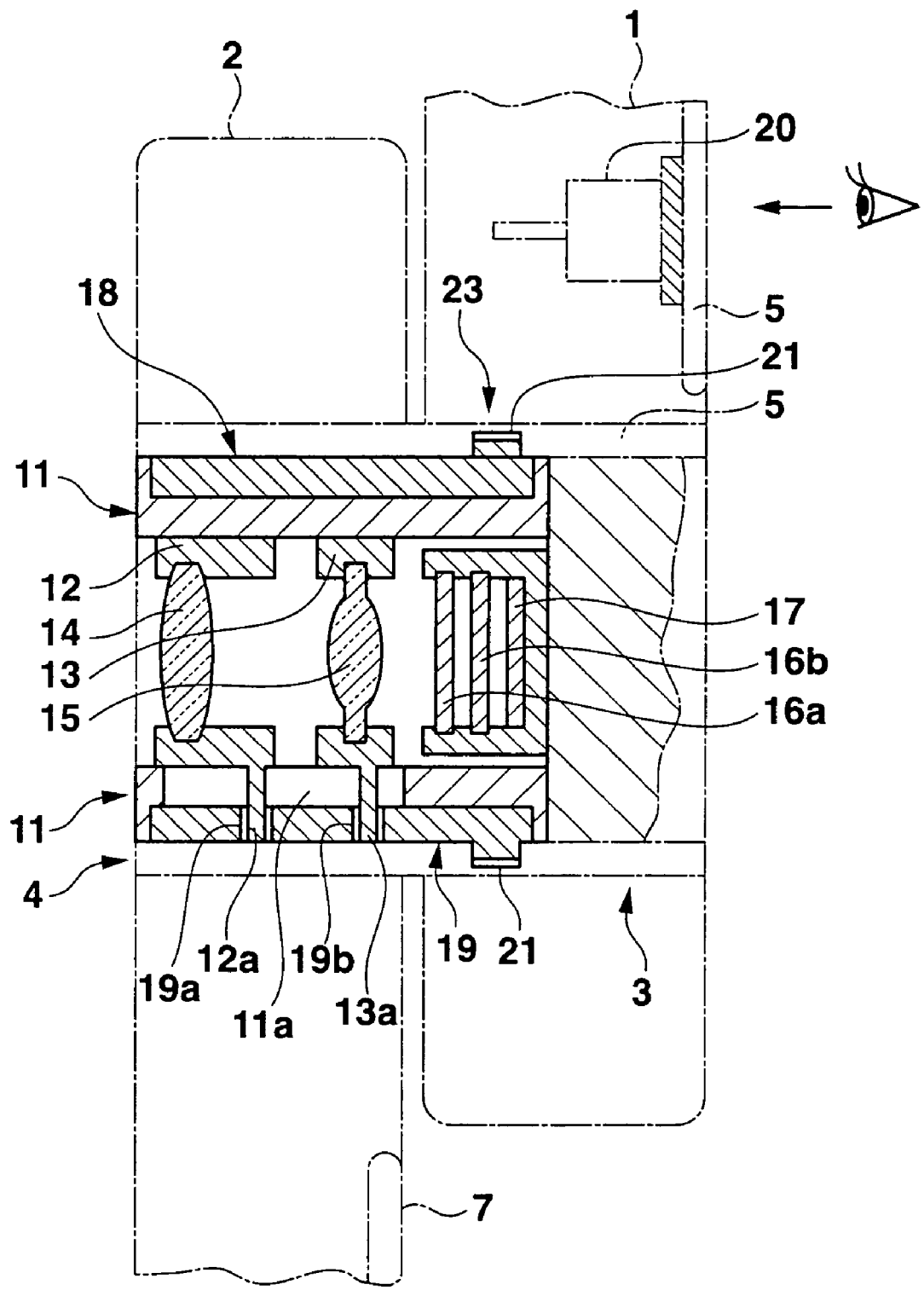
FIG. 6 is a partial enlarged view illustrating the image pick-up unit shown in FIG. 2B.
Figure 7:
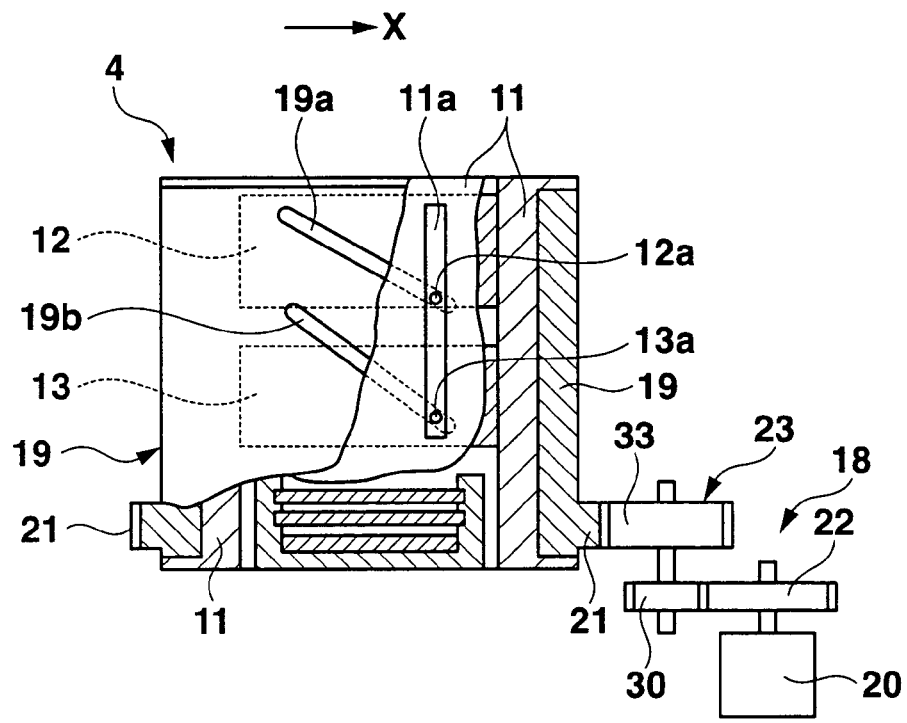
FIG. 7 is a cross-sectional view illustrating a zoom mechanism of the image pick-up unit of FIG. 6.
Figure 8:
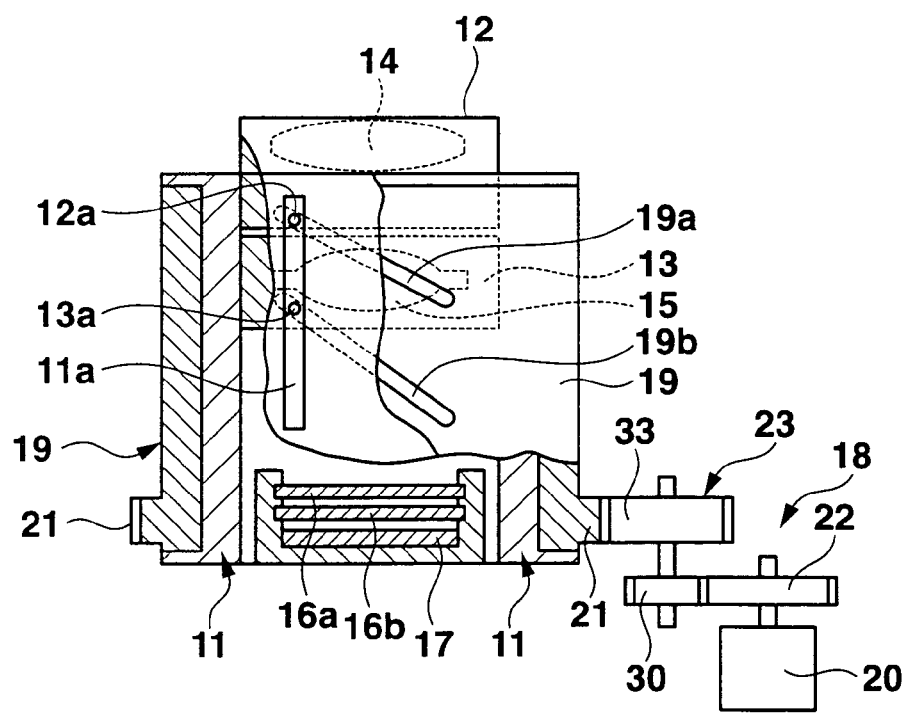
FIG. 8 is a cross-sectional view illustrating the zoom mechanism of the image pick-up unit of FIG. 7.

As shown in FIG. 6 through FIG. 10, the zoom mechanism 18 is equipped with a rotary cylinder 19, which is provided so as to keep the camera cone 11 therein and to concentrically rotate outside the external peripheral surface of the camera cone 11. The rotary cylinder 19 is rotatably provided at a predetermined position of the external peripheral surface of the camera cone 11 within the rotation shaft 3 so as to rotate without traveling along its own axis, as shown in FIG. 6. The rotary cylinder 19 is formed with a first spiral groove 19a and a second spiral groove 19b in its internal peripheral surface, which run along the axis of the cylinder 19, as shown in FIG. 7 and FIG. 8.

Figure 9:
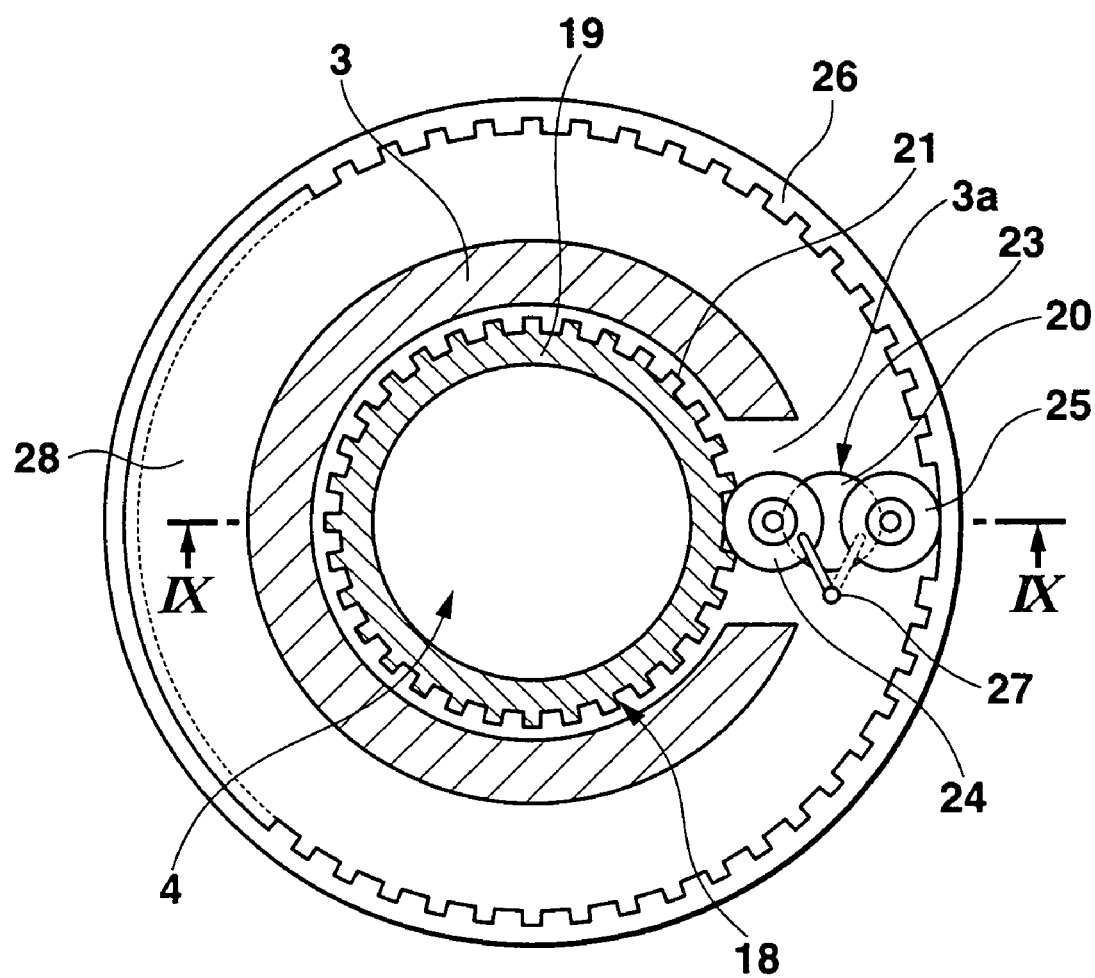
FIG. 9 is a plan view illustrating a rotation transmitting unit, in which a motor turns a first case relatively to a second case.
Figure 10:
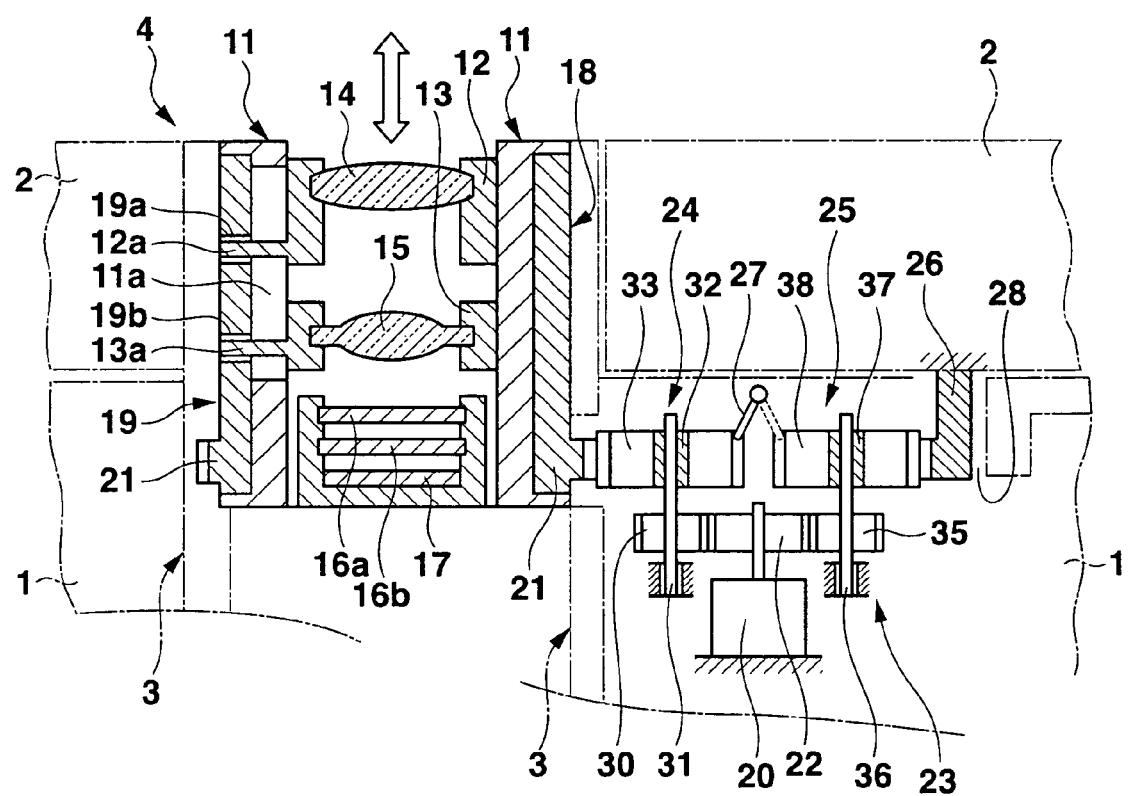
FIG. 10 is an enlarged cross-sectional view illustrating the rotation transmitting unit of FIG. 9 taken along the line IX-IX.

The first spiral groove 19a receives the first projection 12a of the first lens frame 12 which appears through the guide slot 11a formed in the camera cone 11, and the second spiral groove 19b receives the second projection 13a of the second lens frame 13 which appears through the guide slot 11a of the camera cone 11, as shown in FIG. 7. The rotary cylinder 19 has a driven gear 21 on its external peripheral surface. A motor 20 is fixed to the first case 1 in the vicinity of the rotation shaft 3, and has a driving gear 22 on its output shaft, as shown in FIG. 9 and FIG. 10. The driving rotation of the motor 20 is transferred to the driven gear 21 through the driving gear 22 and a rotation transmitting unit 23 to be described later.

In the zoom mechanism 18, when rotation of the output shaft of the motor 20 is transmitted to the rotary cylinder 19 through the driving gear 22, the rotation transmitting unit 23, and the driven gear 21, the rotary cylinder 19 rotates to rotate the first spiral groove 19a and the second spiral groove 19b, as shown in FIG. 6 through FIG. 8. The rotating first spiral groove 19a and second spiral groove 19b of the rotary cylinder 19 cooperate with the guide slot 11a of the camera cone 11 to move the first projection 12a and the second projection 13a of the lens frames 12 and 13, that is, the first lens 14 and the second lens 15 along the axis of the rotation shaft 3.

When the motor 20 rotates in a normal rotation direction to rotate the rotary cylinder 19 in a direction indicated by an arrow X in FIG. 7, the first spiral groove 19a moves or brings the first lens frame 12 in a direction away from the image pick-up element 17, that is, in the upward direction as seen in FIG. 7, and the second spiral groove 19b moves the second lens frame 13 in the same direction as the first lens frame 12, bringing the second lens frame 13 closer to the first lens frame 12, and thereby the zoom mechanism 18 is set to the telephotographing 5 mode. Meanwhile, when the motor 20 rotates in the reverse rotation direction to rotate the rotary cylinder 19 in a direction different from indicated by the arrow X, the first lens frame 12 and the second lens frame 13 are brought close to the image pick-up element 17, or in the downward direction as seen in FIG. 7, and thereby the zoom mechanism 18 stores the first lens 14 and second lens 15 in the rotation shaft 3.

The rotation transmitting unit 23 is equipped with a first transmission wheel 24 for transmitting the rotation of the motor 20 to the zoom mechanism 18 in the image pick-up unit 4, a second transmission wheel 25 for transmitting the rotation of the motor 20 to a ring gear 26 provided in the second case 2, and a switching lever 27 for transmitting the rotation of the motor 20 to either the zoom mechanism 18 in the image pick-up unit 4 or the ring gear 26 of the second case 2, as shown in FIG. 9 and FIG. 10. The ring gear 26 of the second case 2 has cogs on its internal peripheral and is mounted on a bottom surface of the second case 2 coaxially with the rotation shaft 3. The ring gear 26 of the second case 2 is received in a round opening 28 formed in the first case 1, and rotates about the axis of the rotation shaft 3 together with the second case 2, as shown in FIG. 9 and FIG. 10.

As shown in FIG. 10, the first transmission wheel 24 is equipped with a first intermediate gear 30, which engages with the driving gear 22 provided on the output shaft of the motor 20, a first rotary shaft 31, which is rotatably supported by the first case 1 and is provided with the first intermediate gear 30, and a first transmission gear 33, which is attached to the first rotary shaft 31 via a first slipping mechanism 32 and is engaged with the driven gear 21 of the zoom mechanism 18. With a load less than a predetermined load applied to, the first transmission gear 33 rotates together with the first intermediate gear 30 of the first rotary shaft 31 without a slip to transmit the rotation of the motor 20 to the driven gear 21 of the zoom mechanism 18, rotating the rotary cylinder 19 of the zoom mechanism 18. With a load more than the predetermined load applied to the first transmission gear 33, the first slipping mechanism 32 slips to make the first intermediate gear 30 of the first rotary shaft 31 idle, transmitting no rotation of the motor 20 to the rotary cylinder 19 of the zoom mechanism 18.

As shown in FIG. 10, the second transmission wheel 25 is equipped with a second intermediate gear 35, which engages with the driving gear 22 provided on the output shaft of the motor 20, a second rotary shaft 36, which is rotatably supported by the first case 1 and is provided with the second intermediate gear 35, and a second transmission gear 38, which is attached to the second rotary shaft 36 via a second slipping mechanism 37 and is engaged with the ring gear 26 of the second case 2. With a load less than a predetermined load applied to, the second transmission gear 38 rotates together with the second intermediate gear 35 of the second rotary shaft 36 without a slip to transmit the rotation of the motor 20 to the ring gear 26 of the first case 1, rotating the second case 2 relatively to the first case 1 rotary cylinder 1. With a load more than the predetermined load applied to the second transmission gear 38, the second slipping mechanism 37 slips to make the second intermediate gear 35 of the second rotary shaft 36 idle, transmitting no rotation of the motor 20 to the ring gear 26 of the second case 2.

The switching lever 27 serves to apply a load heavier than the predetermined load to either the first transmission gear 33 or the second transmission gear 38 in response to manipulation of the manipulating switch 8, transmitting the rotation of the motor 20 to either the first transmission gear 33 or the second transmission gear 38. More specifically, as shown in FIG. 9 and FIG. 10, the switching lever 27 is provided in the vicinity of the first transmission gear 33 and the second transmission gear 38. When the manipulating switch 8 is depressed half way or brought to the first state, the switching lever 27 keeps the first transmission gear 33 out of engagement, and allows the second transmission gear 38 to transmit the rotation of the motor 20 to the ring gear 26, turning the second case 2 relatively to the first case 1. When the manipulating switch 3 is depressed full way or brought to the second state, the switching lever 27 keeps the second transmission gear 38 out of engagement and releases or allows the first transmission gear 33 to transmit the rotation of the motor 20 to the rotary cylinder 19 of the zoom mechanism 18.

There is provided an optical sensor unit 39 on the surfaces of the first case 1 and the second case 2 in the vicinity of the rotation shaft, which surfaces face each other, for detecting an rotation angle of the first case 1 relative to the second case 2, as shown in FIGS. 2A and 2B, and FIG. 3. The optical sensor unit 39 includes a light emitting element 40 mounted on the first case 1, and plural light receiving elements 41a through 41c mounted on the second case 2. The light receiving elements 41a through 41c are disposed respectively at the positions on the second case 2, which positions locate along an imaginary locus drawn on the second case 3 by the light emitting element 40 when the first case 1 is turned relatively to the second case 2. More specifically, the first light receiving element 41a is disposed at a first position on the second case 2, at which first position the first light receiving element 41a receives the light from the light emitting element 40 on the first case 1, when the first case 1 and the second case 2 are kept to precisely face each other or when one case is piled on top of other case. The second light receiving element 41b is disposed at a second position on the second case 2, at which second position the second light receiving element 41b receives the light from the light emitting element 40 on the first case 1, when the first case 1 is turned at an angle of 90 degrees relatively to the second case 2. The third light receiving element 41c is disposed at a third position on the second case 2, at which third position the third light receiving element 41c receives the light from the light emitting element 40 on the first case 1, when the first case 1 is turned at an angle of 180 degrees relatively to the second case 2.

The optical sensor unit 39 detects that the first case 1 and the second case 2 face each other precisely, when the light emitted from the light emitting element 40 is received by the first light receiving element 41a, as shown in FIG. 1 through FIG. 3. The optical sensor unit 39 detects that the first case 1 is kept turned at an angle of 90 degrees relatively to the second case 2, when the light emitted from the light emitting element 40 is received by the second light receiving element 41b, as shown in broken line in FIG. 4. The optical sensor unit 39 detects that the first case 1 is kept turned at an angle of 180 degrees relatively to the second case 2, when the light emitted from the light emitting element 40 is received by the third light receiving element 41c, as shown in FIG. 4.

Figure 11:
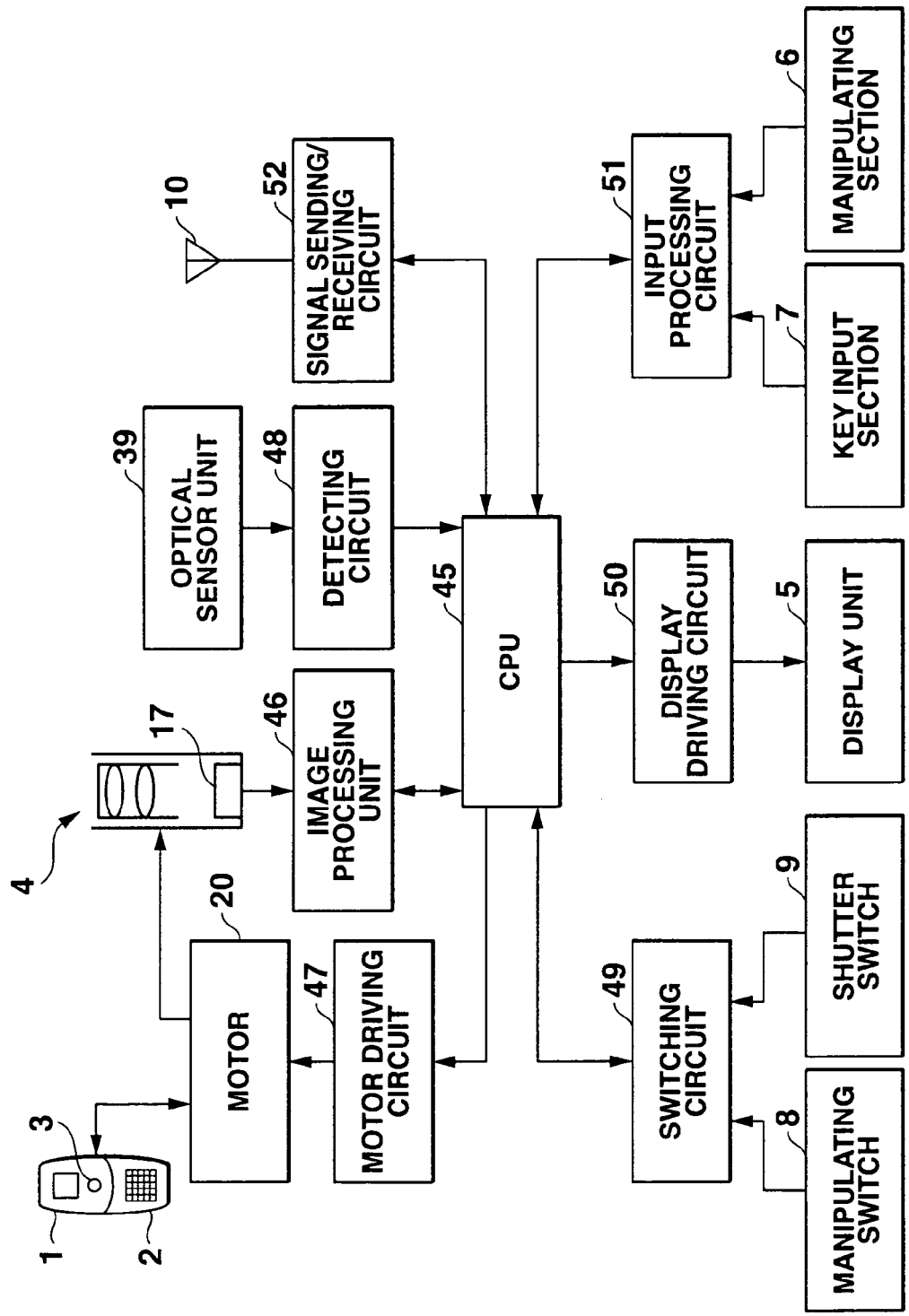
FIG. 11 is a block diagram illustrating a circuit configuration of the handheld electronic apparatus according to the first embodiment.

Now, a circuit configuration of the cellular phone will be described with reference to FIG. 11.

The circuit configuration of the cellular phone comprises a central processing unit (CPU) 45, an image processing circuit 46, a motor driving circuit 47, a detecting circuit 48, a switching circuit 49, a display driving circuit 50, an input processing circuit 51, and a signal sending/receiving circuit 52. The CPU 45 serves to control the whole circuit of the cellular phone. The image processing circuit 46 processes an image pick-up signal transmitted from the image pick-up element 17 such as CCD. The motor driving circuit 47 controls the motor which serves to drive the zoom mechanism of the image pick-up unit 4 and to turn the first case 1 relatively to the second case 2. The detecting circuit 48 drives the optical sensor 39 to process a detection signal sent from the light receiving elements 41a through 41c. The switching circuit 49 processes electric signals generated in response to manipulation of the manipulating switch 8 and the shutter switch 9. The display driving circuit 50 controls the display unit 5 for displaying information such as telephone data and photographed images. The input processing circuit 51 processes an input signal from the manipulating section 6 and the key input section 7. The signal sending/receiving circuit 52 serves to process information to be sent via the antenna 10, such as communication information and image pick-up data and to process a signal received via the antenna 10.

Figure 12:
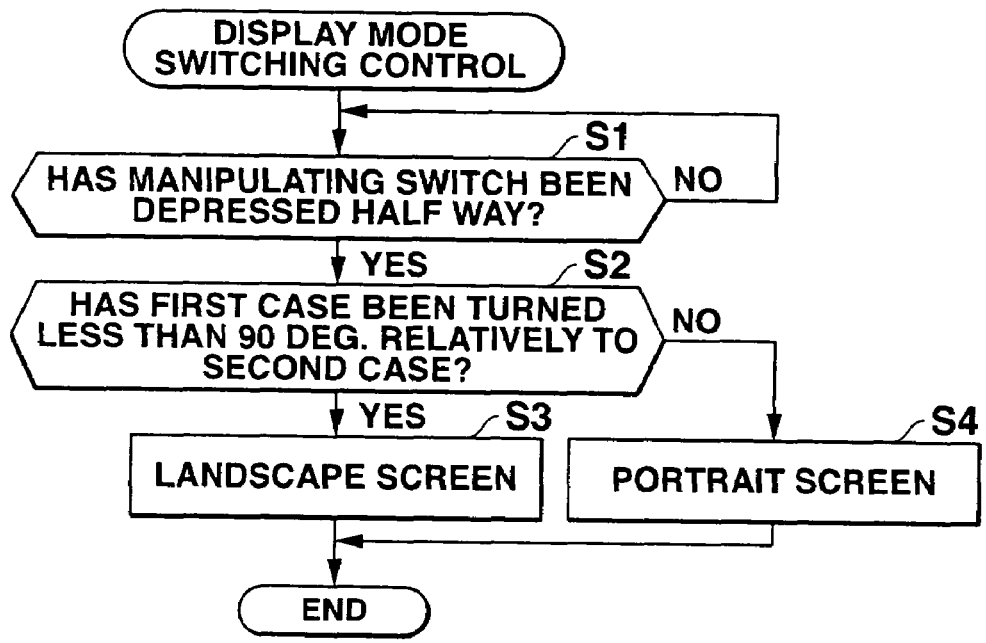
FIG. 12 is a flow char of a display mode switching control process performed for a display unit of FIG. 11.
Figure 13:
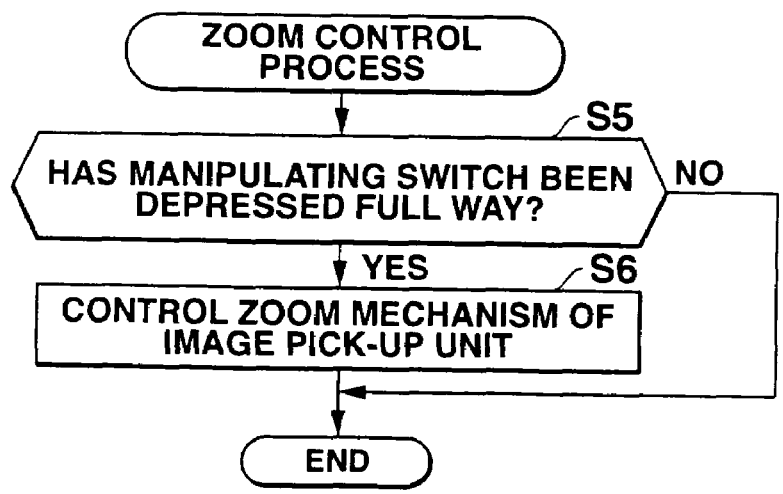
FIG. 13 is a flow chart of a zoom control process performed for the image pick-up unit of FIG. 11.

A display switching control process and a zoom process in the cellular phone will be described with reference to FIG. 12 and FIG. 13.

In the display mode switching control process, it is judged at step S1 whether or not the manipulation switch 8 has been depressed half way, that is, whether or not the manipulation switch 8 has been brought to the first state. When the manipulation switch 8 has not been manipulated, manipulation of the manipulation switch 8 is waited for. When it is determined at step S1 that the manipulation switch 8 has not been depressed half way or has been brought to the first state, the switching lever 27 of the rotation transmitting unit 23 keeps the first transmission gear 33 out of engagement, and allows the second transmission wheel 25 to transmit the rotation of the motor 20 to the ring gear 26, turning the second case 2 relatively to the first case 1.

Then, it is judged at step S2 whether or not the first case 1 has been turned at an angle of less than 90 degrees relatively to the second case 2. In other words, it is judged which one of the light receiving elements 41*a*, 41*b* and 41*c* has received the light emitted from the light emitting element 39 and generated a detection signal in order to determine a rotation angle at which the first case 1 is turned relatively to the second case 2. When the light emitting element 40 faces the first light receiving element 41*a* and this first light receiving element 41*a* generates the detection signal, or when the light emitting element 40 faces the second light receiving element 41*b* and the second light receiving element 41*b* generates the detection signal, it is determined that the first case 1 is turned at an angle of 90 degrees or less relatively to the second case 2. The display unit 5 is switched to display data in a landscape form at step S3 (full line in FIG. 4) and the process is finished. When the light emitting element 40 faces the third light receiving element 41*c* and this third light receiving element 41*c* generates the detection signal, it is determined that the first case 1 is turned at an angle of 180 degrees relatively to the second case 2. The display unit 5 is switched to display data in a portrait format at step S4 and the process is finished.

In the zoom control process (FIG. 13) in the cellular phone, it is judged at step S5 whether or not the manipulating switch 8 has been depressed full way that is, the manipulating switch 8 has been brought to the second state. When the manipulating switch 8 has not been depressed full way, that is, when the manipulating switch 8 has not been brought to the second state, the process is finished. When the manipulating switch 8 has been brought to the second state, the switching lever 27 of the rotation transmitting unit 23 brings the second transmission gear 38 out of engagement and allows the first transmission wheel 24 to transmit the rotation of the motor 20 to the rotary cylinder 19 of the zoom mechanism 18, controlling the zoom mechanism 18 at step S6.

As shown in FIG. 6 and FIG. 7, when the motor 20 of the zoom mechanism 18 in the image pick-up unit 4 rotates in a normal direction, the rotation of the motor 20 is transmitted to the rotary cylinder 19 through the driving gear 22, the first transmission wheel 24 of the rotation transmitting unit 23, and the driven gear 21 to rotate the cylinder 19 in the direction indicated by the arrow X in FIG. 6, and thereby the spiral groove 19*a* and the second spiral groove 19*b* formed in the rotary cylinder 19 rotate to cooperate with the guide slot 11*a* formed in the camera cone 11 to move the first projection 12*a* of the first lens frame 12 and the second projection 13*a* of the second lens frame 13 along the guide slot 11*a* in a direction away from the image pick-up element 17. More specifically, the first lens frame 12 and the second lens frame 13 carry the first lens 14 and the second lens 15 in the direction away from the image pick-up element 17, i.e., in an outward direction along the axis of the rotation shaft 3 to zoom in on an object H H in a distant place, and the process is finished.

Now, it will be described how the cellular phone with functions set forth above is used by a user. Since the cellular phone has the telephone function and the image pick-up function, the user can have a conversation with other in another place using the telephone function, and also can take a picture of an object H H using the image pick-up function and review the same on the display unit 5. When the telephone function of the cellular phone is used, the first case 1 is turned about the rotation shaft 3 at an angle of 180 degrees relatively to the second case 2, and thereby the first case 1 and the second case 2 are brought to an open state.

As shown in FIG. 4 (in full line), with the first case 1 and the second case 2 opened, the key input section 7 on the second case 2 and display screen of the display unit 5 on the first case 1 are exposed in the same direction. With the open state of the cellular phone, the user can send e-mail or have a conversation with someone in another place or send a photographed picture of an object H H by manipulating the manipulating section 6 and the key input section 7.

With the state of the cellular phone, the image pick-up unit 4 is stored in the rotation shaft 3 so that the image pick-up unit 4 does not interfere the user in using the phone for communication with other and is protected from an external shock.

When the image pick-up unit 4 is used to take a picture of an object H H, the first case 1 and the second case 2 are closed, as shown in FIG. 1 through FIG. 3, and are held by the user with his or her both hands on its both side portions. When the cellular phone is held with the display unit 5 on the first case 1 facing the user, the image pick-up unit 4 within the rotation shaft 3 faces the object H H to be photographed. When the manipulating switch 8, which is provided on the side of the second case 2 in the vicinity of the rotation shaft 3, is depressed full way (or is brought to the second state) with the image pick-up unit 4 facing the object H H, the motor 20 of the zoom mechanism 18 works to move the first lens 14 and the second lens 15 outwards from inside the rotation shaft 3, bringing the image pick-up unit 4 in a state ready for telephotographing.

In other words, when the manipulating switch 8 is depressed full way, the switching lever 27 of the rotation transmitting unit 23 engages with the second transmission gear 38 to make the same idle and allows the first transmission wheel 24 to transfer the rotation of the motor 20 to the rotary cylinder 19 of the zoom mechanism 18, as shown in FIG. 9 and FIG. 10. When the motor 20 of the zoom mechanism 18 rotates in a normal direction, then the rotation of the motor 20 is transferred to the rotary cylinder 19 through the driving gear 22, the first transmission wheel 24 of the rotation transmitting unit 23, and the driven gear 21 to rotate the rotary cylinder 19 in the direction indicated by the arrow X, as shown in FIG. 6 and FIG. 7.

Then, the first spiral groove 19*a* and the second spiral groove 19*b* formed in the rotary cylinder 19 turn to cooperate with the guide slot 11*a* formed in the camera cone 11 to move the first projection 12*a* of the first lens frame 12 and the second projection 13*a* of the second lens frame 13 along the guide slot 11*a*, as shown in FIG. 8. The first lens frame 12 and the second lens frame 13 move the first lens 14 and the second lens 15 along the axis of the rotation shaft 3 outwards form the inside of the rotation shaft 3 (FIG. 2B), bringing the image pick-up unit 4 in the state ready for telephotographing. A photographed image projected on the image pick-up element 17 through the first lens 14 and the second lens 15 is converted into an image signal and an image of the object H H is displayed on the display unit 5 based on the image signal. Therefore, the user can take a picture of the object H H by depressing the shutter switch 9 while viewing the image of the object H H displayed on the display unit 5.

The user is not always required to close the first case 1 and the second case 2 of the cellular phone to take a picture with this cellular phone. The cellular phone may be used for photographing with the first case 1 and the second case 2 kept opened, i.e., with the first case 1 turned at an angle of 90 degrees or 180 degrees relatively to the second case 2, as shown in FIG. 4 (in full line or in broken line). If the user holds the second case 2 in the palm of his or her left hand with the palm attached to the rear surface of the second case 2, the manipulating switch 8 and the shutter switch 9 locate in the vicinity of the thumb of the user's left hand holding the second case 2, and therefore the user is allowed to manipulate the manipulating switch 8 and the shutter switch 9 with his or her single hand holding the second case 2.

When the manipulating switch 8 is depressed half way with the first case 1 and the second case 2 kept open, the switching lever 27 of the rotation transmitting unit 23 makes the first transmission gear 33 idle, and allows the second transmission wheel 25 to transmit the rotation of the motor 20 to the ring gear 26 fixed to the second case 2. Then, the first case 1 (or the second case 2) turns relatively to the second case 2 (or the first case 1), to take an open position, as shown in FIG. 4 and FIG. 5. When the manipulating switch 8 is depressed full way with the first case 1 and the second case 2 kept open, the motor 20 of the zoom mechanism 18 rotates to bring the image pick-up unit 4 into a state ready for telephotographing, allowing the user to take a picture of the object H H by depressing the shutter switch 9 while viewing an image of the object H H displayed on the display unit 5.

In the cellular phone having the structure set forth above, the fist case 1 and the second case 1 are connected with each other in an openable and closable fashion through the rotation shaft 3, and the image pick-up unit 4, which has the zoom mechanism in the rotation shaft 3 is provided so as to face in the opposite direction from the display screen of the display unit 5. The user can hold the cellular phone with the image pick-up unit 4 facing the object H H to be photographed, even though the first case 1 and the second case 2 are kept an open state or in a closed state. Therefore, the user can take a picture of the object H H while viewing an image of the object H H displayed on the display unit 5. Since the motor 20 moves the zoom mechanism 18 along the axis of the rotation shaft 3, the user also can arrange the size of the image of the object H H to be photographed while viewing the image displayed on the display unit 5, providing an easy manipulation for taking a picture.

The first case 1 and the second case 2 are connected with each other in an openable and closable fashion through the rotation shaft 3, which holds the image pick-up unit 4 therein, and therefore the cellular phone is made simple in structure and at a low price. Furthermore, since the rotation transmitting unit 23 transmits, in response to the manipulation of the manipulating switch 8, the rotation of the motor 20 to the second case 2 to turn the first case 1 relatively to the second case 2, the first case 1 and the second case 2 can be brought to the open state or the closed state by a simple manipulation. As described above, since the driving power of the zoom mechanism 18 is used, there is no need to prepare a power source specialized in turning the first case 1 or the second case 2, restricting the number of the power sources to the minimum and saving manufacturing cost.

Since the image pick-up unit 4 is provided within the rotation shaft 3 so as to allow its zoom mechanism 18 to move along the axis of the rotation shaft 3, the display unit 5 on the first case 1 and the key input section 7 on the second case 2 are not limited in their layouts by the zoom mechanism of the image pick-up unit 4 and spaces sufficient for the display unit 5 and the key input section 7 are ensured on the first case 1 and the second case 2, respectively. Since the rotation shaft 3 is provided in the first case 1 such that the end portion of the rotation shaft 3 does not appear at the front surface of the first case 1, the manipulating section 6 may be disposed on the position corresponding to the rotation shaft 3, providing a wider space for key input section 7.

In the cellular phone, since the display unit 5 is mounted on the externally exposed surface of the first case 1 with the first case 1 and the second case 2 kept closed, the display unit 5 is exposed at all times even with the both cases 1 and 2 kept closed or with the both cases 1 and 2 kept open, allowing the user to review data displayed on the display unit 5 without any restriction. In particular, since the image pick-up unit 4 is received in the rotation shaft 3 with its photographing direction opposite of the display screen of the display unit 5, the user can photograph an object H H while viewing the image of the object H H displayed on the display unit 5 even though these cases 1 and 2 are kept open or closed, and therefore the user can enjoy a user-friendly photographing function of the cellular phone.

In the present cellular phone, the key input section 7 is provided on the second case 2 so as to face the same direction as the display screen of the display unit 5. When the first case 1 is turned about the rotation shaft 3 relatively to the second case 2 with the key input section 7 facing the same direction as the display screen of the display unit 5, and these cases 1 and 2 are kept open, the key input section 7 and the display screen of the display unit 5 are exposed in the same direction. Therefore, the user can manipulate the key input section 7 while viewing the display unit 5. When these cases 1 and 2 are closed, or are stacked on each other, the key input section 7 on the second case 2 is protected from an external shock by the first case 1. Further, when the cellular phone is carried by the user with these cases 1 and 2 closed, erroneous manipulation to the key input section 7 is prevented.

The manipulating switch 8 and the shutter switch 9 are mounted on the side wall of the second case 2, and therefore the manipulating switch 8 and the shutter switch 9 give no restriction to the layouts of the display unit 5 and the key input section 7, allowing wide spaces for installing the display unit 5 and the key input section 7. In particular, since the manipulating switch 8 and the shutter switch 9 are exposed externally at all times, the user can manipulate the manipulation switch 8 and the shutter switch 9 without any restriction, whether the both cases 1 and 2 are in a closed state or in an open state, and therefore the user can enjoy a user-friendly photographing function of the cellular phone.

In the present cellular phone, the manipulating switch 8 and the shutter switch 9 are mounted on the side wall of the second case 2 in the vicinity of the rotation shaft 3 as described above. Therefore, when the user holds with his or her both hands the cellular phone with the both case closed as shown in FIG. 1, the user is allowed to easily touch the manipulating switch 8 and the shutter switch 9 with his or her finger to manipulate theses switches without failure for photographing manipulation. Further, when the user holds the cellular phone with the both case kept open as shown in FIG. 4 from its rear side with his or her one hand, the user is also allowed to easily touch the manipulating switch 8 and the shutter switch 9 with his or her finger to manipulate theses switches without failure for photographing manipulation.

When the manipulating switch 8 is depressed half way (first state), the switching lever 27 of the rotation transmitting unit 23 makes the first transmission gear 33 idle, and allows the second transmission wheel 25 to transmit the rotation of the motor 20 to the ring gear 26 fixed to the second case 2. Then, the first case 1 (or the second case 2) turns relatively to the second case 2 (or the first case 1). When the manipulating switch 8 is depressed full way (second state), the switching lever 27 makes the second transmitting gear 38 idle, and allows the first transmitting wheel 24 to transfer the rotation of the motor 20 to the zoom mechanism 18 of the image pick-up unit 4 to bring the image pick-up unit 4 into a state ready for telephotographing, allowing the user to arrange the size of an image of the object H H for setting an angle of the object H H.

As described above, in the present cellular phone an operation for bringing the first case 1 and the second case 2 to the open state or the closed state, or a zooming operation for the zoom mechanism 18 may be selected by a single operation of the manipulating switch 8. With one touch operation, the first case 1 and the second case 2 may be brought to the open state or the closed state, or the zoom mechanism may be operated. Therefore, the number of switches to be installed on the cellular phone may be minimized, reducing the number of parts and the manufacturing costs of the cellular phone.

Further in the present cellular phone, when the first case 1 (or the second case 2) is turned about the rotary shaft 3 to be stacked on or precisely face the second case 2 (or the first case 1), or when the first case 1 (or the second case 2) is turned about the rotary shaft 3 at an angle of 90 degrees relatively to the second case 2 (or the first case 1), the display unit 5 is switched to display the landscape screen. When the first case 1 (or the second case 2) is turned about the rotary shaft 3 at an angle of 180 degrees relatively to the second case 2 (or the first case 1), the display unit 5 is switched to display the portrait screen. The user can review an image of an object H H on the landscape screen with the both cases 1 and 2 kept in the closed state or with the first case 1 (or the second case 2) turned at 90 degrees relatively to the second case 2 (or the first case 1). Meanwhile, the user can review an image of an object H H on the portrait screen with the first case 1 (or the second case 2) turned at 180 degrees relatively to the second case 2 (or the first case 1).

As described above, the display screen of the display unit 5 is automatically switched from the landscape screen to the portrait screen or from the portrait screen to the landscape screen depending on the angle between the first case 1 and the second case 2. Therefore, the user can review the image of the object H H to be photographed in his or her preferable way be changing the angle between these cases 1 and 2. In particular, when the manipulating switch is depressed half way (thirst state), the rotation of the motor 20, which drives the zoom mechanism 18 of the image pick-up unit 4, is transferred to the ring gear 26 of the second case 2 through the rotation transmitting unit 23 and at the same time the optical sensor unit 39 detects a relative angle between the first case 1 and the second case 2. The CPU 45 controls the display form (landscape screen or portrait screen) of the display unit 5 based on a detection signal generated by the optical sensor unit 39. In the present cellular phone, the first case 1 and the second case 2 can be brought to the open state or the closed state by one touch operation, and the display unit 5 is automatically switched from the landscape screen to the portrait screen or from the portrait screen to the landscape screen depending on the relative angle between the first case 1 and the second case 2. Therefore, the user can enjoy the user-friendly cellular phone.

Second Embodiment

Figure 14:
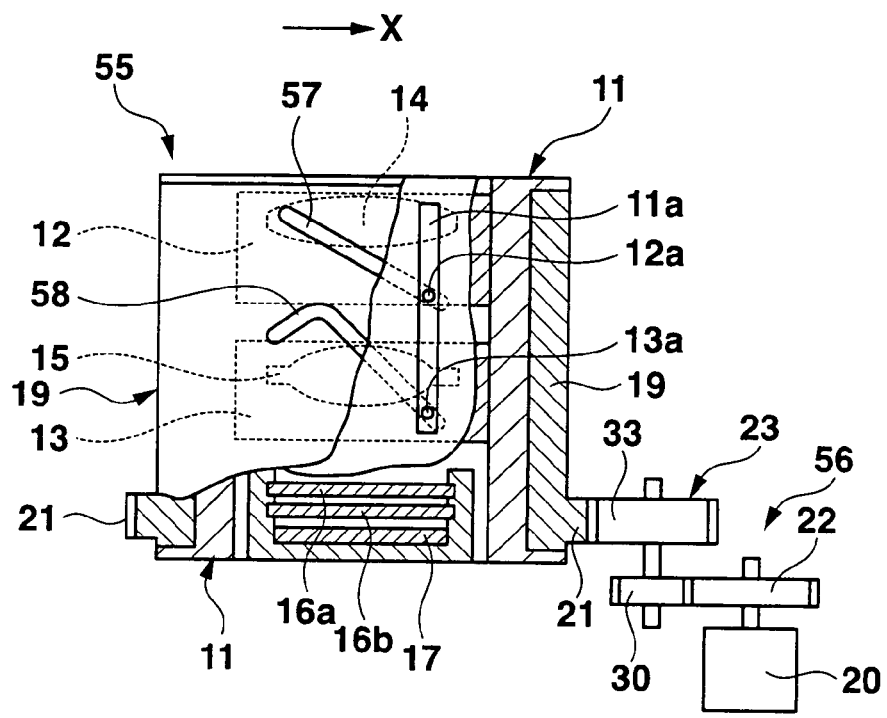
FIG. 14 is an enlarged view of an image pick-up unit in a handheld electronic apparatus according to a second embodiment of the present invention.
Figure 15:
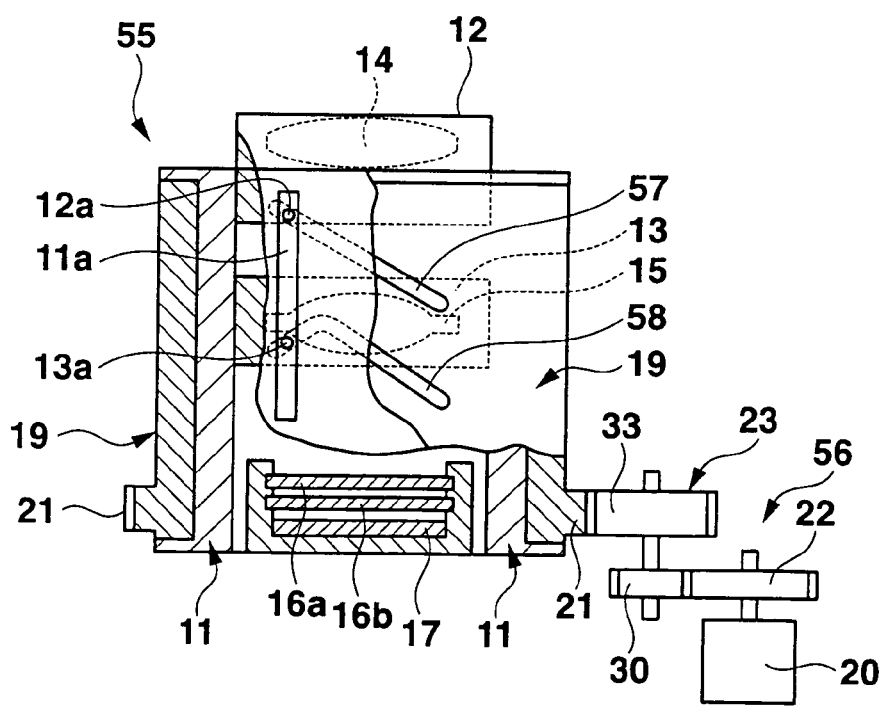
FIG. 15 is an enlarged cross-sectional view of the image pick-up unit of FIG. 14 in a telephotographing state.

A second embodiment of the present invention, in which the present invention is used in a cellular phone will be described with reference to FIG. 14 and FIG. 15. In FIG. 14 and FIG. 15, like elements as those in FIG. 1 through FIG. 13 are designated by like reference numerals.

The cellular phone comprises an image pick-up unit 55, which has a telephotographing function and a wide-angle photographing function, and substantially same arrangements as those of the first embodiment except the above image pick-up unit 55. The image pick-up unit 55 has a zoom mechanism 56 which is different from the zoom mechanism 18 of the first embodiment in structure for moving the first lens frame 12 holding the first lens 14 and the second lens frame 13 holding the second lens 15 along its axis.

The zoom mechanism 56 has the rotary cylinder 19, which is coaxially and rotatably mounted around the camera cone 11, and in an inner surface of which a first spiral groove 57 is formed for receiving the first projection 12a of the first lens frame 12 and a second spiral groove 58 is formed for receiving the second projection 13a of the second lens frame 13. When the rotary cylinder 19 is driven by the motor 20 in the rotating direction indicated by the arrow X in FIG. 14, the first spiral groove 57 guides or moves the first lens frame 12 outwards from the inside of the rotation shaft 3 (upwards as seen in FIG. 15) Meanwhile, when the rotary cylinder 19 is driven by the motor 20 in the rotating direction indicated by the arrow X in FIG. 14, the second groove 58 guides or moves the second lens frame 13 outwards from the inside of the rotation shaft 3 (upwards as seen in FIG. 15) first to bring the second lens frame 13 closer to the first lens frame 12 and second to bring the second lens frame 13 away from the first lens frame 12.

As described above, the zoom mechanism 56 moves the first lens frame 12 and the second lens frame 13 outwards from the inside of the rotary shaft 3(upwards as seen in FIG. 14), bringing the second lens frame 13 closer to the first lens frame 12. In this way the image pick-up unit 4 is brought to the telephotographing state. Meanwhile, the zoom mechanism 56 moves the first lens frame 12 and the second lens frame 13 outwards from the inside of the rotary shaft 3 (upwards as seen in FIG. 14), bringing the second lens frame 13 closer to the image pick-up element 17 and apart from first lens frame 12. In this way the image pick-up unit 4 is brought to the wide-angle photographing state. In the present second embodiment, a switch (not shown) for selecting the zoom function is provided in the vicinity of the shutter switch 9. This switch is used to switch the telephotographing function to the wide-angle photographing function or to switch the wide-angle photographing function to the telephotographing function.

The user of the cellular phone described above can enjoy the features similar to those of the first embodiment, and further can use the same for telephotographing and wide-angle photographing purposes. That is, when the switch (not shown) for selecting the zoom function is manipulated to select the telephotographing function, the motor 20 of the zoom mechanism 56 rotates the rotary cylinder 19. Then the first spiral groove 57 and the second spiral groove 58 formed in the rotary cylinder 19 moves the first lens frame 12 and the second lens frame 13 outwards from the inside of the rotation shaft 3, bringing the second lens frame 13 closer to the first lens frame 12 to set the image pick-up unit 4 ready for telephotographing. Then, the user can use the present cellular phone for telephotographing. Meanwhile, when the switch is operated to select the wide-angle photographing function, the motor 20 of the zoom mechanism 56 rotates the rotary cylinder 19. Then the first spiral groove 57 and the second spiral groove 58 formed in the rotary cylinder 19 moves the first lens frame 12 and the second lens frame 13 outwards from the inside of the rotation shaft 3, first bringing the second lens frame 13 closer to the first lens frame 12 and then bringing the second lens frame closer to the image pick-up element 17 to set the image pick-up unit 4 ready for wide-angle photographing. Then, the user can use the present cellular phone for wide-angle photographing.

Third Embodiment

A third embodiment of the present invention, in which the present invention is used in a cellular phone will be described with reference to FIG. 16 through FIG. 24. In the drawings, like elements as those in FIG. 1 through FIG. 13 are designated by like reference numerals. The cellular phone according to the present embodiment has the telephone function and the image pick-up function as has the first embodiment, and comprises the first case 1 and the second case 2, both of which are arranged to face each other, or such that one piles on top of other. The first case 1 and the second case 2 are rotatably connected to each other by means of the rotation shaft 3 of a generally cylindrical shape. An image pick-up unit 60 with a zoom function is provided in the rotation shaft 3. In the vicinity of the image pick-up unit 60, a first strobe light unit 61 and a second strobe light unit 62 are mounted.

The first case 1 is made in a generally rectangular shape, and is provided with the display unit 5, the manipulating section 6, and the speaker unit 53 on its front surface or external surface, which surface is exposed outwardly with the second case 2 piled on top of the first case 1. (Refer to FIG. 1 and FIG. 4). The display unit 5 consists of a display element of a flat screen type provided on the first case 1, such as a liquid crystal display element and an electro-luminescence display element (EL display element), and has a flat display screen to electro-optically display data such as phone data for the telephone function and image data photographed by the image pick-up unit 4. The manipulating section 6 includes various buttons such as a jog dial for switching various modes such as the telephone function and the photographing function, a power button, a communication button for a phone call, a shift button, and the like. The manipulating section 6 is disposed at a position corresponding to the rotation shaft 3, as shown in FIG. 4.

Figure 16:
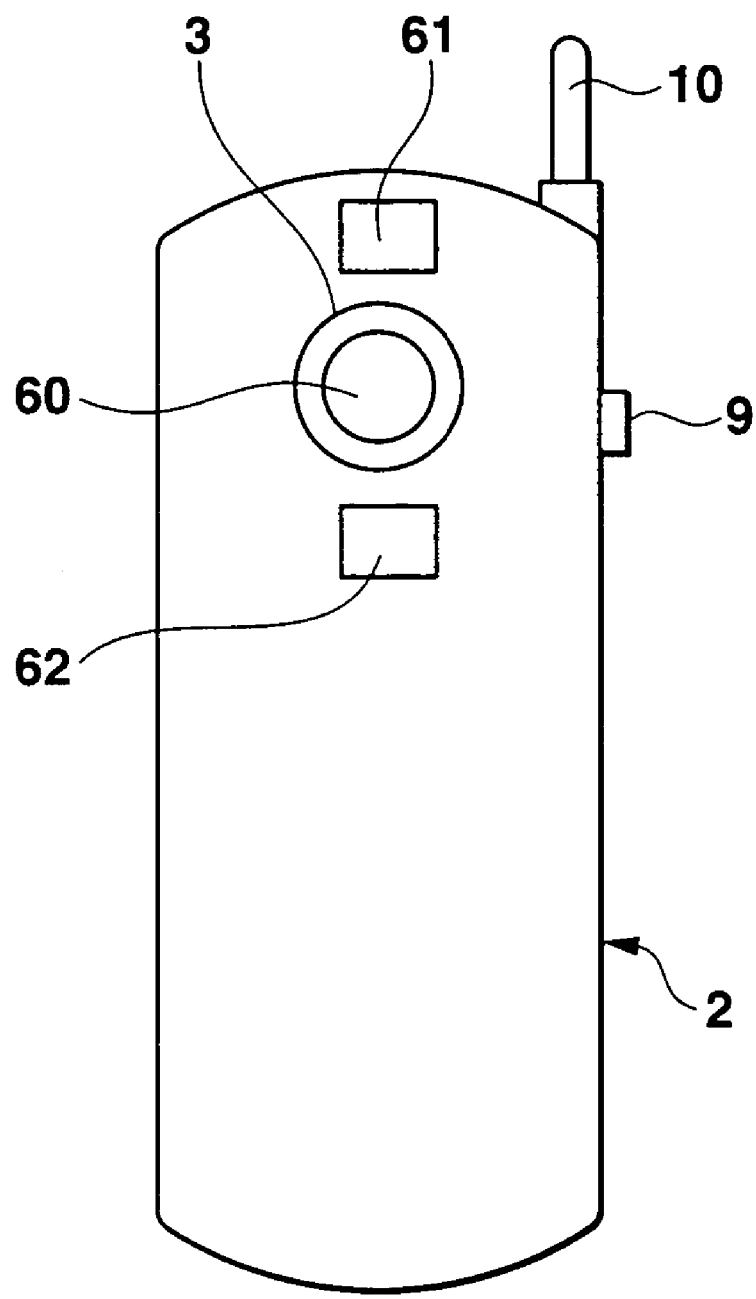
FIG. 16 is a rear view illustrating a handheld electronic apparatus according to a third embodiment of the present invention.

The second case 2 is of the substantially same shape as the first case 1 and has a key input section 7 and a microphone unit 54 on its surface which faces the first case 1 as shown in FIG. 4, when the case 1 is brought or rotated around the rotation shaft 3 to the closing position. Further, the second case 2 is provided with the shutter switch 9 on its side wall as seen in FIG. 16. The case 2 is equipped with an antenna 10 in the vicinity of the rotation shaft 3. The antenna 10 is extendable in the direction of its axis. The key input section 7 includes various keys to be manipulated for the telephone functions, such as ten keys, a memory key, a manner key, and the like, which are disposed on the surface which faces the first case 1 with the case 1 brought or turned about the rotation shaft 3 so as to face the second case 2, as shown in FIG. 4.

The shutter switch 9 is provided on the side wall of the second case 2 in the vicinity of the rotation shaft 3, and when depressed half way, the shutter switch 9 in the first state generates a switch signal to make the zoom mechnism of the image pick-up unit 60 operate for adjusting the focus and emiting direction of the strobe light units 61 and 62, and when depressed full way, the shutter switch 9 in the second state generates a switch signal make the strobe light units 61 and 62 emit light and to make the image pick-up unit 60 photograph an object H H.

Figure 17:
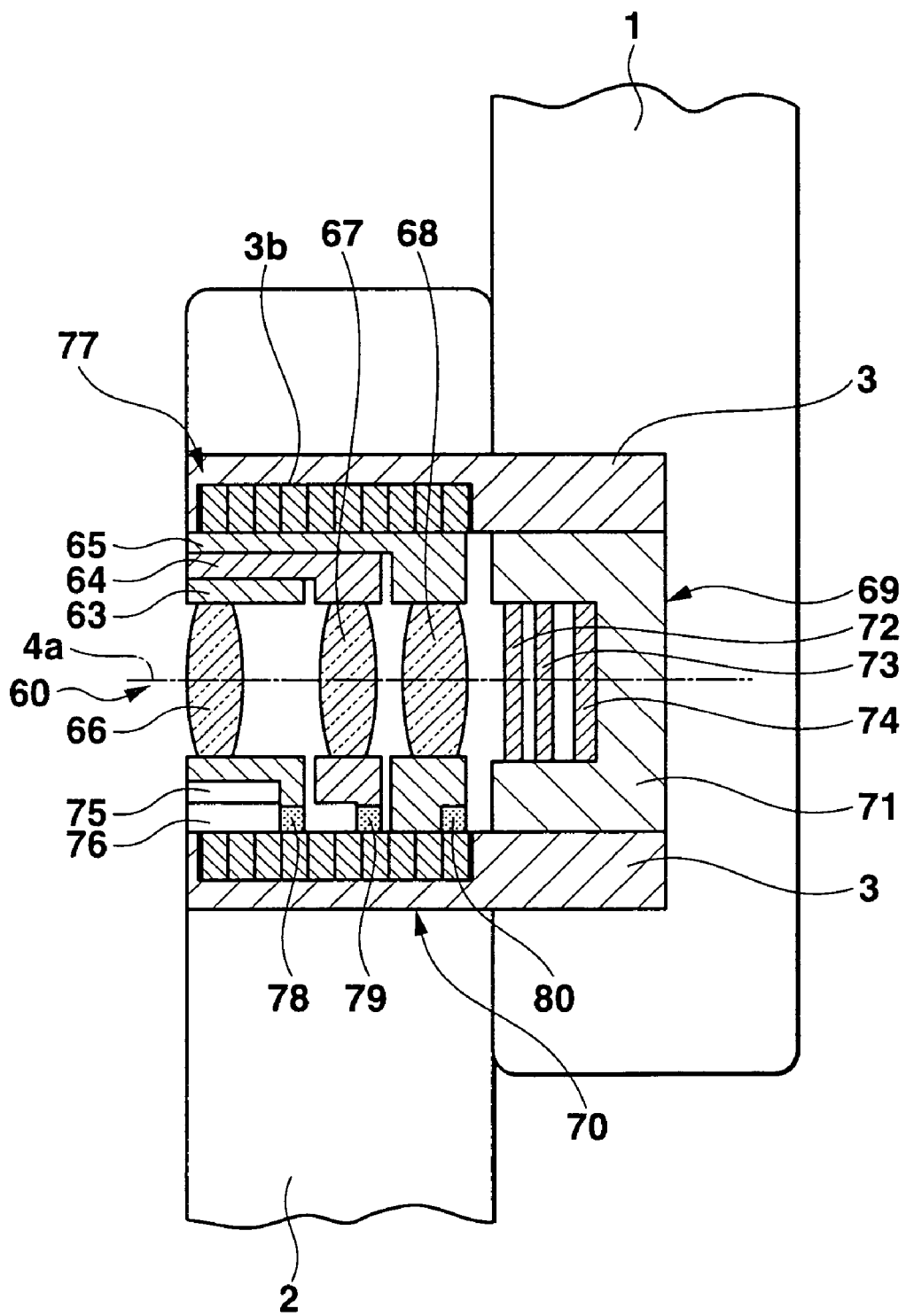
FIG. 17 is an enlarged cross-sectional view illustrating an image pick-up unit in the third embodiment.

The rotation shaft 3 is formed in a generally cylindrical shape, and is provided in the first case 1 and the second case 2 at their one end portion so as to penetrate through the both cases 1 and 2 with the second case 2 piled on top of the first case 1 and with one end of the rotation shaft 3 exposed at a rear surface of the second case 2, as shown in FIG. 16 and FIG. 17. In other words, the rotation shaft 3 is firmly fixed to the first case 1 at its right end portion and is rotatably fixed to the second case 2 at its left end portion, and thereby the second case 2 is rotatably attached to the first case 1 and vice versa, and the both cases are allowed to turn or rotate in one plane about the rotation shaft 3.

As described above, the first case 1 and the second case 2 are allowed to rotate or turn about the rotation shaft 3, as shown in FIG. 1 through FIG. 5, and therefore the both cases 1 and 2 are kept to precisely face each other, as shown in FIG. 2A, and also the first case 1 may be turned about the rotation shaft 3 at a predetermined angle, for example, 90 or 180 degrees relative to the second case 2, as shown in FIG. 4 in full line or in broken line. It should be noted that the both cases 1 and 2 are electrically connected to each other through a connecting member (not shown) running through the rotation shaft 3.

The image pick-up unit 60 is provided within the rotation shaft 3 and has an auto-focusing mechanism and a zoom function mechanism. The image pick-up unit 60 has its photographing direction directing outwardly from inside of the second case 2 or directing the opposite direction from display screen of the display unit 5 on the first case 1, and is allowed to move along the axis of the rotation shaft 3 within the rotation shaft 3. The image pick-up unit 60 comprises inside the rotation shaft 3 a first lens frame 63, a second lens frame 64 and a third lens frame 65, which move along the axis of the rotation shaft 3, and a first, a second and a third lens fixed respectively to the first lens frame 63, the second lens frame 64 and the third lens frame 65, an image pick-up block 69 fixed to the inside of the rotation shaft 3, and a zoom mechanism 70 which moves the first lens frame 63, the second lens frame 64 and the third lens frame 65 along their optical axis 4a, i.e., the axis of the rotation shaft, as shown in FIG. 7

In the image pick-up unit 60, the first lens frame 63, the second lens frame 64 and the third lens frame 65 move in side the rotation shaft 3 along the axis of the rotation shaft and the first lens frame 63 appears from the rear surface of the second case 2. As shown in FIG. 17, the image pick-up block 69 has a housing 71 fixed to the inside of the rotation shaft 3, and inside the housing 71 there are disposed crystal filter 72, a protection glass 73 and an image pick-up element 74 such as CCD. The image pick-up element 74 is disposed on the axis of the rotation shaft 3, i.e., on the optical axis 4a, and converts an image of an object H H projected thereon through the first lens 66, the second lens 67, and the third lens 68 into an electric signal. The first lens 66 and the second lens 67 are prepared for a zooming operation and the third lens 68 is prepared for focusing operation.

Figure 18:
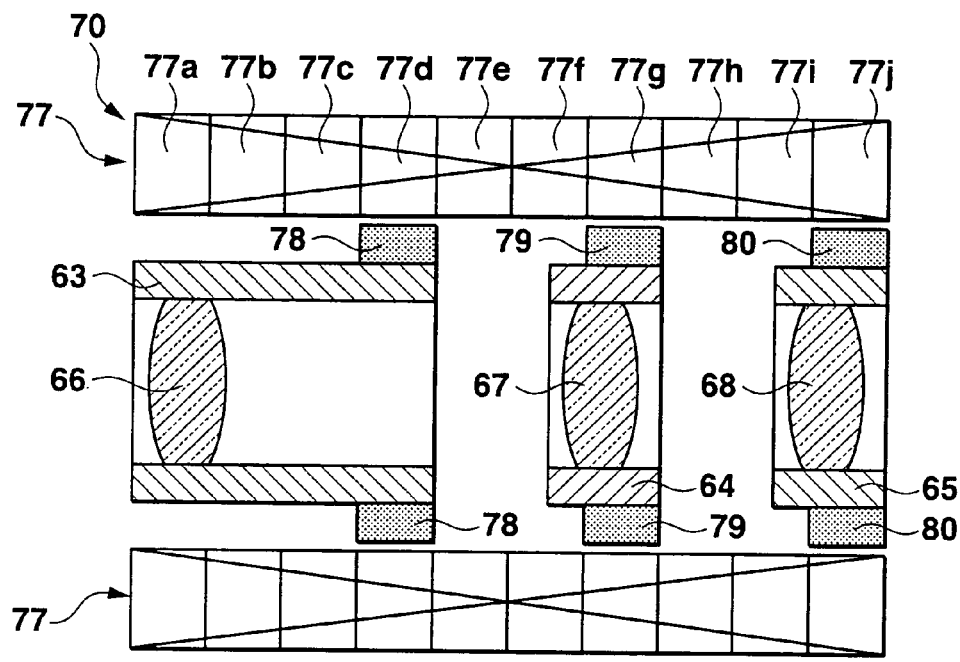
FIG. 18 is an enlarged cross-sectional view illustrating in principle an image pick-up unit of FIG. 17 in a normal state.
Figure 19:
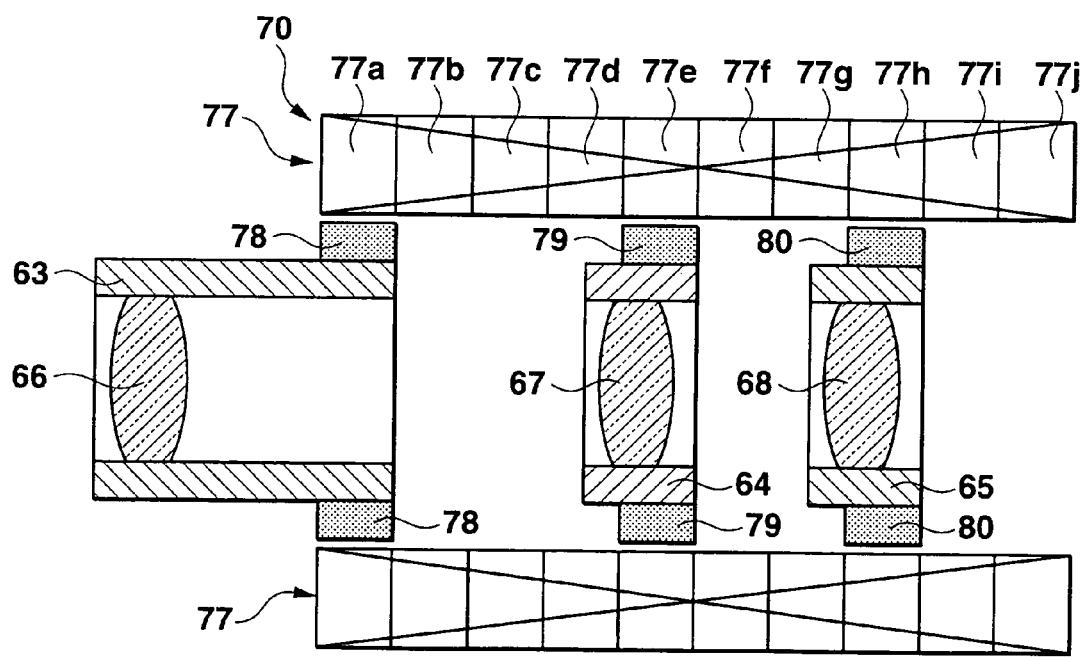
FIG. 19 is an enlarged cross-sectional view illustrating in principle an image pick-up unit of FIG. 17 set in a telephotographing state.

The first lens frame 63, the second lens frame 64, and the third lens frame 65 are made in a generally cylindrical shape, and are mounted within and coaxially with the rotation shaft 3, as shown in FIG. 17 through FIG. 19. More specifically, the first lens frame 63 is movably received in the second lens frame 64, and the second lens frame 64 is movably received in the third lens frame 65, and the third lens frame 65 is also movably received in the rotation shaft 3. The second lens frame 64 and the third lens frame 65 are formed with guide slits 75, 76 respectively in their peripheral surfaces, which slits run along their axes for guiding the first lend frame 63 and the second lens frame 64 respectively. The first lens frame 63 has a guide projection on its peripheral surface, which projection is inserted into the guide slot 75 of the second lens frame 64 and the guide slot 76 of the third lens frame 65, and the second lens frame 64 has a guide projection on its peripheral surface, which projection is inserted into the guide slot 76 of the third lens frame 65.

Figure 22:
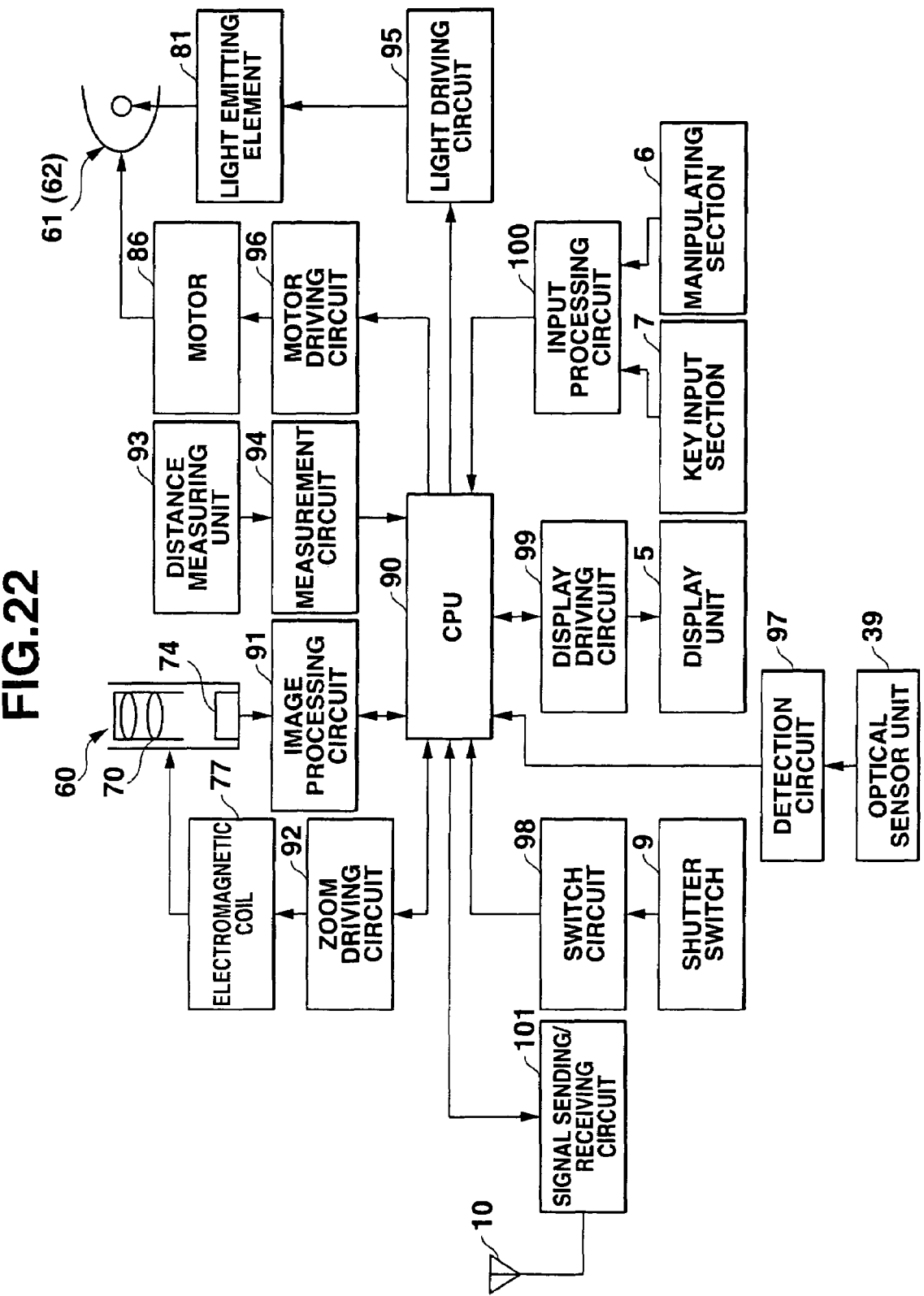
FIG. 22 is a block diagram illustrating a circuit configuration of the handheld electronic apparatus according to the third embodiment.
Figure 23:
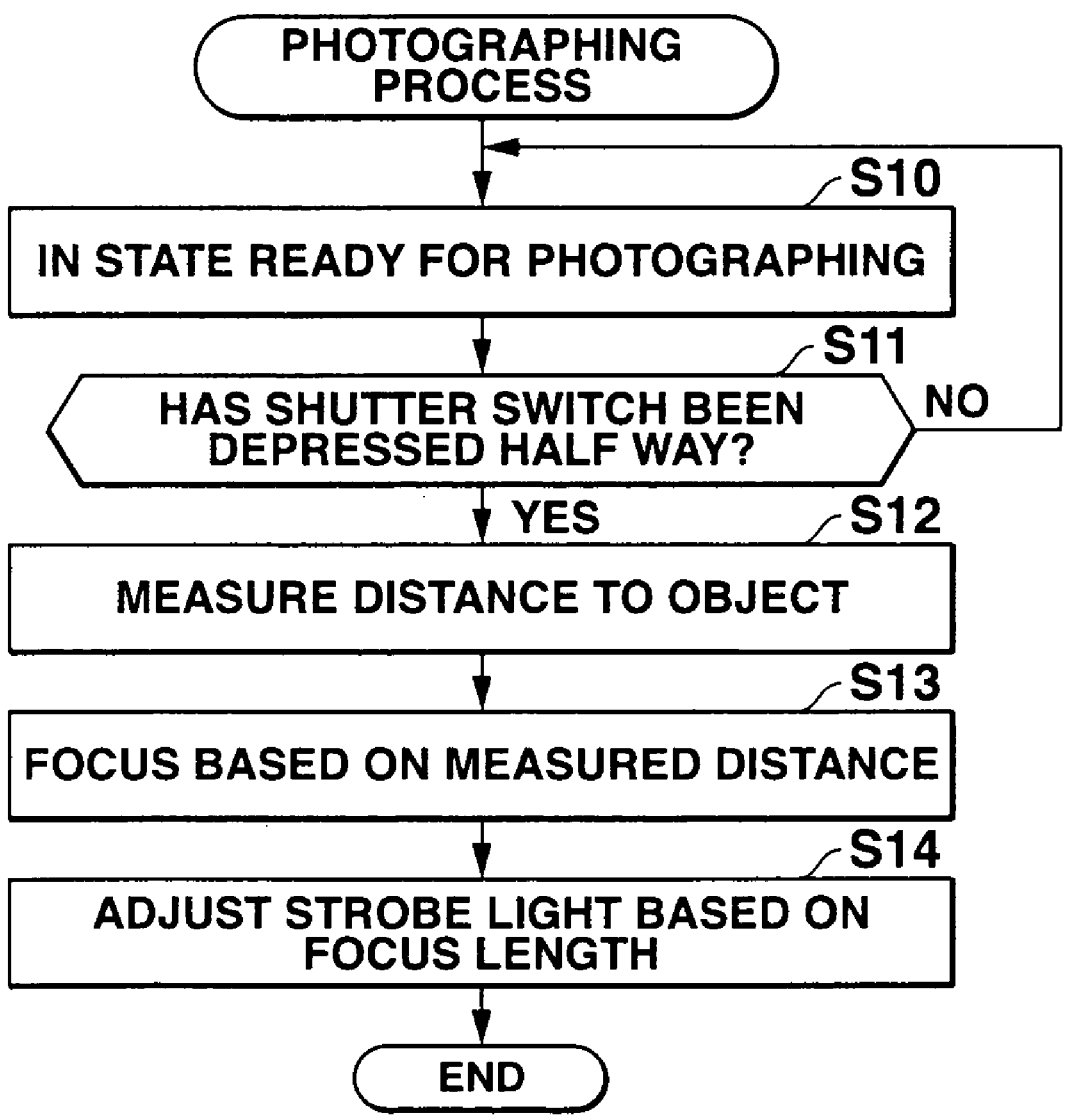
FIG. 23 is a flow chart of a photographing process in the third embodiment.

The zoom mechanism 70 is equipped with an electromagnetic coil 77 arranged in a generally cylindrical shape for electromagnetically move the first lens frame 63, the second lens frame 64 and the third lens frame 65 based on a distance measured by a distance measuring unit 93 (FIG. 22). The distance measuring unit 93 is provided in the image pick-up unit 60 for measuring a distance between the image pick-up unit 60 and an object H H to be photographed. The electromagnetic coil 77 includes plural coils 77a through 77j, which are coaxially disposed in a recess 3b formed in an internal peripheral surface of the rotation shaft 3. When an electric current is applied to any of these plural coils 77a through 77j, the coil to which an electric current is applied independently generates an electric magnetic field. The first lens frame 63 and the second lens frame 64 have a first permanent magnet 78 and a second permanent magnet 79 on the tops of the guide projections, respectively, which magnets are held in the vicinity of the electromagnetic coil 77. The third lens frame 65 has a permanent magnet 80 on its external peripheral surface, which is also held in the vicinity of the electromagnetic coil 77. The permanent magnets 78 through 80 each are arranged to face any of the coils 77a through 77j of the electromagnetic coil 77.

The zoom mechanism 70 drives the electromagnetic coil 77 based on the distance between the image pick-up unit 60 and the object H H measured by the distance measuring unit 93 to move the first lens 66 held by the first lens frame 63, the second lens 67 held by the second lens frame 64 and the third lens 68 held by the third lens frame 65 along the optical axis 4a. More specifically, the zoom mechanism 70 drives the electromagnetic coil 77 based on the distance measured by the distance measuring unit 93 to selectively apply electric current to the coils 77a through 77j for generating a magnetic field. In the magnetic field, the first, second and third permanent magnets 78 through 80 are pulled and move along the axis of the rotation shaft 3 depending on changes in the magnetic field.

For example, in case that the first lens 66 is moved from its initial position (within the electromagnetic coil 77 shown in FIG. 18) to a position outside the electromagnetic coil 77 (or in a leftward direction as seen in FIG. 8), an electric current is applied to the coil 77d of the electric magnetic coil 77, which corresponds to the first permanent magnet 78 of the first lens frame 63 staying at the initial position to generate a magnetic field, and then an electric current is applied to the coil 77c disposed on the external or left side of the coil 77d to generate a magnetic field for pulling the first permanent magnet 78 to the coil 77c. Thereafter, an electric current is applied to the coil 77b on the left side of the coil 77c to generate a magnetic field for pulling the first permanent magnet 78 to the coil 77b. In this way, the first lens moves from the position corresponding to the initial position of the first permanent magnet of the first lens frame 63 to the position corresponding to the coil 77a arranged at the end position of the electromagnetic coil 77, as seen in FIG. 18 and FIG. 19.

In case that the second lens 67 is moved from its initial position (within the electromagnetic coil 77 shown in FIG. 18) outwards from the inside of the electromagnetic coil 77 (or in a leftward direction as seen in FIG. 8), an electric current is applied to the coil 77g of the electric magnetic coil 77, which corresponds to the second permanent magnet 79 of the second lens frame 64 staying at the initial position to generate a magnetic field, and then an electric current is applied to the coil 77f disposed on the external or left side of the coil 77g to generate a magnetic field for pulling the second permanent magnet 78 to the coil 77f. Thereafter, an electric current is applied to the coil 77e on the left side of the coil 77f to generate a magnetic field for pulling the second permanent magnet 78 to the coil 77e. In this way, the second lens 67 moves from the position corresponding to the initial position of the second permanent magnet of the second lens frame 64 to the position corresponding to the coil 77d arranged at the end position of the electromagnetic coil 77.

Further, in case that the third lens 68 is moved for adjusting a focus, an electric current is applied to the coil 77j of the electric magnetic coil 77, which corresponds to the third permanent magnet 80 of the third lens frame 65 staying at the initial position to generate a magnetic field, and then an electric current is applied to the coil 77i disposed on the external or left side of the coil 77j to generate a magnetic field for pulling the third permanent magnet 80 to the coil 77i. Thereafter, an electric current is applied to the coil 77h on the left side of the coil 77i to generate a magnetic field for pulling the third permanent magnet 80 to the coil 77h. In this way, the third lens 68 moves from the position corresponding to the initial position of the third permanent magnet of the third lens frame 64 to the position corresponding to the coil 77h arranged at the end position of the electromagnetic coil 77, as shown in FIG. 18 and FIG. 19.

The first strobe light unit 61 and the second strobe light unit 62 are mounted on the rear surface of the second case 2 in the vicinity of the rotation shaft 3, as shown in FIG. 16. The first strobe light unit 61 and the second strobe light unit 62 each have a light emitting element 81 such as a LED and a reflector 82 for reflecting the light emitted by the light emitting element 81, as shown in FIG. 20 and FIGS. 21A and 21B. The reflector 82 is made in a generally parabola or elliptical shape, and the light emitting element 81 is disposed at its focal point. Therefore, light from the light emitting element 81 is reflected on the reflector 82 and travel in substantially parallel. Each reflector 82 is equipped with a supporting shaft 83 provided at a position symmetrical to its focal point on the optical axis 82a, which supporting shaft 83 is rotatably supported by supporting members 84, and is allowed to turn about the supporting shaft 83 to reflect the light from the light emitting element 81 in either direction of the second case 2.

As shown in FIG. 20 and FIG. 21, the first strobe light unit 61 and the second strobe light unit 62 each have a light radiation control mechanism 85, which controls the light emitting direction of the light emitting element 81 depending on a focal length of the image pick-up unit 60 for taking a picture of an object H H. The light radiation control mechanism 85 drives a strobe motor 86 based on the distance between the object H H and the image pick-up unit 60 measured by the distance measuring unit 93 to rotate a driving gear 87. Further, the driving gear 87 drives a driven gear 88 fixed onto the supporting shaft 83 of the reflector 82 depending on the focal length of the image pick-up unit 60 to control the reflector 82 for adjusting the light emitting direction of the strobe light unit 61 and 62.

There is provided the optical sensor unit 39 on the surfaces of the first case 1 and the second case 2 in the vicinity of the rotation shaft, which surfaces face each other, for detecting an rotation angle of the first case 1 relative to the second case 2, as shown in FIG. 3. The optical sensor unit 39 includes a light emitting element 40 mounted on the first case 1, and plural light receiving elements 41a through 41c mounted on the second case 2. The light receiving elements 41a through 41c are disposed respectively at the positions on the second case 2, which positions locate along an imaginary locus that is drawn on the second case 2 by the light emitting element 40 when the first case 1 is turned relatively to the second case 2. More specifically, the first light receiving element 41a is disposed at a position on the second case 2, at which position the first light receiving element 41a receives the light from the light emitting element 40 on the first case 1, when the first case 1 and the second case 2 are kept to precisely face each other, or when one case is piled on top of other case. The second light receiving element 41b is disposed at a position on the second case 2, at which position the second light receiving element 41b receives the light from the light emitting element 40, when the first case 1 is turned at an angle of 90 degrees relatively to the second case 2. The second light receiving element 41c is disposed at a position on the second case 2, at which position the third light receiving element 41c receives the light from the light emitting element 40 on the first case 1, when the first case 1 is turned at an angle of 180 degrees relatively to the second case 2.

Now, a circuit configuration of the present cellular phone will be described with reference to FIG. 22. The present cellular phone has CUP 90, which controls the whole circuit in accordance with a previously stored program. The cellular phone comprises various circuits such as an image processing circuit 91 for processing an image signal from the image pick-up element 74 such as CCD, a zoom driving circuit 92 for driving the zoom mechanism 70 of the image pick-up unit 60, a measurement circuit 94 for driving the distance measuring unit 93 for measuring a distance between the image pick-up unit 60 and an object H H to be photographed, a light driving circuit 95 for driving light emitting elements 81 respectively for the first strobe light unit 61 and the second strobe light unit 62, a motor driving circuit 96 for driving the strobe motor 86 of the light radiation control mechanism 85, a detection circuit 97 for processing a detection signal obtained by the light sensor 39, a switch circuit 98 for processing an electric signal generated in response to operation of the shutter switch 9, a display driving circuit 99 for controlling the display unit 5 for displaying telephone data and image data, an input processing circuit 100 for processing an input signal from the manipulating section 6 and the key input section 7, and a signal sending/receiving circuit 101 for processing data such as communication data and image data to send the same via the antenna 10 and for processing a signal received via the antenna 10.

A photographing process operation to be performed in the present cellular phone will be described with reference to a flow chart of FIG., 23. When the power switch is turned on and a photographing mode is selected by operation of the manipulating section 6, a photographing operation starts. A state ready for photographing is set at step S10. It is judged at step S11 whether or not the shutter switch 9 has been depressed half way. When the shutter switch 9 has not been depressed half way, then the process returns to a process at step S10, bringing the cellular phone to the state ready for photographing. When the shutter switch 9 has been depressed half way, the distance measuring unit 93 of the image pick-up unit 60 measures a distance between the image pick-up unit 60 and an object H H to be photographed at step S12, and a focus is adjusted based on the measured distance at step S13. In other words, when the distance between the image pick-up unit 60 and the object H H is measured by the distance measuring unit 93, the zoom driving circuit 92 drives the electromagnetic coil 77 of the zoom mechanism 70 in the image pick-up unit 60 to move the first lens frame 63, the second lens frame 64 and the third lens frame 65 based on the distance measure by the distance measuring unit 93, adjusting the focus of the image pick-up unit 60.

More specifically, when the first, second, and third lens 66, 67, and 68 stay at their initial positions, the coils 77d, 77g, and 77j of the electromagnetic coil 77 corresponding respectively to the first, second and third permanent magnet 78, 79, and 80 of the first, second, and third lens frame 63, 64 and 65 are driven first to generate magnetic fields. Then, the coils 77c, 77f, and 77i next to the above coils 77d, 77g, and 77j are driven to generate magnetic fields, attracting the first, second and third permanent magnet 78, 79, and 80 thereto. Further, the coils 77b, 77e, and 77h next to them are driven to generate magnetic fields, attracting the first, second and third permanent magnet 78, 79, and 80 thereto. In this way, the first, second, and third lens frame 63, 64 and 65 move to adjust the focus of the first, second, and third lens 66, 67, and 68.

When the focus of the first, second, and third lens 66, 67, and 68 has been adjusted, the light radiation control mechanism 85 controls the reflectors 82 to adjust the light emitting direction of the first and second strobe light unit 61 and 62 at step S14. When the focus is adjusted, the motor driving circuit 96 drives the strobe motor 86 of the light radiation control mechanism 85 based on the distance to the object H H measured by the distance measuring unit 93 to rotate the driving gear 87, rotating the driven gear 88 of the supporting shaft 83 of the reflector 82. In this way, the angle at which the optical axis 82a of each reflector 82 intersects with the optical axis 4a of the image pick-up unit 60 is adjusted.

Figure 24A:
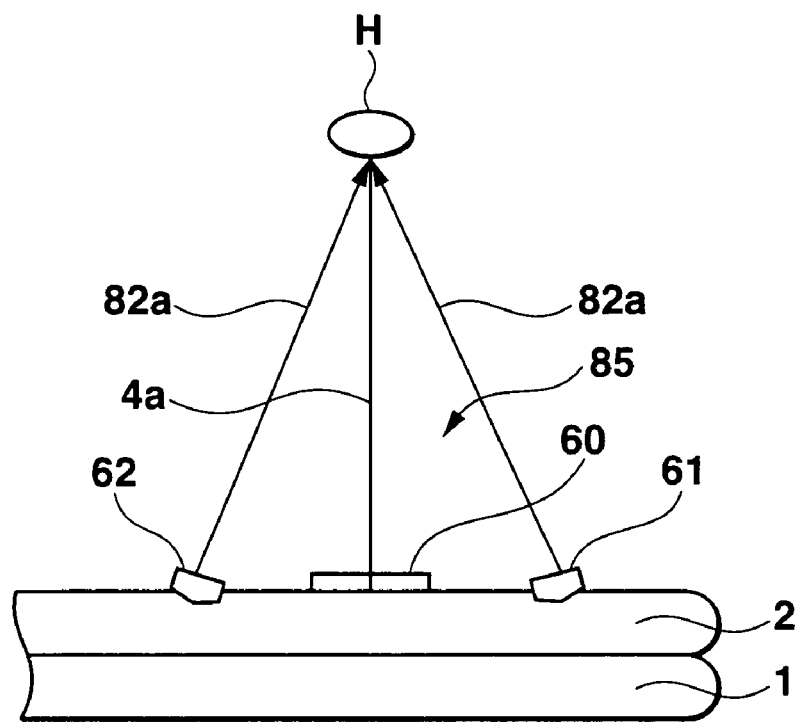
FIG. 24A is a view illustrating the first and second strobe light unit illuminating an object in a distant place.
Figure 24B:
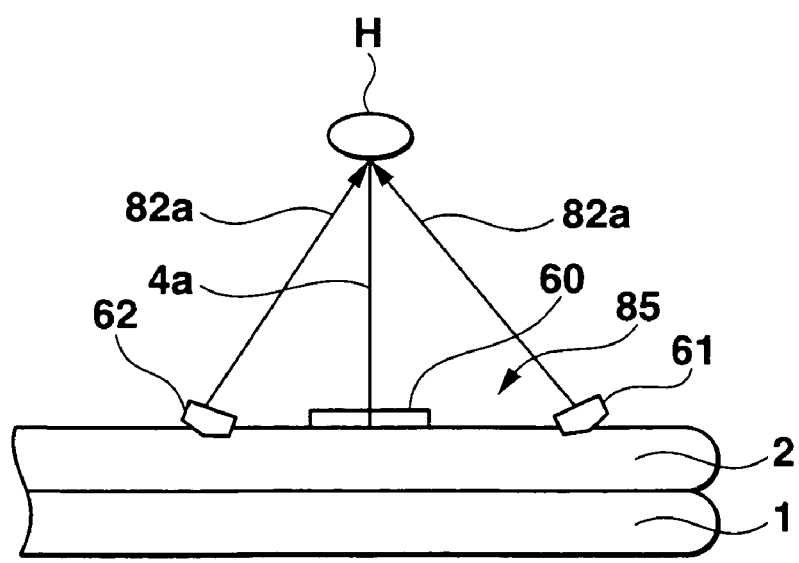
FIG. 24B is a view illustrating the first and second strobe light unit illuminating an object in a near place.

When an object H H in a distant place is photographed, a rotation angle of the reflector 82 is reduced to reduce the intersecting angle of the optical axis 82a of the reflector 82 with the optical axis 4a of the image pick-up unit 60, concentrating the light of the first and second strobe light unit 61 and 62 on the object H H, as shown in FIG. 24A. When an object H H in a near place is photographed, the rotation angle of the reflector 82 is increased to increase the intersecting angle of the optical axis 82a of the reflector 82 with the optical axis 4a of the image pick-up unit 60, concentrating the light of the first and second strobe light unit 61 and 62 on the object H H. When the shutter switch 9 is depressed full way with the cellular phone set in the above state, each strobe light unit 82 emits the light and each reflector 82 concentrates the light from the strobe light 82 on the object H H. The image pick-up element 74 obtains image data of the object H H illuminated as described above, and then the photographing process is finished.

As described above, the cellular phone has the first case 1 with the display unit 5 and the second case with the key input section 7, both cases being rotatably connected with each other by means of the rotation shaft 3 of a generally cylindrical shape. The rotation shaft 3 is mounted in the first case 1 and the second case 2 perpendicularly to their surfaces. Therefore, the first case 1 (or the second case 2) is rotatable in a common imaginary plane about the rotation shaft 3 relatively to the second case 2 (or the first case 2). The image pick-up unit 60 having the zoom mechanism 70 is mounted in the rotation shaft 3, and therefore the present embodiment has the similar features to those of the first embodiment. Further in the present embodiment, since the zoom mechanism 70 of the image pick-up unit 60 uses the electromagnetic coil 77 including a plurality of the coils 77a through 77j and the permanent magnets 78, 79, and 80 of the first, second and third lens frames 63, 64 and 65, the image pick-up unit 60 may be made more compact than an average zoom mechanism which mechanically moves lenses. Since the zoom mechanism 70 is moved by a magnetic force yielded by the electromagnetic coil 77 and the permanent magnets 78, 79, and 80, the image pick-up unit 60 may be made with less number of components than the average mechanism and made simple in structure. Therefore, the image pick-up unit 60 withstands the external shock has less trouble.

In the present embodiment, the first case 1 and the second case are rotatably connected with each other by means of the rotation shaft 3 perpendicular to the surfaces of the both cases, and the first case 1 (or the second case 2) is rotatable in a common imaginary plane about the rotation shaft 3 relatively to the second case 2 (or the first case 2). The image pick-up unit 60 may be mounted in the rotation shaft 3 with its photographing direction opposite to the display screen of the display unit 5. Therefore, the user can photograph with the image pick-up unit 60 while watching an image of an object H H on the display screen of the display unit 5. Since the display unit 5 and the key input section 7 are mounted respectively on the first case 1 and the second case 2 such that both face the same direction, the display unit 5 is exposed at all times whether the both cases 1 and 2 are kept closed or open. Therefore, the user can photograph while watching the object H H on the display unit 5 whether the both cases 1 and 2 are kept closed or open, and can enjoy user-friendly feature.

In the present embodiment of the cellular phone, when the user taking a picture with the image pick-up unit 60, the light radiation control mechanism 85 adjusts the light emitting direction of the first and second strobe light unit 61 and 62 depending on the focus length of the image pick-up unit 60. The light radiation control mechanism 85 adjusts the light emitting direction of the first strobe light unit 61 and the second strobe light unit 62 to illuminate the object H H whether the object H H is in a distant place or in a near place. The light from the first and second strobe light unit 61 and 62 are emitted towards the object H H to efficiently illuminate the same whether the object H H is in a dark place or in a light place, and thereby a clear picture of the object H H may be obtained even though the object H H is in a dark place.

The firs strobe light unit 61 and the second strobe light unit 62 each are equipped with the light emitting element 81 and the reflector 82, and the light radiation control mechanism 85 controls an illumination angle of each of the reflectors 82 depending on the focus length of the image pick-up unit 60. In case that an object H H in a distant place is photographed, the rotation angle of the reflector 82 is reduced so that an intersecting angle at which the optical axis 82a of the reflector 82 intersects with the optical axis 4a of the image pick-up unit 60 decreases. In case that an object H H in a near place is photographed, the rotation angle of the reflector 82 is increased so that the intersecting angle at which the optical axis 82a of the reflector 82 intersects with the optical axis 4a of the image pick-up unit 60 increases. In this way, the light from the strobe light unit 61 and 62 may be concentrated on the object H H to illuminate the same clearly and evenly whether the object H H is in a distant place or in a near place.

In the third embodiment describe above, the light radiation control mechanism 85 drives the strobe motor 86 depending on the distance to an object H H measured by the distance measuring unit 93 to rotate the driving gear 87. The driving gear 87 rotates the driven gear 88 to rotate the reflector 82 about the supporting shaft 83, adjusting the illumination angle of the reflector 82 depending on the focus length of the image pick-up unit 60 in a photographing operation. The reflector 82 may be modified as follows: the reflector 82 is mechanically connected to the third lens frame 65 which moves depending on the focus length of the image pick-up unit 60 in the photographing operation so as to move together with the lens frame 65 for adjusting the illumination angle depending on the focus length of the image pick-up unit 60 in the photographing operation. In the above modification, in which the reflector 82 is mechanically connected with the third lens frame, the power source for the strobe motor will be omitted, and the cellular phone may be made more compact and simple in structure and manufactured at a low price.

Fourth Embodiment

Figure 25:
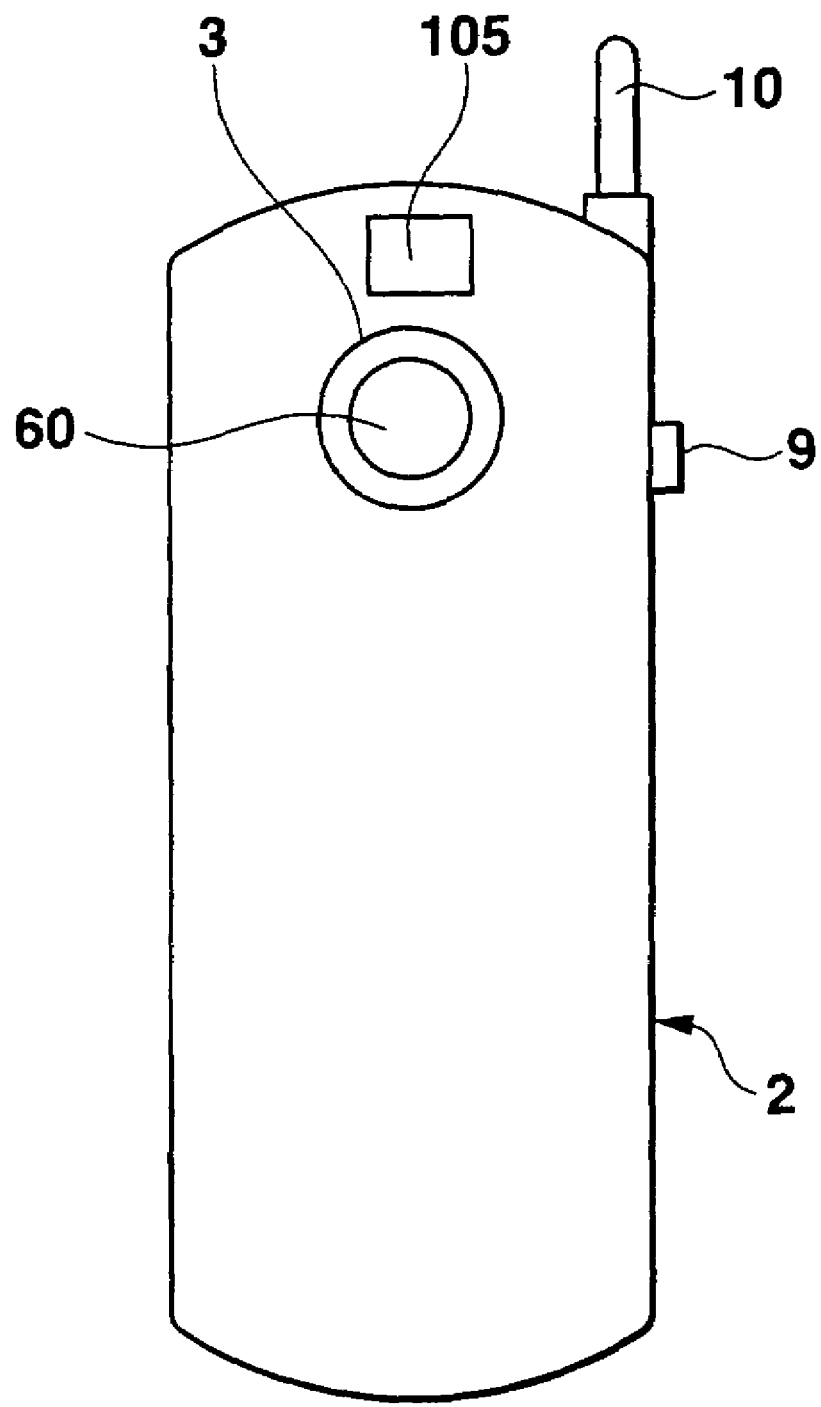
FIG. 25 is a rear view illustrating a handheld electronic apparatus (in a closed state) according to a forth embodiment of the invention.

A fourth embodiment of the present invention, in which the present invention is used in a cellular phone will be described with reference to FIG. 25 through FIG. 27. In the drawings, like elements as those in the third embodiment shown in FIG. 16 through FIG. 24 are designated by like reference numerals. The cellular phone according to the fourth embodiment has the substantially same structure as the third embodiment except that a strobe light unit 105 and a light radiation control mechanism 106 are provided in the second case 2, as shown in FIG. 25 and FIG. 26. The light radiation control mechanism 106 adjusts an illuminating range of the strobe light unit 105 depending on a focus length of the image pick-up unit 60 in a photographing state.

The strobe light unit 105 consists of a light emitting element 81 and a reflector 82 having a paraboloidal or ellipsoidal surface. The light emitting element 81 is moved along an optical axis 82a of the reflector 82. The light radiation control mechanism 106 drives a strobe motor 107 based on a distance to an object H H measured by the distance measuring unit 93 to rotate a driving gear 108. The driving gear 108 moves a rack 109 carrying the light emitting element 81. Then the light emitting element 81 moves along the optical axis 82a of the reflector 82 so as to adjust the illumination range depending on a focus length of the image pick-up unit 60 in a photographing operation.

The cellular phone according to the fourth embodiment has the substantially same features as the third embodiment. The strobe light unit 105 has the light emitting element 81 and the reflector 82. The light radiation control mechanism 106 shifts the light emitting element 81 from the focal point of the reflector 82 along the optical axis 82a of the reflector 82 depending on the focus length of the image pick-up unit 60 in a photographing state so as to efficiently illuminate an object H H whether the same is in a distant place or in a near place. Therefore, the user can take a clear picture of the object H H even though the object H H is in a dark place.

For example, in case that an object H H in a distant place is photographed with the image pick-up unit of a long focus length, the light radiation control mechanism 106 brings the light emitting element 81 closer to the focal point of the reflector 82 along the optical axis 82a of the reflector 82 so as to reflect the light of the light emitting element 81 in parallel with the optical axis 82a of the reflector 82, concentrating the light onto the object H H, as shown in FIG. 27A. In case that an object H H in a near place is photographed with the image pick-up unit of a short focus length, the light radiation control mechanism 106 brings the light emitting element 81 away from the focal point of the reflector 82 along the optical axis 82a of the reflector 82 so as to shed the light of the light emitting element 81 towards the object H H, as shown in FIG. 27B. As described above, the strobe light unit in the forth embodiment illuminates the object H H clearly in substantially the same manner as the third embodiment.

In the forth embodiment described above, the light radiation control mechanism 106 drives the strobe motor 107 based on a distance to an object H H measured by the distance measuring unit 93 to rotate the driving gear 108. The driving gear 108 moves the rack 109 carrying the light emitting element 81, and then the light emitting element 81 moves along the optical axis 82a of the reflector 82 so as to adjust the illumination range depending on the focus length of the image pick-up unit 60 in a photographing state. But the light emitting element 81 may be mechanically connected to the third lens frame so as to move together with the lens frame depending on the focal length of the image pick-up unit 60 in a photographing state, for adjusting the illuminating range of the reflector 82 depending on the focal length of the image pick-up unit 60 in a photographing state. In the above modification, in which the light emitting element 81 is mechanically connected to the third lens frame, the power source for the strobe motor 107 may be omitted, and therefore the cellular phone may be made compact and simple in structure and may be assembled at a low price.

Fifth Embodiment

A fifth embodiment of the present invention, in which the present invention is used in a cellular phone will be described with reference to FIG. 28 through FIG. 29. In the drawings, like elements as those in the third embodiment shown in FIG. 16 through FIG. 24 are designated by like reference numerals. The cellular phone according to the fourth embodiment comprises the first case 1, the second case 2, the image pick-up unit 60 mounted in the second case 2, the first strobe light unit 61 and the second strobe light unit 62 provided on the second case 2 at the both sides of the image pick-up unit 60, and a light radiation control mechanism 110, which adjusts light emitting directions of the first strobe light unit 61 and the second strobe light unit 62 depending on whether the image pick-up unit 60 has been set to a telephotographing state or a wide-angle photographing state. The cellular phone of the fourth embodiment has substantially the same structure as the third embodiment except the structure described above. The first and second strobe light unit 61 and 62 each has the light emitting element 81 and the reflector 82 in the same manner as in the third embodiment.

As shown in FIG. 20 and FIG. 21, the reflectors 82 of the first and second strobe light unit 61 and 62 each have the supporting shaft 83 provided at a position symmetrical to its focal point on its optical axis 82a. The supporting shaft 83 is rotatably supported by the supporting member 84. The reflector 82 is allowed to turn about the supporting shaft 83 to reflect the light from the light emitting element 81 in either direction of the second case 2. The light radiation control mechanism 110 drives the strobe motor 86 depending on whether the image pick-up unit 60 is set to a telephotographing state or a wide-angle photographing state. The strobe motor 86 rotates the driving gear 87 to rotate the driven gear 88 for turning the reflector 82 about the supporting shaft 83 to adjust the illuminating angle.

A photographing process in the cellular phone according to the fifth embodiment will be described with reference to a flow chart shown in FIG. 28. When the power switch is turned on and a photographing mode is selected by operation of the manipulating section 6 (FIG. 4), the cellular phone is set to a state ready for a photographing operation. Either of the telephotographing state or the wide-angle photographing state is selected by operation of the manipulating section 6 at step S20. It is judged at step S21 whether the shutter switch has been depressed half way or not. When the shutter switch has not been depressed half way, the process returns to step S20, where the cellular phone is kept in the state ready for a photographing operation. When the shutter switch has been depressed half way, the distance measuring unit 93 of the image pick-up unit 60 measures a distance to the object H H at step S22. The zoom driving circuit 92 drives the electromagnetic coil 77 in the zoom mechanism 70 of the image pick-up unit 60 to move the first lens 66 and the second lens 67 for the telephotographing operation or the wide-angle operation, and at the same time to move the third lens to adjust the focus on the object H H at step S23.

When the first lens 66 and the second lens 67 have been adjusted to the telephotographing operation or to the wide-angle photographing operation, and the third lens has been adjusted to focus on the object H H, the light radiation control mechanism 110 controls the reflectors 82 to adjust the light emitting directions of the first strobe light unit 61 and the second strobe light unit 62 at step S24. More specifically, when the first lens 66 and the second lens 67 have been adjusted to the telephotographing operation or to the wide-angle photographing operation, the light radiation control mechanism 110 turns the reflectors 82 of the first strobe light unit 61 and the second strobe light unit 62 around the supporting shaft 83 depending on the photographing operation of the image pick-up unit 60, that is, depending on the telephotographing operation or the wide-angle photographing operation to adjust an angle at which the optical axis 82a of each reflectors 82 intersects with the optical axis 4a of the image pick-up unit 60.

Figure 29A:
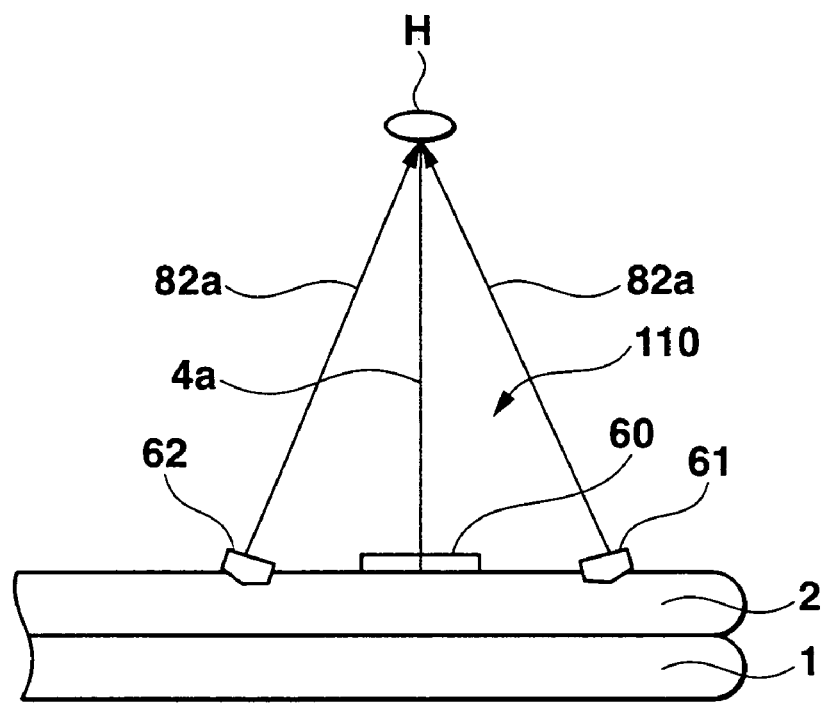
FIG. 29A is a view illustrating a first and second strobe light unit illuminating an object in a distant place.
Figure 29B:
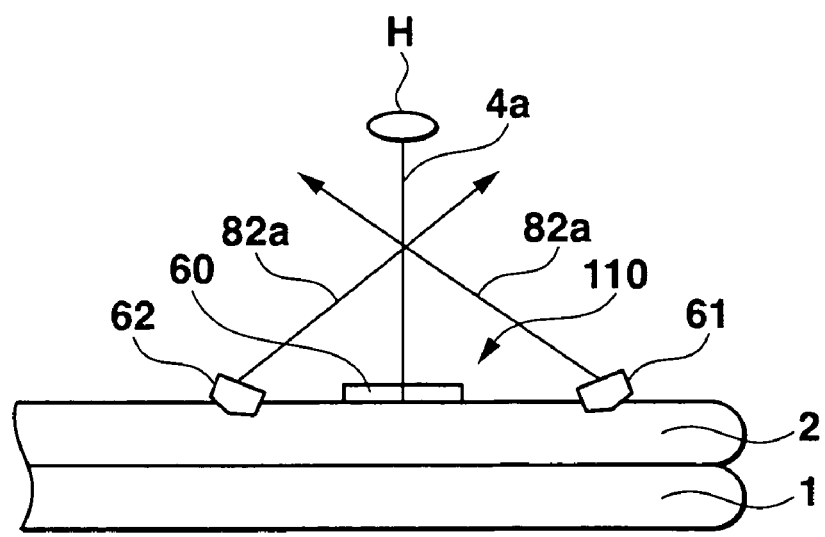
FIG. 29B is a view illustrating the first and second strobe light unit illuminating an object in a near place.

For example, when the user telephotographs an object H H in a distant place using the cellular phone, the light radiation control mechanism 110 turns the reflector 82 so as to reduce the angle at which the optical axis 82a of the reflector 82 intersects with the optical axis 4a of the image pick-up unit 60, and thereby the light emitted from the first strobe light unit 61 and the second strobe light unit 62 is concentrated on the object H H, as shown in FIG. 29A. When the user telephotographs an object H H in a near place using the cellular phone, the light radiation control mechanism 110 turns the reflector 82 so as to increase the angle at which the optical axis 82a of the reflector 82 intersects with the optical axis 4a of the image pick-up unit 60, and thereby the light emitted from the first strobe light unit 61 and the second strobe light unit 62 is concentrated on the object H H, as shown in FIG. 29B. When the shutter switch 9 is depressed full way at the time when the reflectors 82 has been set as described above, the light from the first strobe light unit 61 and the second strobe light unit 62 is concentrated on the object H H, and the image pick-up element 74 of the image pick-up unit 60 obtains clear image data of the object H H illuminated by the strobe light units 61 and 62. Then, the process is finished.

The cellular phone according to the fifth embodiment has substantially the same features as the third embodiment. In the present cellular phone, the light radiation control mechanism 110 adjusts the light emitting directions of the first strobe light unit 61 and the second strobe light unit 62 depending on the telephotographing operation or the wide-angle photographing operation of the image pick-up unit 60. The user can telephotograph or wide-angle photograph the object H H well illuminated by the strobe light units 61 and 62 and obtain a clear picture of the object H H even in a dark place.

The cellular phone of the fifth embodiment is equipped with two sets of the strobe light unit 61 or 62 and the reflector 82. The light radiation control mechanism 110 adjusts the light emitting direction of each reflector 82 depending on the telephotographing operation or the wide-angle photographing operation of the image pick-up unit 60. For example, when the user telephotographs an object H H in a distant place, the light radiation control mechanism 110 turns the reflector 82 so as to decrease the intersecting angle at which the optical axis 82a of the reflector 82 intersects with the optical axis 4a of the image pick-up unit 60. When the user wide-angle photographs an object H H in a near place, the light radiation control mechanism 110 turns the reflector 82 so as to increase the intersecting angle at which the optical axis 82a of the reflector 82 intersects with the optical axis 4a of the image pick-up unit 60. In this way, the first strobe light unit 61 and the second strobe light unit 62 illuminate the object H H clearly and evenly without failure.

In the fifth embodiment described above, the light radiation control mechanism 110 adjusts the light illuminating angle of each the two reflectors 82 depending on the telephotographing operation or the wide-angle photographing operation of the image pick-up unit 60. But one strobe light unit may be used in place of two strobe light units in the same manner as in the fourth embodiment, that is, the illuminating range of one strobe light unit 105 mounted on the second case may be adjusted by the light radiation control mechanism 110 depending on the telephotographing operation or the wide-angle photographing operation of the image pick-up unit 60.

In this case, the strobe light unit 105 is arranged such that the light emitting element 81 moves from the focal point of the reflector 82 along the optical axis 82a of the reflector 82. The light radiation control mechanism 110 drives the strobe motor 107 based on the telephotographing operation or the wide-angle photographing operation of the image pick-up unit 60 to rotate a driving gear 108. The driving gear 108 moves the rack 109 carrying the light emitting element 81. Then, the light emitting element 81 moves along the optical axis 82a of the reflector 82 depending on the telephotographing operation or the wide-angle photographing operation of the image pick-up unit 60 to adjust the illumination range of the reflector 82.

In the cellular phone according to the fifth embodiment, the strobe light unit 105 has the light emitting element 81 and the reflector 82. The light radiation control mechanism 110 shifts the light emitting element 81 from the focal point of the reflector 82 along the optical axis 82a of the reflector 82 depending on the telephotographing operation or the wide-angle photographing operation of the image pick-up unit 60. When an object H H in a distant place is photographed, the light radiation control mechanism 110 moves the light emitting element 81 along the optical axis 82a of the reflector 82 closer to the focal point of the reflector 82 to reflect the light from the light emitting element 81 substantially in parallel with the optical axis 82a closer to the focal point of the reflector 82, concentrating the light onto the object H H to illuminate the same.

When an object H H in a near place is photographed in the wide-angle photographing operation, the light radiation control mechanism 110 moves the light emitting element 81 away from the focal point of the reflector 82 along the optical axis 82a of the reflector 82 so as to shed the light of the light emitting element 81 towards the object H H. The light radiation control mechanism 110 makes the light emitting element 81 emit the light against the object H H without failure depending on the telephotographing operation or the wide-angle photographing operation of the image pick-up unit 60, whether the image pick-up unit 60 is set in the telephotographing operation or in the wide-angle photographing operation. As described above, the strobe light unit in the fifth embodiment illuminates the object H clearly in substantially the same manner as the third embodiment and the fourth embodiment.

In the first embodiment through the fifth embodiment, the optical sensor unit 39 including the light emitting element 40 and the light receiving elements 41a, 41b, and 41c is employed to detect the relative angle between the first case and the second case. But an encoder for detecting the relative angle between the first case and the second case may be used in place of the above mentioned optical sensor unit 39.

Sixth Embodiment

A sixth embodiment of the present invention, in which the present invention is used in a cellular phone will be described with reference to FIG. 30 through FIG. 38. In the drawings, like elements as those in the first embodiment shown in FIG. 1 through FIG. 13 and the third embodiment shown in FIG. 16 through FIG. 24 are designated by like reference numerals. The cellular phone according to the sixth embodiment has the telephone function and the photographing function similar to those of the first embodiment and the third embodiment. The present cellular phone comprises the first case 1 and the second case 2, which are turnably connected to each other by a connecting shaft 120 in an openable and closable manner, and the image pick-up unit 121 having a zoom function mounted in the connecting shaft 120.

Figure 31:
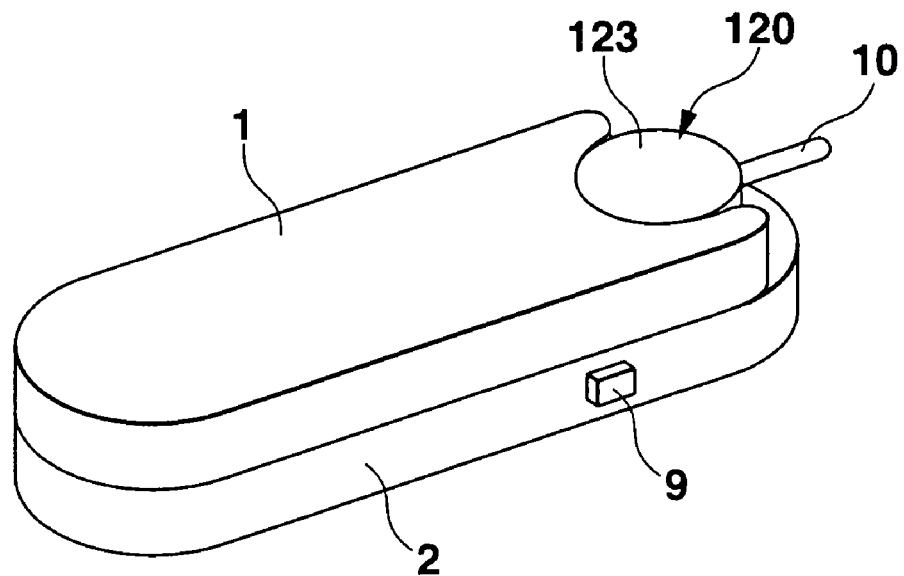
FIG. 31 is a perspective view illustrating the handheld electronic apparatus with a first case piled on top of a second case.
Figure 32:
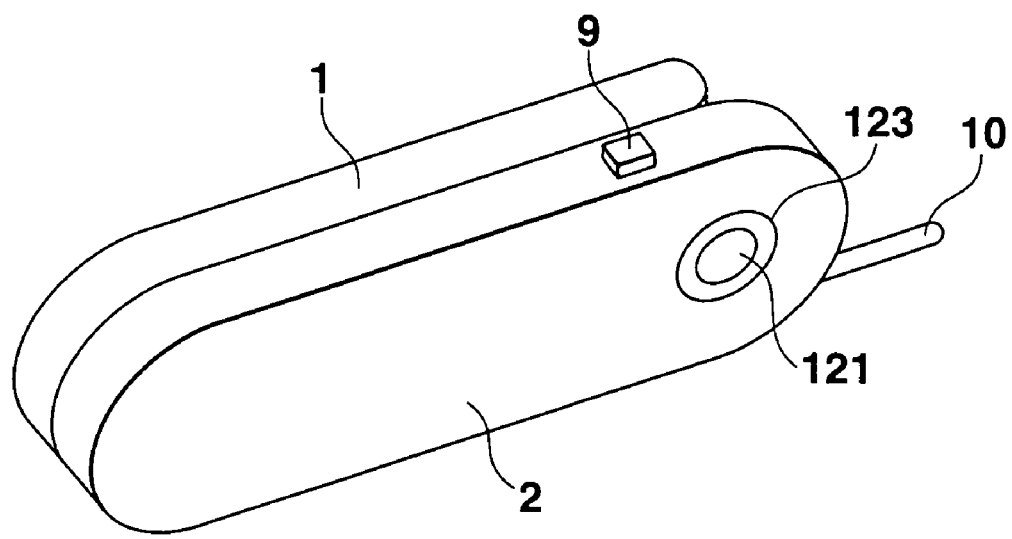
FIG. 32 is another perspective view illustrating the handheld electronic apparatus with a first case piled on top of a second case.
Figure 33:
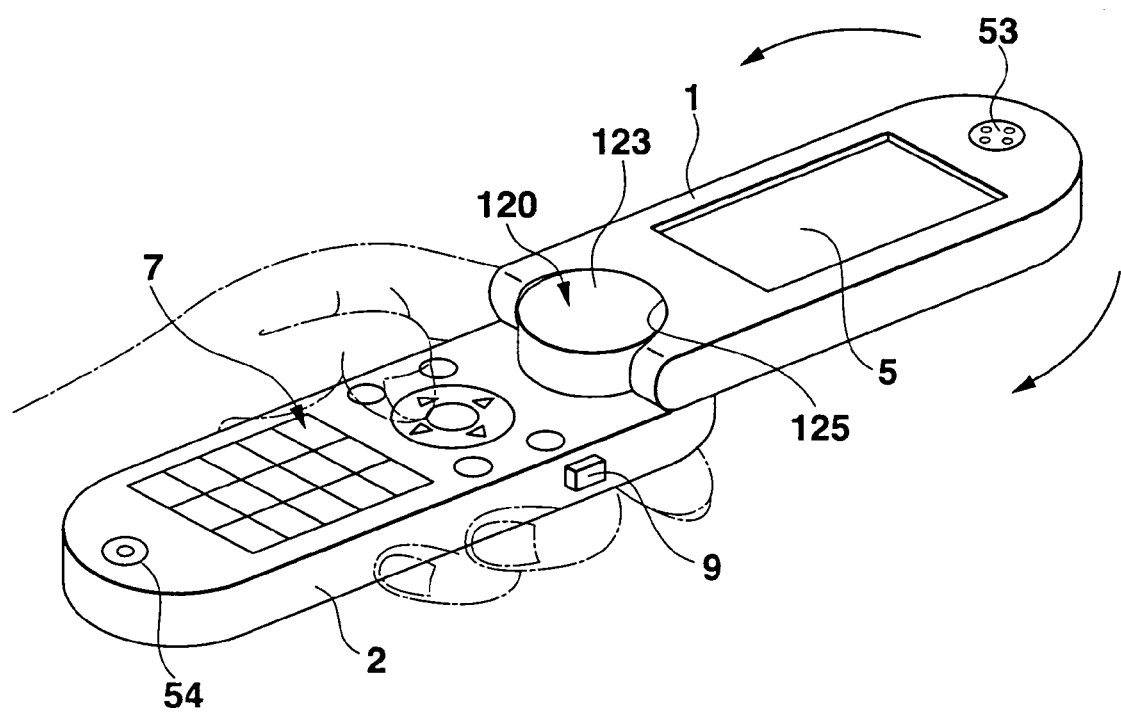
FIG. 33 is a perspective view illustrating the handheld electronic apparatus with the first and second cases kept in an open state.

The first case 1 is made in a general rectangular shape as shown in FIG. 31, FIG. 32 and FIG. 33, and is provided with the speaker unit 53 on one of its surfaces as shown in FIG. 33. The display unit 5 consists of a display element of a flat screen type, such as a liquid crystal display element and an electro-luminescence display element (EL display element), and electro-optically displays data such as phone data for the telephone function and image data photographed by the image pick-up unit 4. The speaker unit 53 is provided in the first case 1 at its end portion apart from the connecting shaft 120 as shown in FIG. 33, and serves to generate voice of a person at the other end of the line.

The case 2 is made generally in the same size as the first case 1. The second case 2 is equipped with the key input section and the microphone unit 54 on its surface, which face the surface of the first case 1 when both the cases are kept in a closed manner, in the same manner as the first embodiment and the third embodiment. The second case 2 is provided with the shutter switch 9 on its side wall as shown in FIG. 32. Further, the second case 2 is provided with the antenna in the vicinity of the connecting shaft 120, as shown in FIG. 31 and FIG. 32. The second case 2 is provided with the key input section 7 including various keys which are operated for telephone operation, such as ten keys, a memory key, a manner key, and a jog dial to be operated for switching various functions such as a telephone function and a photographing function, and further a power button and a communication button on the surface, which face the surface of the first case 1 when both the cases are kept in a closed manner.

The microphone unit 54 is mounted on an end portion of the second case 2 most apart from the connecting shaft 120, as shown in FIG. 33, and serves to convert conversation of the user on the phone into an electric signal. The shutter switch 9 is mounted on its right side wall of the second case 2 in the vicinity of the connecting shaft 120, as viewed in FIG. 33. When depressed half way (or in the first state), the shutter switch 9 generates a switch signal to make a zoom mechanism of an image pick-up unit 121 operate, and when depressed full way (or in the second state), the shutter switch 9 generates a switch signal to make the image pick-up unit 121 generate an image signal of an object H.

The connecting shaft 120 consists of a first shaft portion (hollow shaft) 123 and a solid shaft portion 124, which is fixed to an upper part of the first shaft portion 123 at right angles to the central axis of the first shaft portion 123, as shown in FIG. 33. The first shaft portion of the connecting shaft 120 is rotatably received by the second case 2 perpendicularly to its surface, on which the key input section 7 is provided. Meanwhile, the solid shaft portion of the connecting shaft 120 rotatably supports the second case.

The first shaft portion of the connecting shaft 120 has a large diameter shaft portion 123a and a small diameter shaft portion 123b. The small diameter shaft portion 123b of the first shaft portion 123 is rotatably received by the second case 2 with the large diameter shaft portion 123a exposed on the second case 2. A recess 125 is formed in one end portion of the first case 1, and arm portions surrounding the recess 125 each are formed with a supporting hole 126, for receiving the solid shaft portion 124 of the connecting shaft 120. Received in the supporting holes 126, the solid shaft portion 124 rotatably support the first case 1. In other words, the first case 1 is connected to the second case 2 by means of the solid shaft portion 124 of the connecting shaft 120 and also is supported rotatably about the solid shaft portion 124.

Figure 34:
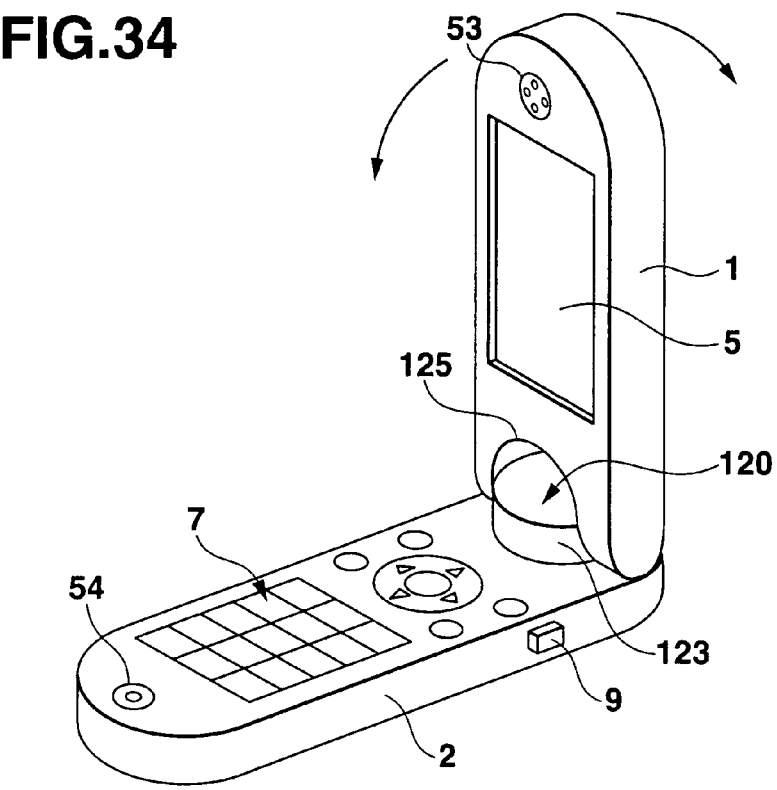
FIG. 34 is a perspective view illustrating the handheld electronic apparatus with the first case kept perpendicular to the second cases.
Figure 35:
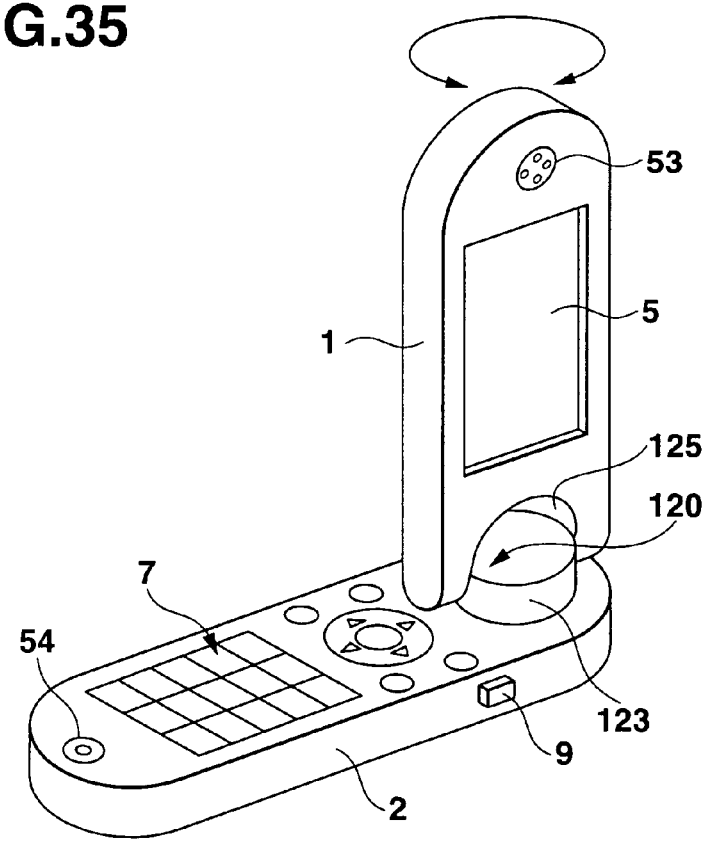
FIG. 35 is a perspective view illustrating the handheld electronic apparatus with the first case kept turned relatively to the second cases.

As shown in FIG. 33, FIG. 34, and FIG. 35, the first case 1 and the second case 2 are connected to each other by means of the connecting shaft 120, and therefore the first case 1 is universally rotatable relatively to the second case 2.

Figure 36:
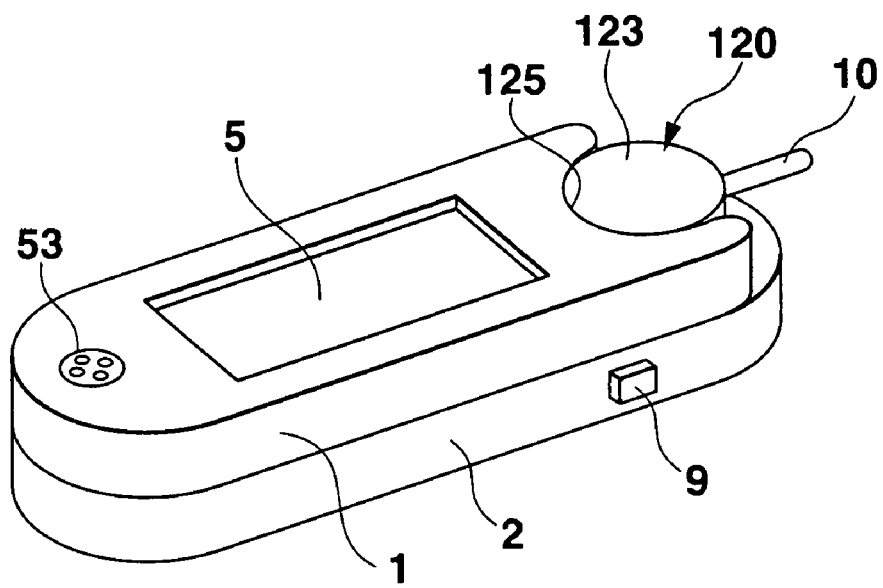
FIG. 36 is a perspective view illustrating the handheld electronic apparatus according to the sixth embodiment of the invention, in which with a first case is piled on top of a second case with a display unit in the first case exposed.
Figure 37:
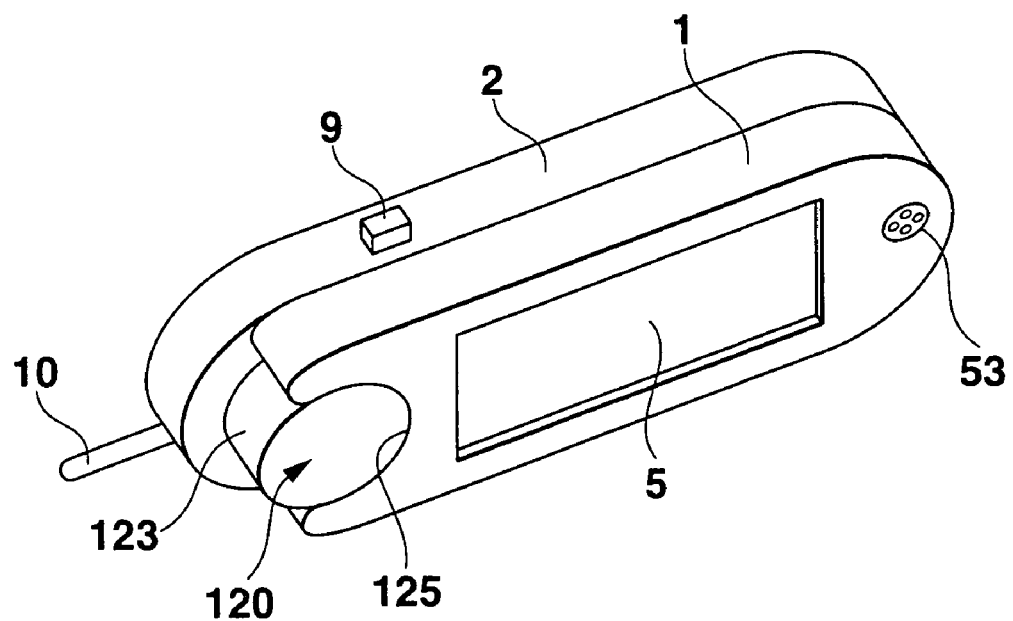
FIG. 37 is a perspective view illustrating the handheld electronic apparatus with the first case piled on top of the second cases, which is used for taking a picture.

Since the first case 1 and the second case 2 are connected to each other by means of the connecting shaft 120 having the first shaft portion 123 and the second shaft portion 124, the first case 1 can be pile on top of the second case 2 with the display unit 5 of the first case and the key input section 7 of the second case 2 facing each other, as shown in FIG. 31 and FIG. 32. Further, the first case 1 can be pile on top of the second case 2 with the display unit 5 of the first case exposed outwardly, as shown in FIG. 36 and FIG. 37. The first case 1 and the second case 2 are electrically connected by a electrically connecting member (not shown) in the connecting shaft 120.

The image pick-up unit 121 has a telephotographing function as the zoom function. The zoom mechanism is mounted within the cylinder hollow 123b of the first shaft portion 123 with the image pick-up unit 121 facing in the opposite direction to the key input section 7, and moves the along its axis of the cylinder hollow 123b of the first shaft portion 123. The image pick-up unit 121 has substantially the same structure as the image pick-up unit 4 in the first embodiment. The image pick-up unit 121 has a camera cone 11 of a cylinder shape coaxially fixed to the cylinder hollow 123b of the first shaft portion 123.

There are provided in the camera cone 11 the first lens frame 12, the second lens frame 13, the first lens 14 held by the first lens frame 12, the second lens 15 held by the second lens frame 13, and an image pick-up element 17 such as CCD. The image pick-up element 17 converts an image projected thereon through the crystal filter 16a and the protection glass 16b provided within the cylinder hollow 123b of the first shaft portion 123 into an electric signal. There is provided the zoom mechanism 18 at the external peripheral portion of the camera cone 11, which mechanism moves the first lens frame 12 and the second lens frame 13 carrying the first lens 14 and the second lens 15 respectively along the optical axis or the axis of the first shaft portion 123.

More specifically, the peripheral surface of the camera cone 11 is formed with a guide slit 11a along the axis of the first shaft portion 123. The first lens frame 12 and the second lens frame 13 are provided with first projection 12a and the second projection 13a respectively, which are received in the guide slit 11a to be guided along the slit 11a. The lens frames 12, 13 carrying the first lens 14 and the second lens 15 respectively move within the camera cone 11 along the guide slit 11a without rotation.

The zoom mechanism 18 has a rotary cylinder 19 which is provided coaxially with the camera cone 11 and outside of a motor 20 for turning the rotary cylinder 19 for the zoom operation. The rotary cylinder 19 is rotatably provided at a predetermined position outside the camera cone 11 so as not to move along its axis. The rotary cylinder 19 is formed with the first spiral groove 19a and the second spiral groove 19b in its internal peripheral surface. The first spiral groove 19a of the rotary cylinder 19 receives the first projection 12a of the first lens frame 12 through the guide slot 11a in the camera cone 11, and the second spiral groove 19b of the rotary cylinder 19 receives the second projection 13a of the second lens frame 13 through the guide slot 11a in the camera cone 11.

Figure 38:
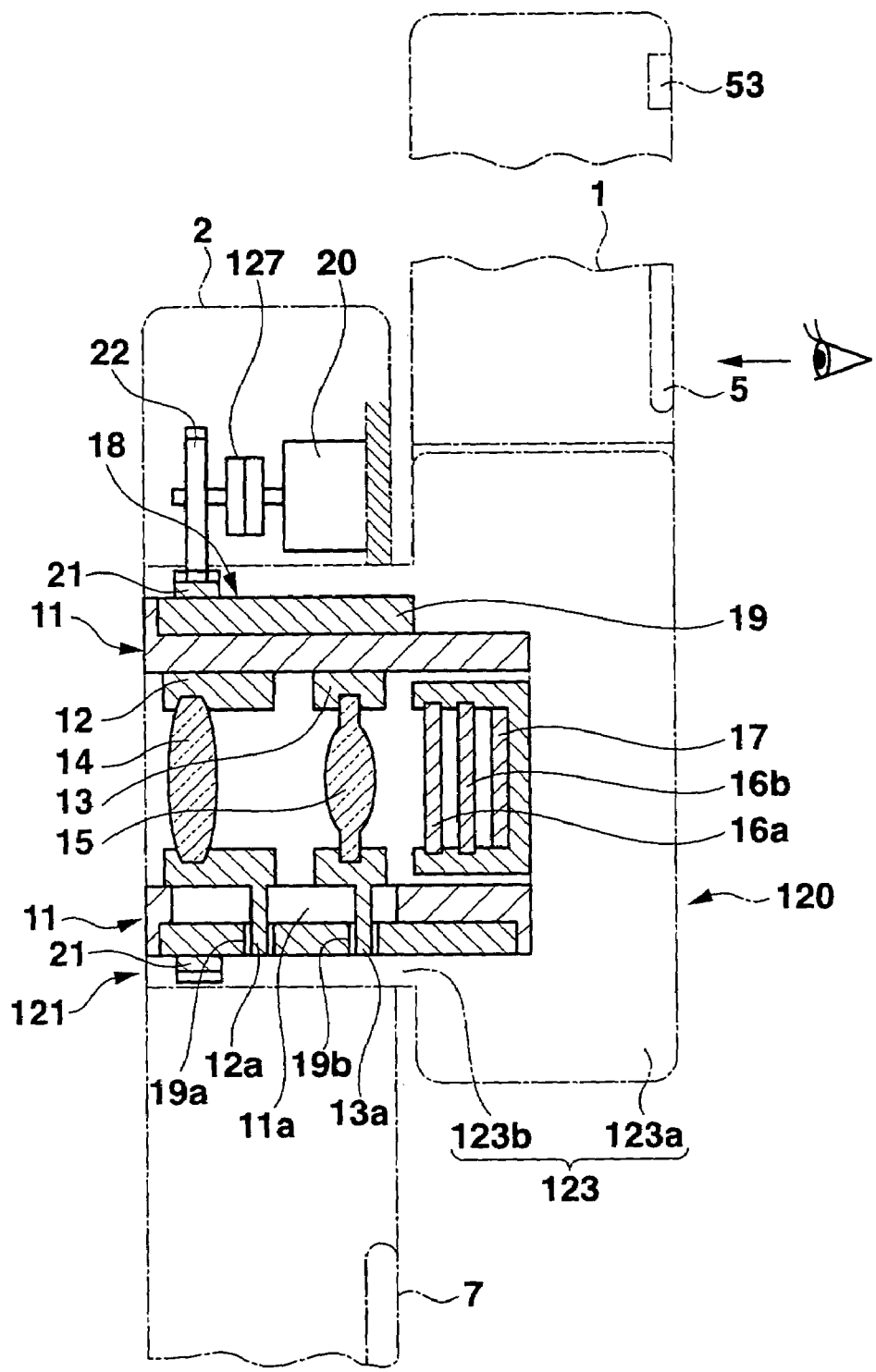
FIG. 38 is an enlarged cross-sectional view illustrating an image pick-up unit of the handheld electronic apparatus according to the sixth embodiment of the invention.

The rotary cylinder 11 has the driven gear 21 on its external peripheral surface as shown in FIG. 38. The motor 20 is fixed on the second case 2 in the vicinity of the first shaft portion 123 and is connected with the driving gear 22 through an electromagnetic clutch 127. The driving gear 22 of the motor 20 engages with the driven gear 21 of the rotary cylinder 11 for transmitting the rotation of the motor 20 to the rotary cylinder 19. The electromagnetic clutch 127 does not transmit the rotation of the motor to the driving gear 22 when the electromagnetic clutch 127 is not excited or in a normal state, and transmits the rotation of the motor to the driving gear 22 when the shutter switch 9 is depressed half way. When the second case 2 rotates relatively to the first shaft portion 123 of the connecting shaft 120, the electromagnetic clutch 127 does not transmit the rotation of the second case 2 to the motor 20.

In the zoom mechanism 18, when the shutter switch 9 is depressed half way to excite the electromagnetic clutch 127, the rotation of the motor 20 is transmitted to the driving gear 22 through the electromagnetic clutch 127. The driving gear 22 drives the driven gear 21 to rotate the rotary cylinder 19. When the rotary cylinder 19 rotates, the first projection 12a of the first lens frame 12 and the second projection 13a of the second lens frame 13 received respectively in the first spiral groove 19a and the second spiral groove 19b through the guide slot 11a of the camera cone 11 are guided along the guide slot 11a, and thereby the first lens frame 12 carrying the first lens 14 and the second lens frame 13 carrying the second lens 15 move along the axis of the first shaft portion 123.

In the zoom mechanism 18, when the motor 20 rotates in a normal rotation direction to rotate the rotary cylinder 19 in a direction indicated by an arrow X in FIG. 7, the first spiral groove 19a moves or brings the first lens frame 12 in a direction away from the inside of the first shaft portion 123, that is, in the leftward direction as seen in FIG. 38, and the second spiral groove 19b moves the second lens frame 13 in the same direction as the first lens frame 12, bringing the second lens frame 13 closer to the first lens frame 12, and thereby the zoom mechanism 18 is set to the telephotographing mode. Meanwhile, when the motor 20 rotates in the reverse rotation direction to rotate the rotary cylinder 19 in a direction different from indicated by the arrow X, the first lens frame 12 and the second lens frame 13 are brought inside of the first rotation shaft 123, and thereby the first lens 14 and second lens 15 are stored in the first shaft portion 123.

In the cellular phone according to the sixth embodiment, the first case 1 having the display unit 5 and the second case 2 having the key input section 7 are connected by means of the connecting shaft 120 including the built-in image pick-up unit 121 in the substantially same manner as the first embodiment and the third embodiment. When the first case 1 and the second case 2 are kept open, the display unit 5 and the key input section 7 face in the same direction and the image pick-up unit 121 faces in the opposite direction to the display unit 5 and the key input section 7. BY a simple operation, the image pick-up unit 121 is made to face in the opposite direction to the display unit 5 and the key input section 7. Therefore, the user can take a picture of an object H while viewing an image of the object H on the display unit 5. Since the image pick-up unit 121 has the zoom mechanism 18, the user can adjust the photographing range to photograph the object H in his or her desired size while viewing the object H on the display unit 5.

Figure 30:
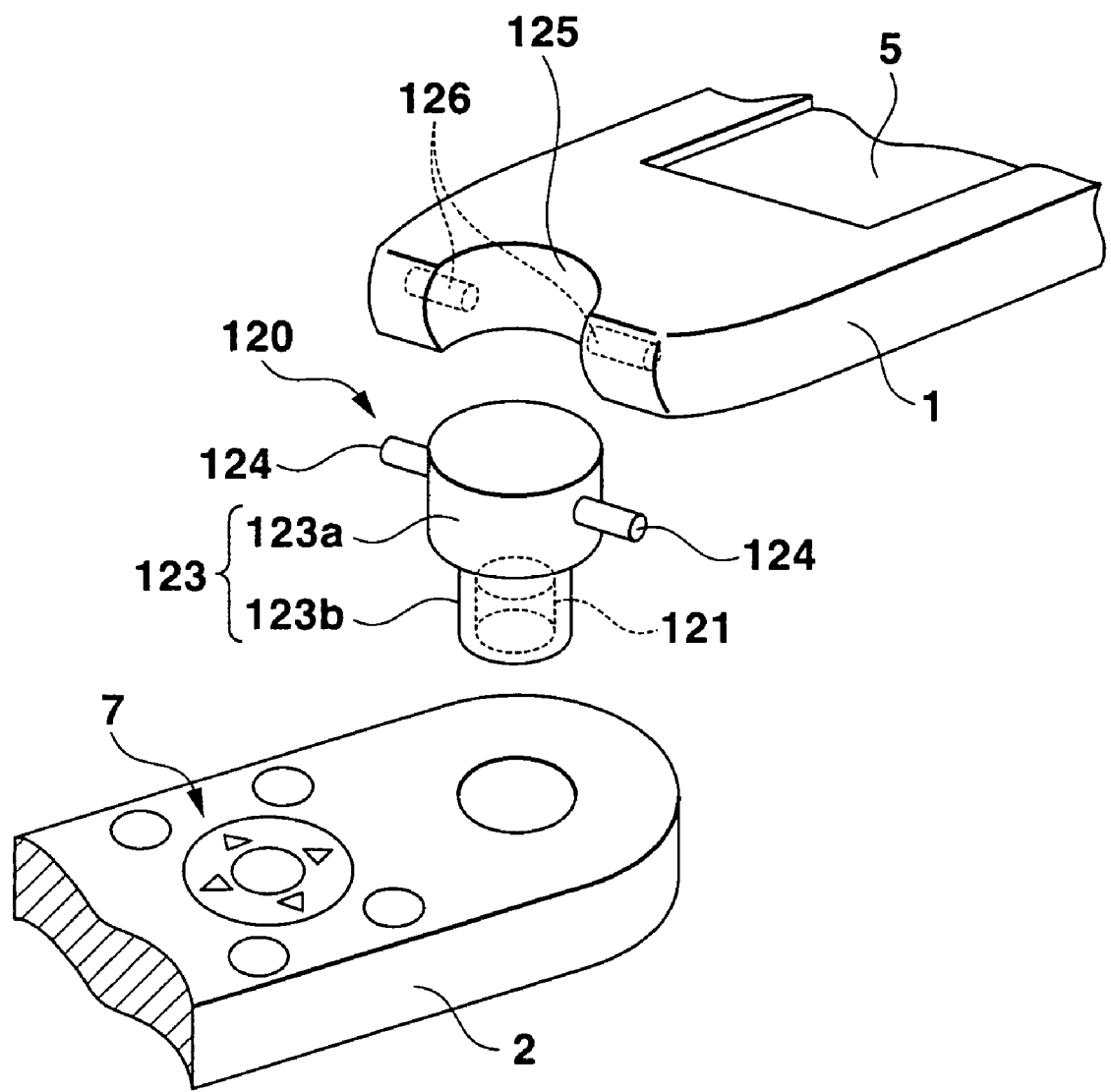
FIG. 30 is an exploded perspective view illustrating a handheld electronic apparatus according to a sixth embodiment of the invention.

As shown in FIG. 30, the connecting shaft 120 consists of the first shaft portion (hollow shaft) 123 and the solid shaft portion 124, which is fixed to an upper part of the first shaft portion 123 at right angles to the central axis of the first shaft portion 123. The first shaft portion 123 of the connecting shaft 120 is rotatably received by the second case 2 perpendicularly to its surface, on which the key input section 7 is provided. Meanwhile, the solid shaft portion 124 of the connecting shaft 120 rotatably supports the second case 2. The first case 1 is connected to the second case 2 by means of the connecting shaft 120 having the structure described above and therefore is movable either direction with respect to the second case 2 as shown in FIG. 33.

Further, in the cellular phone, the first case 1 can be turned about the second shaft portion 124 of the connecting shaft 120 to raise with respect to the second case, as shown in FIG. 34. When the first case 1 is turned about the cylinder portion 123b of the first shaft 123 of the connecting shaft 120 with respect to the second case 2 with the first case 1 held raising up as described above, the display unit 5 provided on the first case 1 may be turned to face in the different direction from the key input section 7 on the second case 2 as shown in FIG. 35. For example, when the first case 1 and the second case 3 are opened, the display unit 5 provided on the first case 1 and the key input section 7 provided on the second case 2 may be made to face in the same direction as shown in FIG. 33, and further the display unit 5 provided on the first case 1 and the key input section 7 provided on the second case 2 may be made to face in the opposite direction to each other.

When the first case 1 is turned to be piled on top of the second case 2, that is when both the cases are closed, the display unit 5 provided on the first case 1 and the key input section 7 provided on the second case 2 may be made to face each other to face in the opposite direction from each other as shown in FIG. 31 and FIG. 32. On the contrary, the display unit 5 provided on the first case 1 and the key input section 7 provided on the second case 2 may be made to face in the same direction as shown in FIG. 36 and FIG. 37. Therefore, the display unit 5 provided on the first case 1 may be made to face either direction with respect to the key input section 7 provided on the second case 2.

When the first case 1 is turned to be piled on top of the second case 2 with the display unit 5 facing the key input section 7, both the display unit 5 and the key input section 7 are not exposed outwardly. Since both the display unit 5 and the key input section 7 may be protected from external shock by the first case 1 and the second case 2, the cellular phone may be carried with the user with no fear of damage. When the first case 1 is turned to be piled on top of the second case 2 with the display unit 5 and the key input section 7 facing in the same direction, the display unit 5 provided on the first case 1 are exposed outwardly at all times. Therefore, even when the first case 1 is turned to be piled on top of the second case 2, the user can review data displayed on the display unit 5 at all times without any restriction.

In the cellular phone according to the sixth embodiment, when the display unit 5 of the first case 1 and the key input unit 7 of the second case 2 are made to face in the same direction, the image pick-up unit 121 faces in the opposite direction. Therefore, in case that an object H is photographed with the image pick-up unit 121 of this cellular phone, the user is allowed to photograph an object H while viewing the image of the object H on the display unit 5 whether the first case 1 and the second case 2 are kept open or closed as shown in FIG. 36 and FIG. 37. While viewing on the display unit 5 the image of the object H to be photographed, the user can adjust the size of the image by using the zoom mechanism 18 of the image pick-up unit 121.

Since the image pick-up unit 121 moves along the axis of the cylinder potion 123b of the first shaft portion 123 of the connecting shaft 120, the layouts of the display unit 5 and the key input section 7 are not restricted by the image pick-up unit 121, and the spaces sufficient for mounting the display unit 5 and the key input section 7 can be ensured in the same manner as in the first embodiment and the third embodiment. Further, since the shutter switch 9 is provided on the side wall of the second case 2, the shutter switch 9 does not restrict the spaces for mounting the display unit 5 and the key input section 7 and the spaces sufficient for mounting the display unit 5 and the key input section 7 can be ensured.

Since the shutter switch 9 is provided on the side wall of the second case 2, and the shutter switch 9 is exposed at all times whether the first case 1 and the second case 2 are kept open or closed, the shutter switch 9 can easily be manipulated at all times. Since the shutter switch 9 is provided on the side wall of the second case 2 in the vicinity of the connecting shaft 120, the user can manipulate the shutter switch 9 with his or her finger without feeling uneasiness, when the user holds the cellular phone with the cases kept closed with both his or her hands, or when the user holds the cellular phone with the cases kept open with his or her hand.

When the shutter switch 9 is depressed half way, the zoom mechanism 18 of the image pick-up unit 121 operates, and When the shutter switch 9 is depressed full way, the image pick-up unit 121 obtains an image of an object H. The user can adjust the photographing range with the shutter switch 9 depressed half way to set an angle of the object H, and thereby his or her desired photograph may be obtained by depressing the shutter switch 9 full way after setting the angle of the object H.

In the zoom mechanism 18 of the image pick-up unit 120 in the sixth embodiment, the rotation of the motor 20 is transmitted to the rotary cylinder 19 via the drive gear 22 and the driven gear 21, and the first spiral groove 19a and the second spiral groove 19b formed in the rotary cylinder 19 rotate to guide the first lens frame 12 carrying the first lens 14 and the second lens frame 13 carrying the second lens 15 along the axis of the first shaft portion 123. But the zoom mechanism 70 including the electromagnetic coil 77 may be employed to move the plural permanent magnets for moving the lens frames 63, 64 and 65 each carrying the lens 66, 67 or 68 in the same manner as in the first third embodiment through the fifth embodiment.

The zoom mechanism 70 allows the image pick-up unit 121 to be assembled more compact in size compared with the zoom mechanism for mechanically moving the lens. Using less number of mechanical parts, the zoom mechanism 70 is simple in structure compared with the structure for mechanically moving the lens, and can withstand external shocks which will be applied thereto while the user carries the cellular phone.

In the sixth embodiment, an angle detecting unit such as an encoder for detecting angles made between the first case 1 and the shaft portion 123 of the connecting shaft 120 and between the second case 2 and the shaft portion 123 of the connecting shaft 120 may be provided to automatically switching the display mode of the display unit 5 to display a landscape screen or a portrait screen for easy viewing depending on the detected angle in the same manner as in the first embodiment through the fifth embodiment.

In the sixth embodiment, a flash light unit such as the first strobe light unit 61, the second strobe light unit 62, and the strobe light unit 105 may be provided in the vicinity of the image pick-up unit 121 for illuminating an object H to be photographed. Further, the light radiation control mechanism such as the light radiation control mechanisms 85, 106, and 110 may be provided to adjust the light from the strobe light unit for illuminating the object H properly and evenly.

The light radiation control mechanism adjusts a radiation direction and a radiation range of the light from the flash light unit depending on the focus length of the image pick-up unit in the photographing operation. Therefore, the object H is illuminated effectively by the flash light unit with aid of the light radiation control mechanism whether the image pick-up unit is in the telephotographing operation or the wide-angle photographing operation.

The flash light unit consists of plural sets of a light emitting element and a reflector. The light radiation control mechanism controls each of the plural sets of the light emitting element and the reflector to change its illumination angle depending on the focus length. In other words, when an object H in a distant place is photographed with the image pick-up unit of a short focus length, the light radiation control mechanism controls each of the reflectors to decrease the intersecting angle at which the optical axis of the reflector intersects with the optical axis of the image pick-up unit. When an object H in a near place is photographed with the image pick-up unit of a long focus length, the light radiation control mechanism controls each of the reflectors to increase the intersecting angle at which the optical axis of the reflector intersects with the optical axis of the image pick-up unit. In this way, the object H is illuminated clearly by the flash light unit whether the object H is in a distant place or in a near place.

As described above, the flash light unit consists of light emitting elements and the reflectors. The light radiation control unit shifts the light emitting element from the focus point of the reflector along the optical axis of the reflector depending the focus length of the image pick-up unit in the photographing operation. For example, when an object H in a distant place is photographed, the light radiation control unit brings the light emitting element closer to the focus point of the reflector along the optical axis of the reflector to allow the light travel substantially in parallel with the optical axis of the reflector, concentrating the light onto the object H. When an object H in a near place is photographed, the light radiation control unit brings the light emitting element apart from the focus point of the reflector along the optical axis of the reflector to allow the light radiate toward the object H. As described, the object H is illuminated clearly whether it is in a distant place or in a near place.

The light radiation control mechanism adjusts a radiation direction and a radiation range of the light from the flash light unit depending on the telephotographing operation and the wide-angle photographing operation of the image pick-up unit in the photographing operation. Therefore, the object H is illuminated effectively by the flash light unit with aid of the light radiation control mechanism whether the image pick-up unit is in the telephotographing operation or the wide-angle photographing operation.

The flash light unit consists of plural sets of a light emitting element and a reflector. The light radiation control mechanism controls each of the plural sets of the light emitting element and the reflector to change its illumination angle depending on the telephotographing operation and the wide-angle photographing operation of the image pick-up unit. In other words, when an object H in a distant place is photographed with the image pick-up unit in the telephotographing operation, the light radiation control mechanism controls each of the reflectors to decrease the intersecting angle at which the optical axis of the reflector intersects with the optical axis of the image pick-up unit. When an object H in a near place is photographed with the image pick-up unit in the wide-angle photographing operation, the light radiation control mechanism controls each of the reflectors to increase the intersecting angle at which the optical axis of the reflector intersects with the optical axis of the image pick-up unit. In this way, the object H is illuminated clearly by the flash light unit whether the object H is in a distant place or in a near place.

As described above, the flash light unit consists of light emitting elements and the reflectors. The light radiation control unit shifts the light emitting element from the focus point of the reflector along the optical axis of the reflector depending on the telephotographing operation or the wide-angle photographing operation of the image pick-up unit. For example, when an object H in a distant place is photographed with the image pick-up unit in the telephotographing operation, the light radiation control unit brings the light emitting element closer to the focus point of the reflector along the optical axis of the reflector to allow the light travel substantially in parallel with the optical axis of the reflector, concentrating the light onto the object H. When an object H in a near place is photographed with the image pick-up unit in the wide-angle photographing operation, the light radiation control unit brings the light emitting element apart from the focus point of the reflector along the optical axis of the reflector to allow the light radiate toward the object H. As described, the object H is illuminated clearly whether it is in a distant place or in a near place.

In the first embodiment through the sixth embodiment and their modifications, it is preferable to have a holding unit for temporarily holding the image pick-up unit 55, 60, 121 in the rotation shaft 3 or the connecting shaft 120 when the first case 1 and the second case 2 are brought from their closed state (where one case is piled on top of other case) to an open state. When the user uses the cellular phone with the cases open to have a conversation with other, the image pick-up unit 55, 60, 121 is held in the rotation shaft 3 or the connecting shaft 120 in a safe way, and therefore the image pick-up unit 55, 60, 121 is protected from external shock. In the first embodiment through the sixth embodiment and their modifications, an example of the holding unit used in the cellular phone has been described, but the above described holding unit may be used in a handheld terminal such as a personal digital assistant.

As have been described above, the present handheld electronic apparatus comprises the first case 1 having the display unit 5 for displaying an image, the second case 2 having the key input section 7, the connecting unit (rotation shaft 3, connecting shaft 120) for connecting the first case 1 and the second case 2 to each other in an openable and closable manner, and the image pick-up unit 4, 55, 60, 121 having the zoom mechanism 18, 56, 70, provided within the connecting unit, wherein when the first case 1 and the second case 2 are opened, the display unit 5 and the key input section 7 face in the same direction, and the image pick-up unit is disposed to face in the opposite direction from the display unit 5 and the key input section 7, as shown in FIG. 1 through FIG. 38.

In the handheld electronic apparatus, the first case 1 having the display unit 5 for displaying an image and the second case 2 having the key input section 7 are connected to each other by means of the connecting unit. When the first case and the second case are brought to an open state, the display unit and the key input section face in the same direction and the image pick-up unit face in the opposite direction to the display unit and the key input section. The user can direct the display unit in the opposite direction to the image pick-up unit by a simple operation to open the first case and the second case. The user can photograph an object H while viewing an image of the object H on the display unit. Further, the user can hold either of the first case or the second case with his or her hand in a natural manner for operation. The zoom mechanism of the image pick-up unit allows the user to adjust the photographing range of an object H while viewing an image of the object H displayed on the display unit to obtain a photograph of the object H of his or her desired size. In the cellular phone, the first case and the second case are simply connected by the connecting unit and therefore the cellular phone is simple in structure and made at low costs.

The handheld electronic apparatus comprises the first case having the display unit, the second case having the key input section, and the connecting unit (rotation shaft) for rotatably connecting the first case and the second case to each other, wherein the connecting unit is provided at right angles to the first case and the second case, as shown in FIG. 1 through FIG. 29. In the present handheld electronic apparatus, the connecting unit is provided at right angles or perpendicular to the first case and the second case. The present apparatus is simple in structure, because one of the first case and the second case is rotatably connected to one end of the connecting unit and other case is rotatably connected or fixed to the other end of the connecting unit to complete the apparatus. The second case and the first case pile on top of the second case are connected to each other by means of the connecting unit with the display unit exposed. In the arrangement of the apparatus, the user can open the first case and the second case simply by turning one of the first case and the second case around the connecting unit relatively to other in either direction, and view data on the display unit at all times because the display unit is exposed at all times whether the first case and the second case are brought open or closed.

In the handheld electronic apparatus shown in FIG. 30 through FIG. 38, the connecting unit (connecting shaft 120) consists of the first shaft portion 123 and the second shaft portion which is fixed to the first shaft portion at right angles to the central axis of the first shaft portion. The first shaft portion is rotatably received in the second case perpendicular to the surface of the same on which the display unit is provided or received in the first case perpendicular to the surface of the same on which the key input section is provided. The other case is rotatably connected to the second shaft portion 124. In this way the first case and the second case are universally coupled to each other.

In the instant handheld electronic apparatus, the first shaft portion of the connecting unit is rotatably received in the second case perpendicular to the surface of the same on which the display unit is provided or received in the first case perpendicular to the surface of the same on which the key input section is provided. The other case is rotatably connected to the second shaft portion 124 of the connecting unit. The first case and the second case are coupled to each other in this way, and therefore either case can turn about the connecting unit in all directions, and the display unit or the key input section can be turned about the connecting unit in all directions. Therefore, the display unit and the key input section can be directed in the same direction and also the display unit and the key input section can be directed in the opposite direction to each other, or are made to face each other.

When the first case (or the second case) is turned to be piled on top of the second case (or the first case), the display unit can be made to face the key input section or made to face in the same direction as the key input section. When both the cases are closed (or when one case is piled on top of other case) with the display unit and the key input section facing in the same direction, the user can direct the image pick-up unit in the opposite direction to the display unit. Therefore, the user can photograph an object H while viewing an image of the object H on the display unit.

The handheld electronic apparatus shown in FIG. 1 through FIG. 38, is characterized in that the zoom mechanism 18, 56, 70 of the image pick-up unit 4, 55, 60, 121 moves in the perpendicular direction to the display unit 5 and the key input section 7. The handheld electronic apparatus is provided with the image pick-up unit including the zoom mechanism, which moves in the perpendicular direction to the display screen of the display unit, but the display unit and the key input section are not restricted in their layouts by the zoom mechanism, and spaces enough for mounting the display unit and the key input section are reserved on the first case and the second case.

The handheld electronic apparatus shown in FIG. 1 through FIG. 38, is characterized in that the externally operable member (manipulation switch 8, shutter switch 9) is provided on the side wall of any one of the first case and the second case for making the zoom mechanism operate.

In the present handheld electronic apparatus, since the shutter switch is provided on the side wall of the case, the display unit and the key input section are not restricted in their layouts by the shutter switch, and spaces enough for mounting the display unit and the key input section are reserved on the first case and the second case. In particular, since the externally operable member is mounted on the side wall of the case, and is exposed outwardly even when the first case and the second case are brought closed or open, the user can operate the externally operable member without failure at all times. Since the externally operable member is mounted on the side wall of the case in the vicinity of the connecting unit, the user can operate the member with his or her finger in a natural manner without failure, even when he or she holds the cellular phone with the cases kept closed in his or her both hands or when he or she holds the cellular phone with the cases kept open in his or her one hand.

The handheld electronic apparatus shown in FIG. 16 through FIG. 38, is characterized in that when the externally operable member (shutter switch 9) is depressed half way, the zoom mechanism 70 of the image pick-up unit 60, 121 is caused to operate, and when the externally operable member (shutter switch 9) is depressed full way, the image pick-up unit 60, 121 generates an image of an object H.

In the present handheld electronic apparatus, when the externally operable member (shutter switch 9) has been depressed half way, the zoom mechanism 70 of the image pick-up unit 60, 121 is caused to operate, and when the externally operable member (shutter switch 9) has been depressed full way, the image pick-up unit 60, 121 generates the image of an object H.

Therefore, the user can cause the zoom mechanism to operate by depressing the externally operable member half way to adjust the photographing range of an object H, and can cause the image pick-up unit to photograph the object H by depressing the externally operable member full way to obtain a photograph of the object H of his or her desired size or photographing angle.

The handheld electronic apparatus shown in FIG. 1 through FIG. 15, comprises the motor unit (motor 20) for moving the zoom mechanism 18, 56 of the image pick-up unit 4, 55, the externally operable member (manipulating switch 8) provided on one of the first case 1 and the second case 2, and the rotation transmitting unit 23 responsive to operation of the externally operable member for transmitting rotation of the motor unit to either of the first case or the second case to turn one case relatively to other case, bringing the one case to an open position with respect to other case. When the externally operable member is operated, the rotation transmitting unit 23 transmits rotation of the motor unit to either of the first case or the second case in response to the operation of the externally operable member to turn one case about the rotation shaft relatively to other case, bringing the one case to an open position with respect to other case. Since the motor unit is used in the above arrangement, a special power source is not required to turn one case relatively to other case. The number of the power sources is minimized and the apparatus will be manufactured at low costs.

The handheld electronic apparatus shown in FIG. 1 through FIG. 29, comprises a detecting unit (optical sensor 39) for detecting an open state or a closed state of the first case 1 and the second case 2, and a display control unit (CPU 45) for swtching a display mode of the display unit 5 depending on a detection signal from the detecting unit. When the first case is turned about the connecting unit relatively to the second case, the detecting unit detects the open state or closed state of the first case 1 and the second case 2 to generate a detection signal. The display control unit switches the display mode of the display unit depending on the detection signal generated by the detecting unit to make the same display a landscape screen or a portrait screen.

For example, when the first case is turned at an angle of 90 degrees relatively to the second case, the display unit automatically displays the landscape screen, and when the first case is turned at an angle of 180 degrees relatively to the second case, the display unit automatically displays the portrait screen. In this way, the display unit automatically displays the landscape screen or the portrait screen depending on the open or closed state of the first case and the second case, allowing the user to view the screen in an easy manner.

The handheld electronic apparatus shown in FIG. 16 through FIG. 29, comprises the flash light unit (first and second strobe light unit 61, 62 or 105) for emitting light against an object H.

When an object H is photographed, the flash light unit emits light against the object H to illuminate the same. Therefore, a clear photograph is obtained, even though the object H to be photographed is in a dark place.

The handheld electronic apparatus shown in FIG. 16 through FIG. 29, comprises a flash light unit (first and second strobe light unit 61, 62 or 105) for emitting light against an object H and the light radiation control mechanism (85, 106, 110) for adjusting a radiation direction or radiation range of light from the flash light unit depending on the photographing operation of the image pick-up unit. The light radiation control mechanism (85, 106, 110) adjusts light from the flash light unit to illuminate an object H effectively and evenly whether the object H is in a distant place or in a near place.

What is claimed is:

1. A handheld electronic apparatus comprising:
    a first case;
    a second case;
    a display unit provided on the first case;
    a key input section provided on the second case;
    a rotation shaft for rotatably connecting the first case and the second case to each other;
    an image pick-up unit having a zoom mechanism, mounted within the rotation shaft, the zoom mechanism of the image pick-up unit being movable along an axis of the rotation shaft;
    a strobe-light unit for emitting a flash of light to an object to be photographed; and
    a light radiation adjusting mechanism for adjusting a light radiation direction or a light radiation range of the strobe-light unit depending on a photographing mode of the image pick-up unit.

2. The handheld electronic apparatus according to claim 1, wherein the display unit is provided on an external surface of the first case so as to be exposed externally when the first case is rotated so as to be on top of the second case.

3. The handheld electronic apparatus according to claim 1, wherein the key input section is provided on the second case so as to face the same direction as the display unit provided on the first case.

4. The handheld electronic apparatus according to claim 1, wherein the image pick-up unit mounted within the rotation shaft faces in a direction which is opposite to a direction in which a display screen of the display unit provided on the first case faces.

5. The handheld electronic apparatus according to claim 1, further comprising:
    a shutter switch provided on a side wall of the second case.

6. The handheld electronic apparatus according to claim 5, wherein the zoom mechanism of the image pick-up unit operates when the shutter switch is depressed half way, and the image pick-up unit photographs an object when the shutter switch is depressed fully.

7. The handheld electronic apparatus according to claim 6, further comprising:
    a display mode switching unit for controlling the display unit to perform display in landscape orientation when the first case is rotated about the rotation shaft to be in a closed position on top of the second case, and for controlling the display unit to perform display in portrait orientation when the first case is rotated about the rotation shaft to an open position.

8. The handheld electronic apparatus according to claim 1, further comprising:
    a storing unit for storing the image pick-up unit within the rotation shaft when the first case is brought to an open position from a closed position in which the first case is on top of the second case.

9. A handheld electronic apparatus comprising:
    a first case;
    a second case;
    a display unit provided on a surface of the first case for displaying an image;
    a key input section provided on a surface of the second case;

a connecting unit for connecting the first case and the second case to each other such that the first case and the second case are openable and closable with respect to each other;

an image pick-up unit having a zoom mechanism, provided within the connecting unit;

an externally operable member provided on a side wall of one of the first case and the second case, for operating the zoom mechanism of the image pick-up unit;

a strobe-light unit for emitting a flash of light to an object to be photographed; and a light radiation adjusting mechanism for adjusting a light radiation direction or a light radiation range of the strobe-light unit depending on a photographing mode of the image pick-up unit;

wherein when the first case and the second case are opened, the display unit on the first case and the key input section on the second case both face in a first direction, and the image pick-up unit is disposed to face in a second direction that is opposite to the first direction; and wherein the zoom mechanism of the image pick-up unit operates when the externally operable member is depressed half way, and the image pick-up unit photographs an object when the externally operable member is depressed fully.

10. A handheld electronic apparatus comprising:

a first case;

a second case;

an image pick-up unit having a zoom mechanism, for photographing an object to produce an image of the object;

a display unit provided on the first case for displaying the image produced by the image pick-up unit;

a key input section provided on the second case;

a connecting unit for connecting the first case and the second case to each other such that the first case and the second case are openable and closable with respect to each other; and an externally operable member provided on one of the first case and the second case;

wherein when the externally operable member is operated with the first case and the second case in an opened state, the zoom mechanism of the image pick-up unit moves in a direction going away from the display unit provided on the first case;

wherein one of the first case and the second case is turned relative to the other case when the externally operable member is depressed half way, and the zoom mechanism of the image pick-up unit operates when the externally operable member is depressed fully.

11. The handheld electronic apparatus according to claim 10, wherein the externally operable member is provided on a same surface of the first case as the display unit.

12. A handheld electronic apparatus comprising:

a first case;

a second case;

an image pick-up unit having a zoom mechanism, for photographing an object to produce an image of the object;

a display unit provided on the first case for displaying the image produced by the image pick-up unit;

a key input section provided on the second case;

a connecting unit for connecting the first case and the second case to each other such that the first case and the second case are openable and closable with respect to each other; and an externally operable member provided on one of the first case and the second case;

wherein when the externally operable member is operated with the first case and the second case in an opened state, the zoom mechanism of the image pick-up unit moves in a direction going away from the display unit provided on the first case;

wherein when the externally operable member is depressed half way, one of the first case and the second case is turned relative to the other case, and simultaneously the control unit switches a display mode of the display unit depending on an angle formed between the first case and the second case.

13. The handheld electronic apparatus according to claim 12, wherein the externally operable member is provided on a same surface of the first case as the display unit.

14. A handheld electronic apparatus comprising:

a first case;

a second case;

a display unit provided on a surface of the first case for displaying an image;

a key input section provided on a surface of the second case;

a connecting unit for connecting the first case and the second case to each other such that the first case and the second case are openable and closable with respect to each other;

an image pick-up unit having a zoom mechanism, provided within the connecting unit;

a strobe-light unit for emitting a flash of light to an object to be photographed; and a light radiation adjusting mechanism for adjusting a light radiation direction or a light radiation range of the strobe-light unit depending on a photographing mode of the image pick-up unit;

wherein when the first case and the second case are opened, the display unit on the first case and the key input section on the second case both face in a first direction, and the image pick-up unit is disposed to face in a second direction that is opposite to the first direction.

15. A handheld electronic apparatus comprising:

a first case;

a second case;

a display unit provided on the first case;

a key input section provided on the second case;

a rotation shaft for rotatably connecting the first case and the second case to each other;

an image pick-up unit having a zoom mechanism, mounted within the rotation shaft, the zoom mechanism of the image pick-up unit being movable along an axis of the rotation shaft;

a shutter switch provided on a side wall of the second case; and a display mode switching unit for controlling the display unit to perform display in landscape orientation when the first case is rotated about the rotation shaft to be in a closed position on top of the second case, and for controlling the display unit to perform display in portrait orientation when the first case is rotated about the rotation shaft to an open position;

wherein the zoom mechanism of the image pick-up unit operates when the shutter switch is depressed half way, and the image pick-up unit photographs an object when the shutter switch is depressed fully.

* * * * *